(12) United States Patent
Hirata

(10) Patent No.: US 8,832,598 B2
(45) Date of Patent: Sep. 9, 2014

(54) FILE MANAGEMENT APPARATUS, FILE MANAGEMENT METHOD, AND COMPUTER PROGRAM PRODUCT

(75) Inventor: Satoshi Hirata, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 499 days.

(21) Appl. No.: 12/427,948

(22) Filed: Apr. 22, 2009

(65) Prior Publication Data

US 2009/0282003 A1 Nov. 12, 2009

(30) Foreign Application Priority Data

May 9, 2008 (JP) ................................ 2008-124060

(51) Int. Cl.
*G06F 3/048* (2013.01)
*G06F 17/30* (2006.01)
*G06F 3/0481* (2013.01)
*G06Q 10/10* (2012.01)

(52) U.S. Cl.
CPC ...... *G06F 17/30126* (2013.01); *G06F 3/04815* (2013.01); *G06Q 10/10* (2013.01)
USPC ........................................................ 715/836

(58) Field of Classification Search
CPC .......... G06F 17/30017; G06F 17/3005; G06F 17/30058; G06F 17/30061; G06F 17/301; G06F 17/30126; G06F 3/04815
USPC ........................................................ 715/836
See application file for complete search history.

(56) References Cited

U.S. PATENT DOCUMENTS

| | | | |
|---|---|---|---|
| 6,335,742 B1 * | 1/2002 | Takemoto ...................... 715/781 |
| 6,700,612 B1 * | 3/2004 | Anderson et al. ........ 348/333.11 |
| 6,990,637 B2 * | 1/2006 | Anthony et al. .............. 715/851 |
| 7,675,514 B2 * | 3/2010 | Ni et al. ......................... 345/419 |
| 7,778,973 B2 * | 8/2010 | Choi et al. ..................... 707/628 |
| 8,095,892 B2 * | 1/2012 | Anthony et al. .............. 715/851 |
| 8,104,048 B2 * | 1/2012 | Jalon et al. ..................... 719/329 |
| 2003/0169288 A1 * | 9/2003 | Misawa ......................... 345/719 |
| 2005/0091596 A1 * | 4/2005 | Anthony et al. .............. 715/712 |
| 2005/0193340 A1 * | 9/2005 | Amburgey et al. ............ 715/709 |

(Continued)

FOREIGN PATENT DOCUMENTS

| JP | 4-205656 A | 7/1992 |
|---|---|---|
| JP | 11-96194 | 4/1999 |

(Continued)

OTHER PUBLICATIONS

U.S. Appl. No. 12/326,295, filed Dec. 2, 2008, Hirata.

(Continued)

*Primary Examiner* — Jeffrey A Burke
(74) *Attorney, Agent, or Firm* — Oblon, Spivak, McClelland, Maier & Neustadt, L.L.P.

(57) ABSTRACT

A file management apparatus displays place images each of which is a unit for managing files on a display unit in a matrix manner. Files and thumbnail images are stored in association with one of the place images. When a place image is selected, thumbnail images associated with the selected place image are displayed on the display unit. When an instruction for shifting upward, downward, to the left, or to the right while thumbnail images are displayed, other thumbnail images associated with a place image arranged in a direction indicated by the instruction from a place image associated with the currently-displayed thumbnail images are displayed on the display unit.

18 Claims, 56 Drawing Sheets

(56) References Cited

U.S. PATENT DOCUMENTS

| | | |
|---|---|---|
| 2006/0026523 A1 | 2/2006 | Kitamaru et al. |
| 2006/0069998 A1* | 3/2006 | Artman et al. ............... 715/721 |
| 2007/0081088 A1 | 4/2007 | Gotoh et al. |
| 2008/0276171 A1* | 11/2008 | Sabo ............................ 715/711 |
| 2008/0282195 A1* | 11/2008 | Nakagawa et al. .......... 715/838 |

FOREIGN PATENT DOCUMENTS

| | | |
|---|---|---|
| JP | 2001-109877 A | 4/2001 |
| JP | 2006-72738 A | 3/2006 |
| JP | 2006-268295 | 10/2006 |
| JP | 2007-94762 A | 4/2007 |

OTHER PUBLICATIONS

Japanese Office Action issued Nov. 16, 2012 in Patent Application No. 2009-112355.

Japanese Office Action issued Nov. 15, 2012 in Patent Application No. 2009-112356.

* cited by examiner

FIG. 4

```
<?xml version="1.0" encoding="utf-8"?>
<placeMap updateTime="2007-08-10T12:54:00+09:00"
preCurrentID="My place">

<layer name="X" tag="Y">
201{   <placeID="Z">
       <placeID="Z">  ←—202
       <placeID="Z">
    </layer>

<layer name="FAVORITE" tag="FAVORITE; PHOTO">
       <placeID="Z">
       <placeID="My place">
       <placeID="Z">
    </layer>

<layer name="X" tag="Y">
       <placeID="Z">
       <placeID="Z">
       <placeID="Z">
    </layer>

</placeMap>
```

FIG. 5

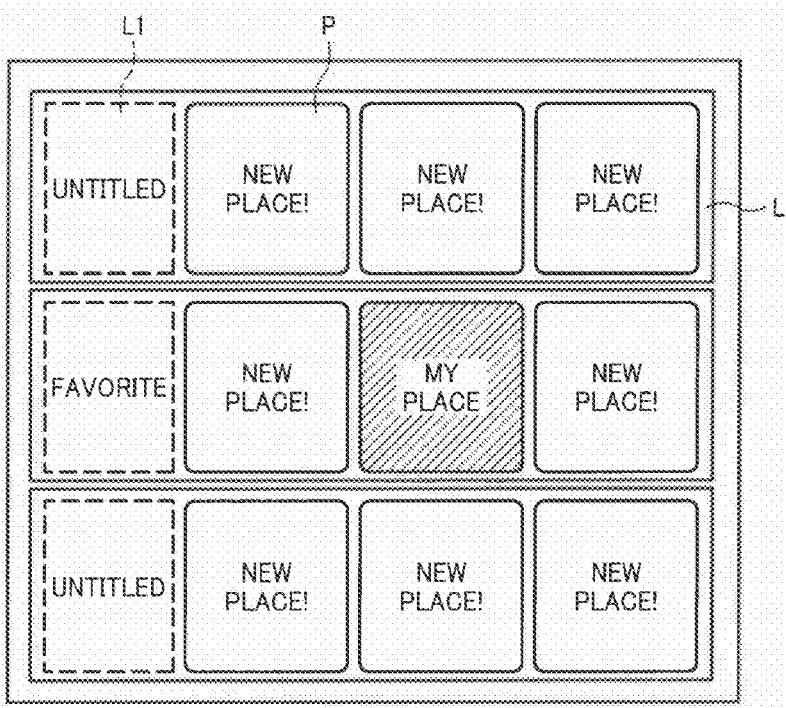

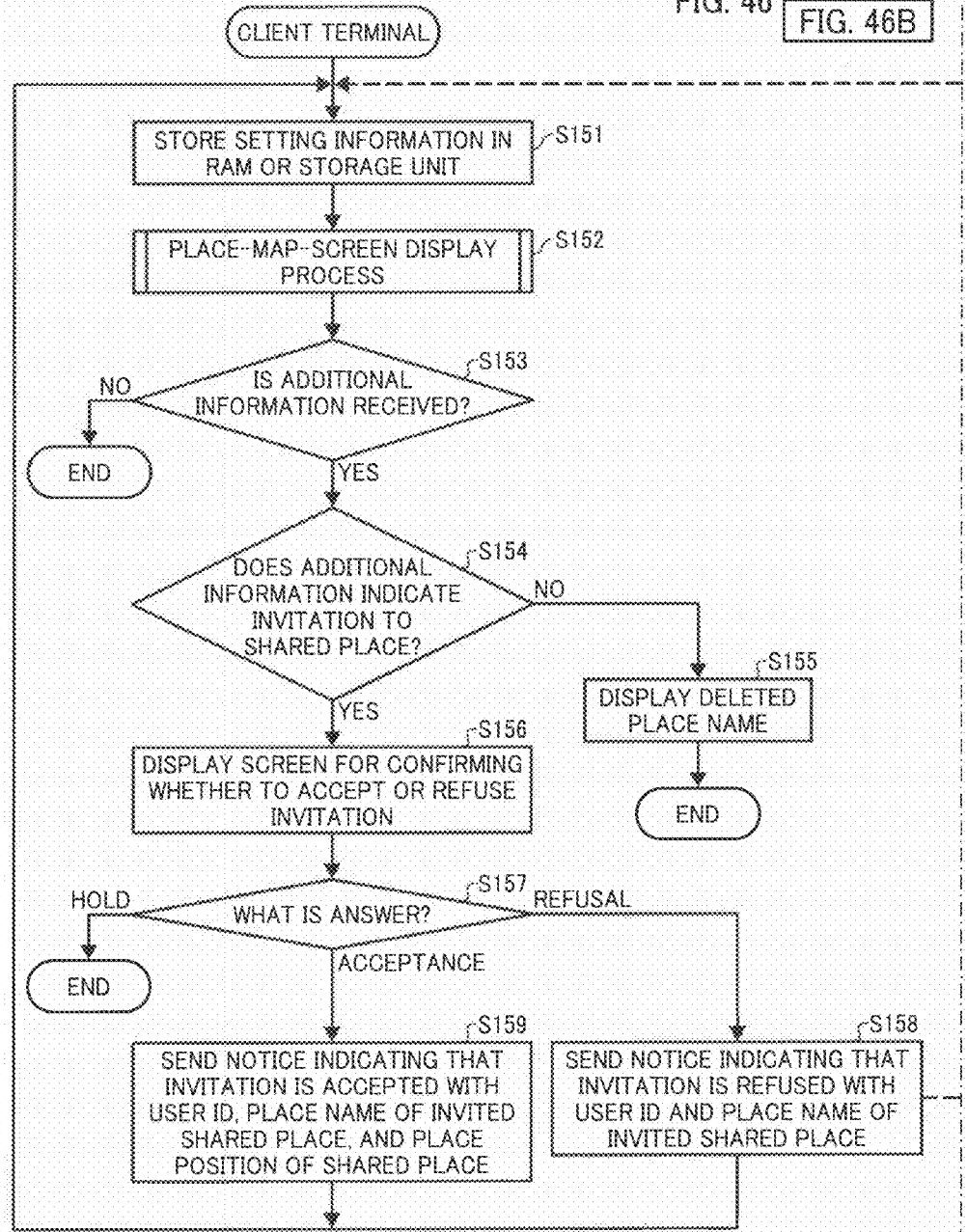

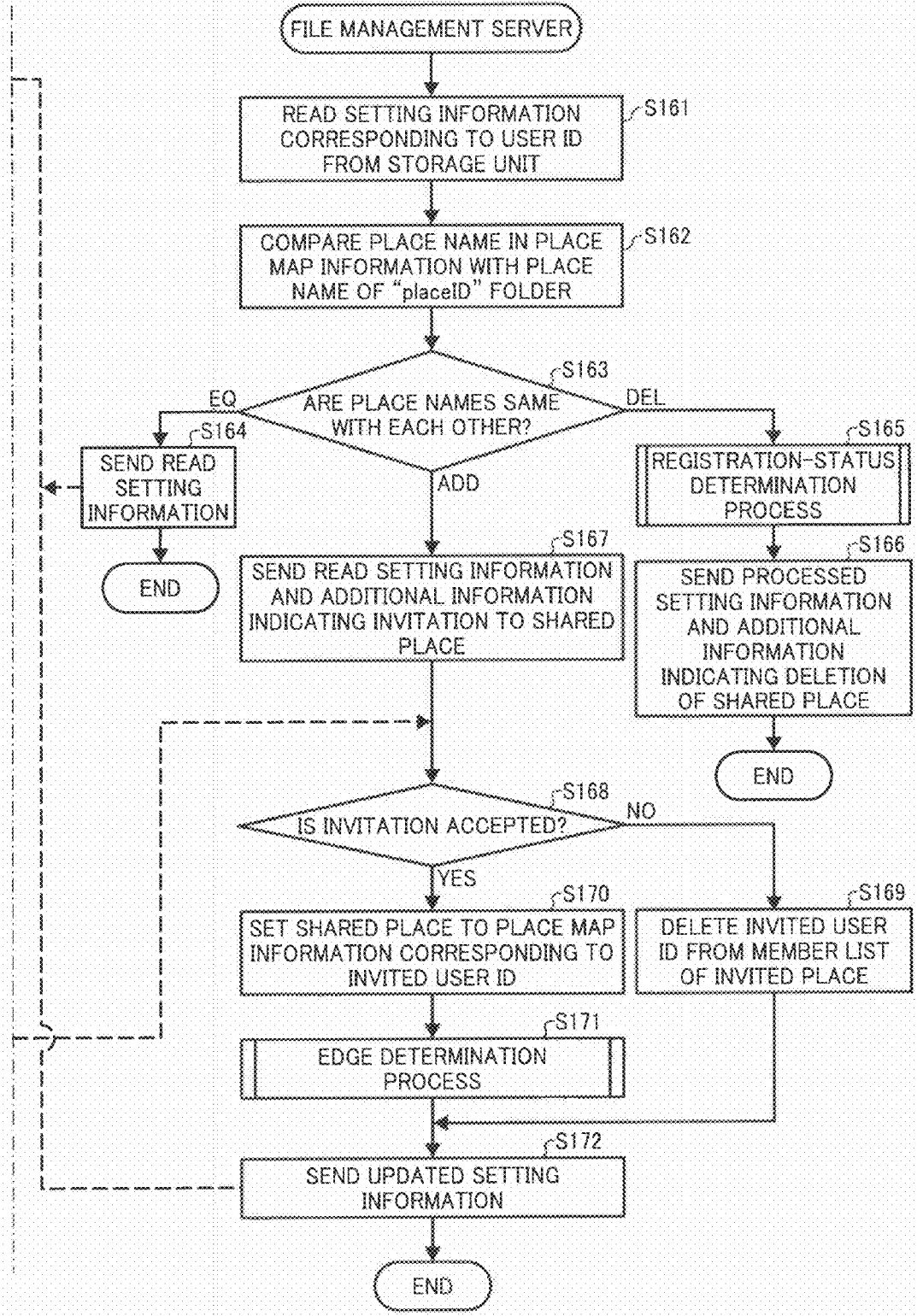

FILE MANAGEMENT APPARATUS, FILE MANAGEMENT METHOD, AND COMPUTER PROGRAM PRODUCT

CROSS-REFERENCE TO RELATED APPLICATIONS

The present application claims priority to and incorporates by reference the entire contents of Japanese priority document 2008-124060 filed in Japan on May 9, 2008.

BACKGROUND OF THE INVENTION

1. Field of the Invention

The present invention relates to a technology for managing files in a file management apparatus with a dedicated user interface.

2. Description of the Related Art

With widespread use of information equipments, such as personal computers (PCs), digital cameras, and cell-phones, documents and images are increasingly used in computerized format (hereinafter, referred to as "file" as appropriate). Such files are managed by the information equipments such that a user can search for files as appropriate by operating the information equipments.

One technique of managing files is to use a tree structure as employed in WINDOWS (registered trademark) that runs as operating system (OS) in typical PCs. The tree structure is a hierarchical structure constituted of folders, in which files are managed with respect to each folder. With this configuration, a user can retrieve a desired file by searching the folders by top-down search or bottom-up search.

Another technique of managing files is to display files and folders by using thumbnail images or icon images, so that the files and the folders can be managed intuitively. For example, Japanese Patent Application Laid-open No. 2006-268295 discloses a conventional user interface that enables a user to visually recognize a relation between thumbnail images, in conjunction with scroll operation by the user. Specifically, icon images of folders that are in the upper layer are displayed in an upper-layer display area of a screen from the left to the right with respect to the screen. Likewise, thumbnail images of files stored in a folder displayed in a specified position among the folders are displayed in a lower-layer display area along a substantially "<" line such that a thumbnail image positioned at a bend of the line is relatively enlarged.

However, in the conventional technology, files are managed with respect to each folder nested in a tree structure. Therefore, more operation is required to access files stored in a folder in a lower layer. Furthermore, a folder corresponding to one node and another folder corresponding to another node are provided in a different layer in the same tree structure. Therefore, it is difficult to intuitively recognize a relation between the folders.

SUMMARY OF THE INVENTION

It is an object of the present invention to at least partially solve the problems in the conventional technology.

According to one aspect of the present invention, there is provided a file management apparatus including a storage unit that stores therein a plurality of pieces of file management information each being associated with at least one file and serving a unit for managing associated file; a first display control unit that displays a plurality of symbol images each corresponding to one piece of the file management information on a display unit in a matrix manner; a receiving unit that receives an instruction from a user; and a second display control unit that displays, when the receiving unit receives an instruction for selecting one of the symbol images displayed on the display unit, a first thumbnail image of a file on the display unit, the first thumbnail image being stored in association with a piece of the file management information corresponding to selected symbol image, and displays, when the receiving unit receives a shift instruction for shifting upward, downward, to the left, or to the right while the first thumbnail image is displayed on the display unit, a second thumbnail image of a file on the display unit instead of the first thumbnail image, the second thumbnail image being stored in association with a piece of the file management information corresponding to a symbol image placed in a direction indicated by the shift instruction from the selected symbol image.

Furthermore, according to another aspect of the present invention, there is provided a method of managing a file in a file management apparatus including a storage unit that stores therein a plurality of pieces of file management information each being associated with at least one file and serving a unit for managing associated file. The method includes first displaying including displaying a plurality of symbol images each corresponding to one piece of the file management information on a display unit in a matrix manner; receiving an instruction from a user; and second displaying including displaying, when an instruction for selecting one of the symbol images displayed on the display unit is received at the receiving, a first thumbnail image of a file on the display unit, the first thumbnail image being stored in association with a piece of the file management information corresponding to selected symbol image, and displaying, when a shift instruction for shifting upward, downward, to the left, or to the right is received at the receiving while the first thumbnail image is displayed on the display unit, a second thumbnail image of a file on the display unit instead of the first thumbnail image, the second thumbnail image being stored in association with a piece of the file management information corresponding to a symbol image placed in a direction indicated by the shift instruction from the selected symbol image.

Moreover, according to still another aspect of the present invention, there is provided a computer program product including a computer-usable medium having computer-readable program codes embodied in the medium for managing a file in a file management apparatus including a storage unit that stores therein a plurality of pieces of file management information each being associated with at least one file and serving a unit for managing associated file. The program codes when executed cause a computer to execute first displaying including displaying a plurality of symbol images each corresponding to one piece of the file management information on a display unit in a matrix manner; receiving an instruction from a user; and second displaying including displaying, when an instruction for selecting one of the symbol images displayed on the display unit is received at the receiving, a first thumbnail image of a file on the display unit, the first thumbnail image being stored in association with a piece of the file management information corresponding to selected symbol image, and displaying, when a shift instruction for shifting upward, downward, to the left, or to the right is received at the receiving while the first thumbnail image is displayed on the display unit, a second thumbnail image of a file on the display unit instead of the first thumbnail image, the second thumbnail image being stored in association with a piece of the file management information corresponding to a symbol image placed in a direction indicated by the shift instruction from the selected symbol image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram of an example of contents of place map information;

FIG. 5 is a schematic diagram of an example of a place map screen;

FIG. 46 is a flowchart of a procedure of a process performed by the file management server and the client terminal shown in FIG. 32 when a user joins a shared place;

DETAILED DESCRIPTION OF THE PREFERRED EMBODIMENTS

Exemplary embodiments of the present invention are explained in detail below with reference to the accompanying drawings. In the following embodiments, the present invention is applied to a file management apparatus such as a personal computer (PC). However, the present invention is not limited to the following embodiments, and can be applied to other information equipments that manage files, such as digital cameras, cell phones, or image processing apparatuses.

Figure 1:
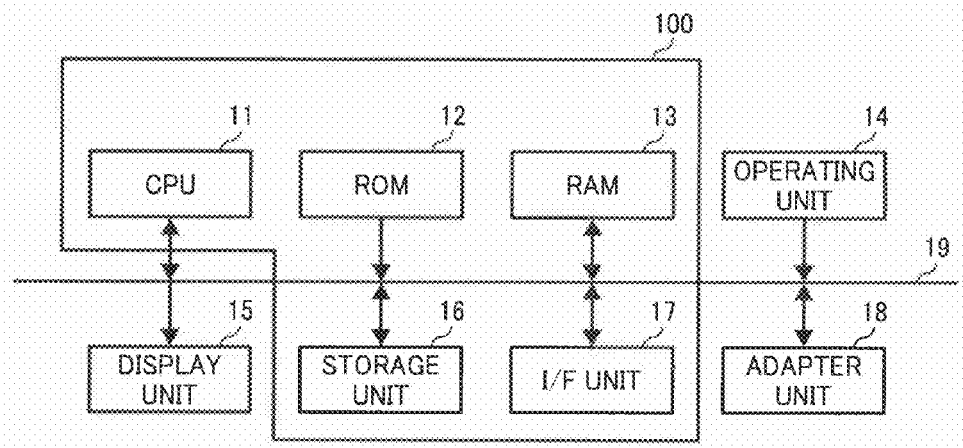
FIG. 1 is a block diagram of a hardware configuration of a file management apparatus according to a first embodiment of the present invention.

FIG. 1 is a block diagram of a hardware configuration of a file management apparatus 100 according to a first embodiment of the present invention. The file management apparatus 100 includes a central processing unit (CPU) 11, a read only memory (ROM) 12, a random access memory (RAM) 13, an operating unit 14 that includes an input device such as a mouse and a keyboard, a display unit 15 that includes a display device such as a liquid crystal display monitor, a storage unit 16 that includes a storage device such as a hard disk drive (HDD), an interface (I/F) unit 17 that controls communication with external devices, an adapter unit 18 to which a removable auxiliary storage device such as a memory card is attached, and a bus 19 that connects the above units to one another. The hardware configuration is realized by typical computers. The operating unit 14, the display unit 15, and the adapter unit 18 are not mandatory for the configuration of the file management apparatus 100, that is, they can be removed from the configuration depending on use environments, usage, or the like.

The ROM 12 and the storage unit 16 store therein various computer programs and various data. The CPU 11 loads the computer programs from the ROM 12 and the storage unit 16 onto the RAM 13, and executes the loaded computer programs to control the file management apparatus 100 and realize various functional units, which will be described later.

The storage unit 16 has a predetermined folder structure for storing therein and managing various setting information used for displaying user interfaces that are support tools for managing files. It is assumed that the file is computerized data such as text data, image data, or video data, and previously stored in a predetermined storage area in the storage unit 16. A storage location of the file is not limited to the storage unit 16. For example, the file can be stored in external devices connected to the file management apparatus 100 via the I/F unit 17, or can be stored in auxiliary storage devices connected to the file management apparatus 100 via the adapter unit 18. Detailed explanation about the setting information stored in the storage unit 16 will be given later.

Figure 2:
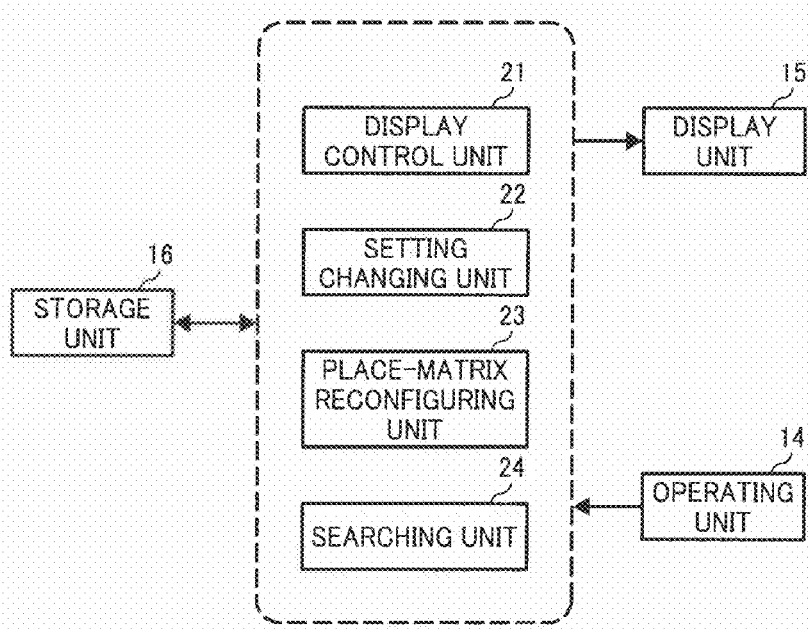
FIG. 2 is a block diagram of a functional configuration of the file management apparatus shown in FIG. 1.

FIG. 2 is a block diagram of a functional configuration of the file management apparatus 100. The file management apparatus 100 includes a display control unit 21, a setting changing unit 22, a place-matrix reconfiguring unit 23, and a searching unit 24, as functional units realized by executing computer programs stored in the ROM 12 and the storage unit 16 by the CPU 11.

The display control unit 21 reads various setting information from the storage unit 16, and displays user interfaces (GUI) to be used as support tools for managing files on the display unit 15 based on the setting information. Explanation about the user interfaces displayed by the display control unit 21 is given below.

Figure 3:
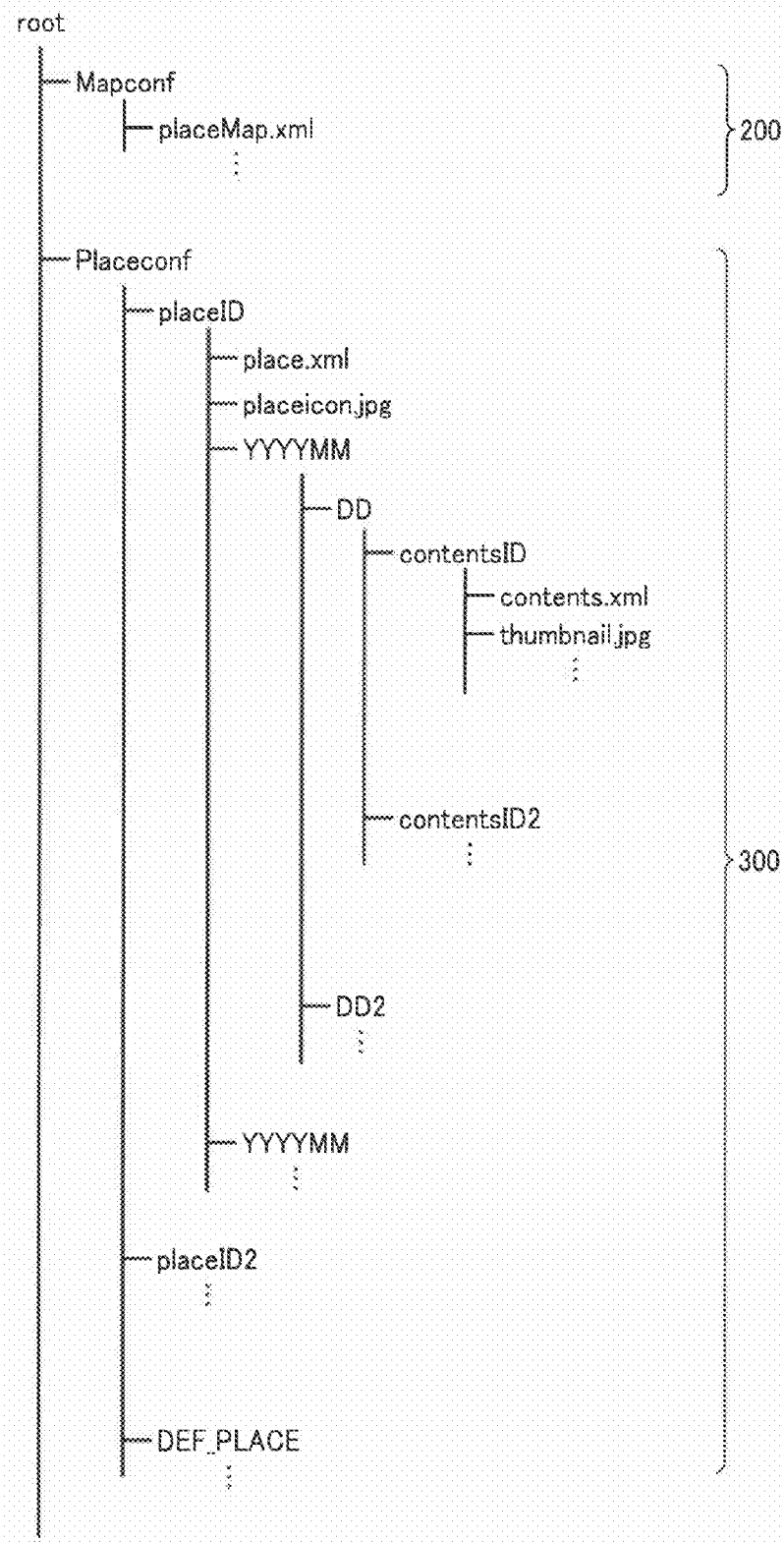
FIG. 3 is a diagram of an example of a folder structure for storing setting information.

The folder structure for storing the setting information constructed in the storage unit 16 and used for displaying the user interfaces is described below with reference to FIG. 3. The storage unit 16 has a tree folder structure for storing the setting information as shown in FIG. 3. The folder structure is constituted of a map managing section 200 and a place managing section 300. The map managing section 200 is used for storing therein setting information about displaying a place map screen. The place managing section 300 is used for storing therein setting information about a place. The place map screen and the place will be described in detail later.

The map managing section 200 contains a "Mapconf" folder that serves as a root folder of the map managing section 200. The "Mapconf" folder stores therein setting information about displaying the place map screen (placeMap.xml). The "placeMap.xml" is described below with reference to FIGS. 4 and 5.

FIG. 4 is a schematic diagram of an example of contents of the "placeMap.xml". The "placeMap.xml" is written in XML format (see the first row in the "placeMap.xml"). The "placeMap.xml" contains a plurality of layer settings 201. Each of the layer settings is constituted of a start tag <layer name="X", tag="Y"> and an end tag </layer>. It is assumed here that each of "X" and "Y" is substituted for null or arbitrary character string. A tag on the second line of the "placeMap.xml" contains "updateTime" indicating previous date and time at which the "placeMap.xml" was updated, and "preCurrentID" indicating a place name of a place that was operated at the last of a previous operation. The "placeMap.xml" corresponds to arrangement information. Hereinafter, the "placeMap.xml" is referred to as place map information.

The display control unit 21 sequentially reads the layer settings 201 contained in the place map information, and displays a user interface as shown in FIG. 5 (hereinafter, "place map screen") on the display unit 15 based on setting content of each of the layer settings 201. Specifically, the display control unit 21 sequentially displays a layer (hereinafter, referred to as "area L" as appropriate) corresponding to each of the layer settings 201, from an upper portion of the place map screen in order of position of the layer settings 201 contained (stored) in the place map information. That is, the order of the layer settings 201 contained in the place map information corresponds to a drawing position (display position) of a layer. In other words, the layer settings 201 (the second file management information) define drawing positions of layers (display positions) on the display unit 15. According to the first embodiment, layers are displayed in multiple stages based on the order of the layer settings 201 as the second file management information, in a matrix as will be described later. However, a display style is not limited to the matrix as long as correspondence between the layer settings 201 and the drawing positions (display positions) on the display unit 15 is assured.

If a layer name is registered in the layer setting 201, that is, if arbitrary character string is registered instead of "X" in "layer name="X"", the display control unit 21 draws the character string in the layer name area L1 arranged in the corresponding layer. For example, in the layer setting 201 at the second highest position in the example shown in FIG. 4, "Favorite" is registered in the layer name. In this case, as shown in FIG. 5, the display control unit 21 draws "Favorite" in the layer name area L1 arranged on the second layer corresponding to the layer setting 201 at the second highest position. If "X" is null, that is, if no character string is registered as the layer name, it is possible to display character string indicating an unregistered state (e.g., "untitled"), or null (no display). It is also possible not to display the layer on the display unit 15. However, if some character string is registered as the layer name, it is preferable to always display the layer name in the layer name area L1.

Each of the layer settings 201 contains a plurality of tags <place ID="Z"> as shown in FIG. 4 (hereinafter, "place setting 202"). It is assumed here that "Z" is substituted for null or arbitrary character string. Each of the place settings 202 corresponds to a place (hereafter, referred to as "area P" as appropriate) that is arranged in a panel and corresponds to a first symbol image, as shown in FIG. 5. The places are displayed in association with a layer corresponding to the layer setting 201 that contains the place settings 202 of those places. The display control unit 21 sequentially reads and draws the places each corresponding to one of the place settings 202, from left to write on the place map screen, in order of position of the place settings 202 in the layer setting 201. That is, the order of the place settings 202 contained in the layer setting 201 defines a drawing position of each of the places (display position) on the place map screen.

If a place name is registered in the place setting 202, that is, if arbitrary character string is registered instead of "Z" in "place ID="Z"", the display control unit 21 draws the character string in a corresponding place. For example, in the layer setting 201 at the second highest position in the example shown in FIG. 4, "My Place" is registered in the place setting 202 on the second line. In this case, as shown in FIG. 5, the display control unit 21 displays "My Place" on a place arranged in the middle of the second layer, that is, the place corresponding to the layer setting 201 at the second highest position and the place setting 202 on the second line.

If "Z" is null, that is, if no place name is registered, it is possible to display character string indicating an unregistered state (e.g., "New Place!"), or display null (no display). Furthermore, if an icon image is registered in association with the place setting 202 as will be described later, the display control unit 21 displays the icon image on a corresponding place.

The layer setting 201 contains "tag="Y"" in which a layer attribute entered by a user via the operating unit 14 is registered. The layer attribute is an index that characterizes each of the layers (the layer settings 201). For example, as shown in the layer setting 201 at the second highest position in the example shown in FIG. 4, arbitrary character string such as "Favorite" and "Photo" can be registered instead of "Y" in the "tag="Y"". The layer attribute registered in the layer is inherited to places contained in that layer, and functions as a master attribute shared by all the places. Explanation about registration of the layer attribute will be given later.

Assuming that the place map information in the initial state contains a plurality of layer settings (e.g., three) in which layer names and layer attributes are not registered. Furthermore, assuming that each of the layer settings in the initial state contains the same number of place settings (more than one (e.g., three)), in which place names and place attributes are not registered.

Returning to the explanation of FIG. 3, the place managing section 300 contains various setting information about the above-described places. The place managing section 300 contains a "Placeconf" folder that serves as a root folder of the place managing section 300. The "Placeconf" folder contains "place ID" folders (placeID1, placeID2, . . . ) that are corresponding to file management information and a "DEF_PLACE" folder. The "placeID" folder (the first file management information) is a unit for managing a plurality of files in the same hierarchy.

Each of the "placeID" folders is associated with one of the place settings 202 contained in the place map information of the map managing section 200, so that the corresponding "placeID" folder can be referred to from each of the place settings 202. In other words, each of the layer settings 201 (the second file management information) shown in FIG. 4 is a unit for managing the "placeID" folders (the first file management information). Specifically, when a place name is registered, a "placeID" folder having a folder name identical to the place name is created. Thus, each of the place settings 202 is corresponding to one of the "placeID" folders. When a place name is not registered in the place setting 202, that place setting 202 is associated with the "DEF_PLACE" folder.

The "placeID" folder contains information about files registered in a place displayed based on the place setting 202 corresponding to the same "placeID" folder. Hereinafter, a place displayed based on the place setting 202 corresponding to the "placeID" folder is simply referred to as a corresponding place of the "placeID" folder.

The "placeID" folder contains "place.xml" containing information about a corresponding place of that "placeID" folder. Specifically, a place attribute or comment entered by a user via the operating unit 14 is registered in the "place.xml". The place attribute is an index that characterizes each of places. Arbitrary character string such as words or symbols can be registered as the place attribute. Explanation about registering the place attribute is given below. Hereinafter, "place.xml" is referred to as place information.

The place attribute can be registered independent of the above-described layer attribute. Compared to the layer attribute that functions as a master attribute shared by all the places, the place attribute functions as a sub attribute that is effective only to each of the places. Thus, in the place map screen, each file can be systematically managed using the layer and the place (area P) based on the master attribute and the sub attribute.

A "placeicon.jpg" is an icon image (image data) to be drawn in a place. When displaying a place, the display control unit 21 reads the "placeicon.jpg" stored in each of the "placeID" folders and draws the icon image in the corresponding place. An image to be stored as the icon image can be in arbitrary formats. If an icon image is not registered by a user, it is applicable to display an image of default image data that is provided in advance.

A "YYYYMM" folder indicates a year and a month when a file is registered in the corresponding place. The "YYYYMM" folder is created by the setting changing unit 22 with respect to each year and each month when a file is registered. The "YYYY" represents a year (A.D.) and "MM" represents a month. The "YYYYMM" folder contains a "DD" folder that indicates a day when the file is registered in the corresponding place. The "DD" folder is created by the setting changing unit 22 with respect to each day when a file is registered. In other words, by referring to the "YYYYMM" folder and the "DD" folder, the date when the file is registered in the place can be identified.

The "DD" folder contains a "contentsID" folder corresponding to each of files registered in the corresponding place. It is assumed here that the "contentsID" folder is created with a folder name identical to a file name of the file registered in the corresponding place (except extension). However, the folder name can be others such as a sequence number corresponding to each file.

The "contentsID" folder contains at least "content.xml" that contains information about a file corresponding to the "contentsID" folder, and "thumbnail.jpg" that is a thumbnail image of the file. Specifically, the "content.xml" contains a storage location in which the file corresponding to the "contentsID" folder is actually stored and information about the file such as a file attribute registered in the file, which will be described later. Hereinafter, "content.xml" is referred to as file information.

It is assumed that the thumbnail image of the file is created by executing a predetermined computer program by the CPU 11. A timing of creating the thumbnail image can be arbitrary. For example, it is possible to create the thumbnail image when a user registers the file, or when the "contentsID" folder is accessed. By storing the thumbnail image of an original file in the "contentsID" folder as described above, it is possible to realize a configuration in which only thumbnail images of original files are primary displayed, and the original file is secondary displayed depending on a request from a user.

The "DEF_PLACE" folder contains setting information about a place in an unregistered state that is a state in which a place attribute and a file are not registered. The "DEF_PLACE" folder stores therein the setting information by using the same structure as that of the "placeID" folder described above. However, in the "DEF_PLACE" folder, the place information does not contain a place attribute, and an "YYYYMM" folder and its subordinate folders are not provided.

When a place is specified from the place map screen by a user via the operating unit 14, the display control unit 21 reads a thumbnail image from each of the "contentsID" folders stored in the "placeID" folder corresponding to the specified place, and displays a list of the thumbnail images on the display unit 15. Hereinafter, a screen for displaying the list of the thumbnail images on the display unit 15 is referred to as a place view screen.

Figure 6:
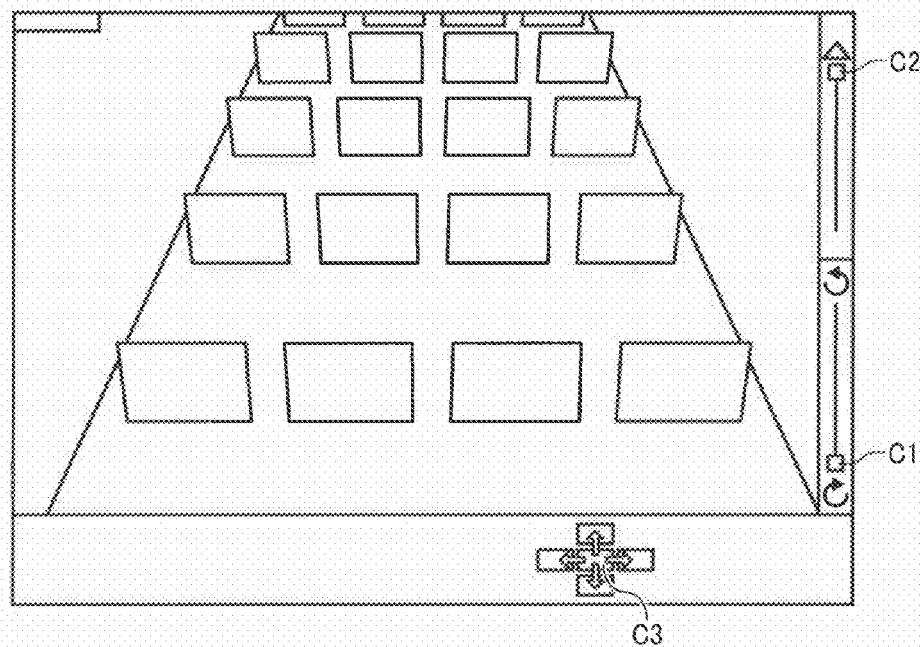
FIG. 6 is a schematic diagram of an example of a place view screen.

FIG. 6 is a schematic diagram of an example of the place view screen displayed on the display unit 15. This example depicts one display mode in which thumbnail images read from corresponding "contentsID" folders are arranged three-dimensionally. The display control unit 21 sequentially reads and draws thumbnail images stored in corresponding "contentsID" folders in order from the oldest to the latest by referring to the "DD" folder and the "YYYYMM" folder that represent the date when each of the files is registered. Consequently, the thumbnail images of the files registered in the corresponding place are displayed in chronological order. In the example shown in FIG. 6, the thumbnail images are arranged in chronological order from the left to the right with respect to each line. Furthermore, the thumbnail images are sequentially arranged from the right corner on the nearest line to the left corner on the farthest line. Therefore, chronological relations among the thumbnail images can be indicated from the nearest line toward the farthest line.

In the place view screen shown in FIG. 6, if a cursor C1 is moved upward by a user via the operating unit 14, the display control unit 21 moves arrays of the thumbnail images such that thumbnail images on farther lines are scrolled in the place view screen. Consequently, temporally newer thumbnail images are displayed in the place view screen. Similarly, if the cursor C1 is moved downward by a user via the operating unit 14, the display control unit 21 moves arrays of the thumbnail images such that thumbnail images on nearer lines are scrolled in the place view screen. Consequently, temporally older thumbnail images are displayed in the place view screen. Although it is assumed in the first embodiment that temporally older thumbnail images are arranged on nearer lines, it is possible to arrange temporally newer thumbnail images on nearer lines.

A cursor C2 is used for changing a display angle of thumbnail images. If the cursor C2 is moved upward, the display control unit 21 changes a view point (a depression angle) for displaying arrays of thumbnail images in a horizontal direction in proportion to the amount of move of the cursor C2, so that the display angle is changed. On the other hand, if the cursor C2 is moved downward, the display control unit 21 changes a view point (a depression angle) for displaying arrays of thumbnail images in a perpendicular direction in proportion to the amount of move of the cursor C2, so that the display angle is changed. At this state, the display control unit 21 changes an elevation angle of each of the thumbnail images so that each of the thumbnail images faces the view point along with movement of the view point.

A cursor C3 is an operating unit for changing a place to be displayed on the place view screen (a place to be a display target). If the cursor C3 is moved to the left or to the right with respect to the screen via the operating unit 14, the display control unit 21 changes the display target to a place arranged, in the place map screen, on the left side or on the right side of a place currently displayed in the place view screen, according to the move of the cursor C3. Then, the display control unit 21 displays, in the place view screen, thumbnail images in corresponding "contentsID" folders stored in the "placeID" folder corresponding to the place specified as a new display target. Similarly, if the cursor C3 is moved upward or downward with respect to the screen via the operating unit 14, the display control unit 21 changes the display target to a place arranged, in the place map screen, on the upside or on the downside of the place currently displayed in the place view screen. Then, the display control unit 21 displays, in the place view screen, thumbnail images in corresponding "contentsID" folders stored in the "placeID" folder corresponding to the place specified as the new display target. Detailed explanation about changing of the place view screen using the cursor C3 will be given in a second embodiment of the present invention.

The display mode of the place view screen is not limited to the example shown in FIG. 6. For example, thumbnail images can be arranged two-dimensionally, or can be displayed with information about files contained in the "content.xml".

Figure 7:
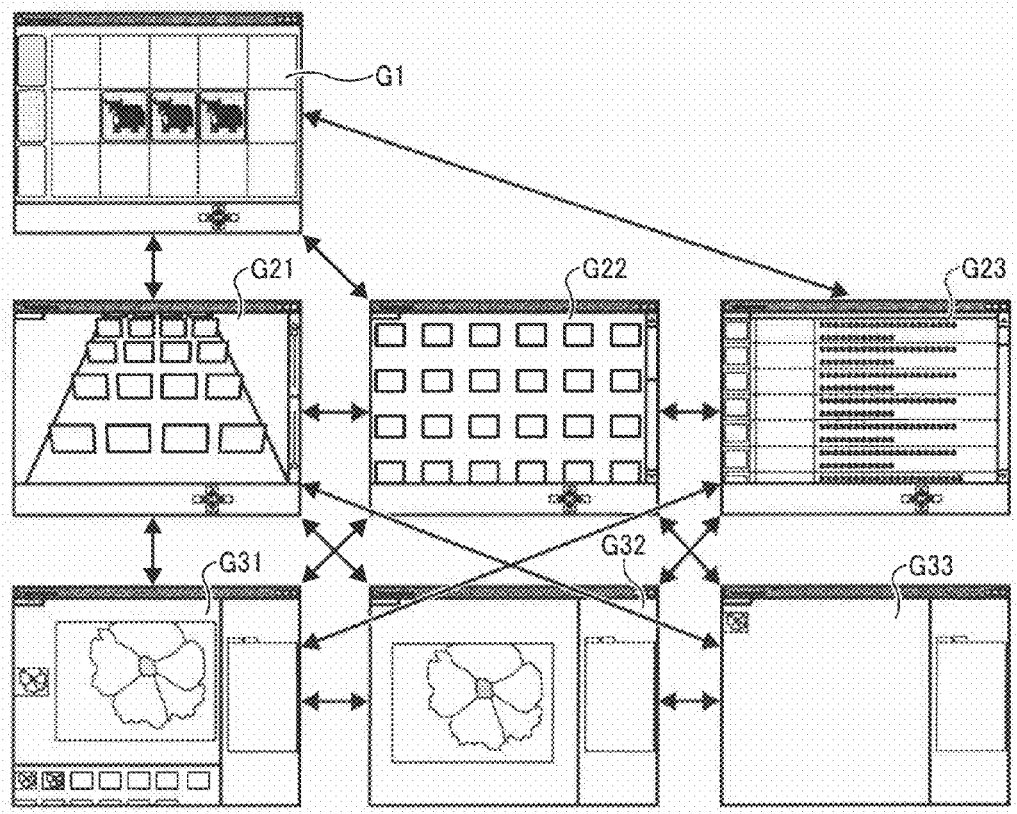
FIG. 7 is a schematic diagram for explaining how interface screens are switched to one another.

FIG. 7 is a schematic diagram for explaining how user interface screens displayed by the display control unit 21 are switched from one to the other. In this example, G1 denotes a place map screen, and G21 to G23 denote the place view screens in different display modes in which a place specified from the place map screen G1 is displayed. Arrows shown in the example indicate relationships of switching of the screens from one to the other. Explanation in connection with reference symbols G31 to G33 will be given later.

When a place is specified from the place map screen G1 by a user via the operating unit 14, the display control unit 21 displays the specified place in one of the place view screens G21 to G23.

The place view screen G21 is in a display mode for arranging thumbnail images three-dimensionally as described in connection with FIG. 6. The place view screen G22 is in a display mode for arranging thumbnail images two-dimensionally in chronological order from left to right and from top to bottom with respect to the screen. The place view screen G23 is in a display mode for displaying thumbnail images with file information of files corresponding to the thumbnail images, respectively, in chronological order from top to bottom with respect to the screen. The place view screens G21 to G23 (display modes) can be selectively changed from one to the other by a user via the operating unit 14. That is, the display control unit 21 selectively changes the place view screens G21 to G23 depending on a request received from a user via the operating unit 14.

Upon receiving a request for displaying a file (a thumbnail image) specified from among files displayed on the place view screen by a user via the operating unit 14, the display control unit 21 refers to a storage location stored in the file information of the specified thumbnail image, reads an original file corresponding to the specified thumbnail image from the storage location, and then displays the read original file on the display unit 15. Hereinafter, a screen for displaying the file on the display unit 15 is referred to as a file view screen.

The file view screen is described with reference to FIG. 7. In this example, G31 to G33 denote the file view screens in different display modes for displaying a file when a thumbnail image is specified from the place view screen.

The file view screen G31 is in a display mode for displaying both the specified file and thumbnail images of all the files stored in the same place. The file view screen G31 is configured such that, when the specified file contains a plurality of pages, thumbnail images of the pages are displayed on the left side of the screen. Thumbnail images of pages can be stored in advance in the "contentsID" folder, or can be created every time an original file is read.

The file view screens G32 and G33 are in display modes for displaying only the specified file without displaying thumbnail images of other files. The file view screen G32 displays pages one by one from the specified file. The file view screen G33 displays a list of thumbnail images of all pages contained in the specified file. The thumbnail image of each page can be stored in advance in the "contentsID" folder, or can be created every time an original file is read.

The file view screens G31 to G33 (display modes) can be selectively changed from one to the other by a user via the operating unit 14. The display control unit 21 selectively changes the file view screens G31 to G33 depending on a request received from a user via the operating unit 14.

Returning to the explanation of FIG. 2, the setting changing unit 22 changes setting information stored in the storage unit 16 depending on operation content received from a user via the operating unit 14. Operation performed by the setting changing unit 22 is described in detail below.

Figure 8:
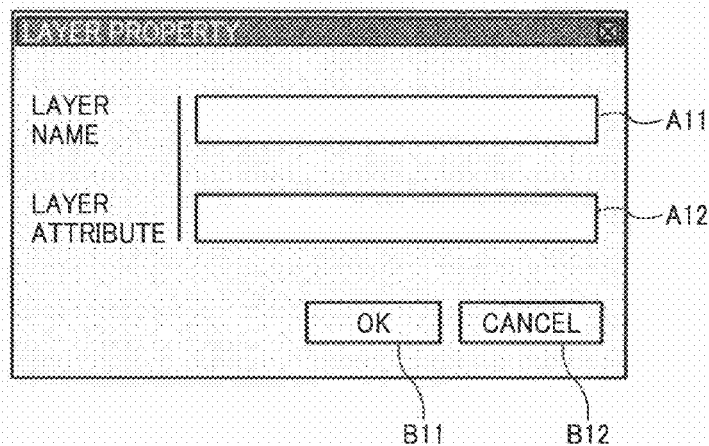
FIG. 8 is a schematic diagram of an example of an entry support screen.

Operation for registering, changing, and deleting a layer name is described below. A user is allowed to register, change, and delete a layer name of a specified layer among layers displayed on the place map screen by using the operating unit 14. Upon receiving a request for registering, changing, or deleting the layer name of the specified layer via the operating unit 14, the setting changing unit 22 displays an entry support screen as shown in FIG. 8 with respect to the layer which is requested to register, change, or delete the layer name. In the example shown in FIG. 8, an area A11 is used for entering a layer name, and an area A12 is used for entering a layer attribute, which will be described later. When a button B11 is pressed by the user, character string entered in the areas A11 and A12 are sent to the setting changing unit 22. On the other hand, when a button B12 is pressed by the user, the setting changing unit 22 closes the entry support screen. A configuration of the entry support screen is not limited to the example shown in FIG. 8.

When the user enters the layer name and presses the button B11 in the entry support screen shown in FIG. 8, the setting changing unit 22 writes the layer name entered in the area A11 over "X" in the layer setting 201 (layer name="X") corresponding to the layer specified by the user. If null is entered in the area A11, the layer name is deleted. There can be a configuration in which, when a layer name is already registered, the layer name is read from the layer setting 201 (layer name="X") of the specified layer and the read layer name is displayed in the area A11.

Furthermore, a user is allowed to delete a specified layer from among layers displayed on the place map screen. Upon receiving a request for deleting the specified layer via the operating unit 14, the setting changing unit 22 deletes the layer setting 201 corresponding to the specified layer from the place map information stored in the map managing section 200.

Operation for registering, changing, and deleting a layer attribute is described below. A user is allowed to register, change, and delete a layer attribute of a specified layer among layers displayed on the place map screen by using the operating unit 14. Upon receiving a request for registering, changing, or deleting the layer attribute of the specified layer via the operating unit 14, the setting changing unit 22 displays the entry support screen as shown in FIG. 8 with respect to the specified layer.

When the user enters the layer attribute and presses the button B11 in the entry support screen shown in FIG. 8, the setting changing unit 22 writes the character string entered in the area A12 over "Y" in the layer setting 201 (tag="Y") corresponding to the layer specified by the user, among the place map information stored in the map managing section 200. If null is entered in the area A12, the layer attribute is deleted. There can be a configuration in which, when a layer attribute is already registered, the layer attribute is read from the layer setting 201 (tag="Y") of the specified layer and the read layer attribute is displayed in the area A12.

Operation for registering, changing, and deleting a place name is described below. A user is allowed to register, change, and delete a place name of a specified place among places displayed on the place map screen by using the operating unit 14. Upon receiving a request for registering, changing, or deleting the place name of the specified place via the operating unit 14, the setting changing unit 22 displays an entry support screen as shown in FIG. 9 with respect to the specified place.

Figure 9:
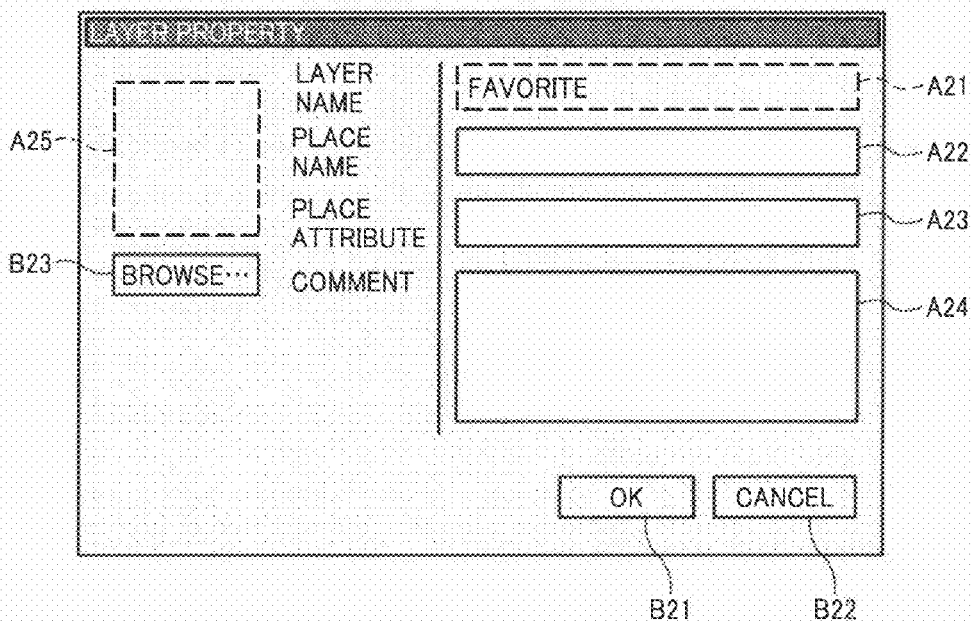
FIG. 9 is schematic diagram of another example of an entry support screen.

In the example shown in FIG. 9, an area A21 is used for displaying a layer name of a layer in which the specified place is contained. Specifically, a layer name read from the layer setting (layer name="X") associated with the place setting of the specified place is displayed in read-only mode in the area A21. An area A22 is used for entering a place name, an area A23 is used for entering a place attribute, and an area A24 is used for entering arbitrary character string as comments or the like to be associated with the place.

A "browse" button B23 is used for displaying a support screen for selecting an icon image to be registered, which will be described later. When a button B21 is pressed by the user, contents entered and set in the entry support screen are sent to the setting changing unit 22. On the other hand, when a button B12 is pressed by the user, the setting changing unit 22 closes the entry support screen. A configuration of the entry support screen is not limited to the example shown in FIG. 9.

When the user enters the place name and presses the button B21 in the entry support screen shown in FIG. 9, the setting changing unit 22 writes the place name entered in the area A21 over "Z" in the place setting 202 (place ID="Z") corresponding to the place specified by the user. Furthermore, the setting changing unit 22 creates a "placeID" folder whose folder name is identical to the place name entered in the area A22, in a "Placeconf" folder.

When the place name is changed, the "placeID" folder having the folder name identical to the place name before being changed is renamed to the changed place name. If null is entered in the area A22, which indicates that the layer attribute is deleted, the setting changing unit 22 deletes the "placeID" folder having the folder name identical to the place that is to be deleted. There can be a configuration in which, when a place name is already registered, the place name is read from the place setting 202 (place ID="Z") of a specified place and the read place name is displayed in the area A22.

When a place name is not registered while a file is registered in the same place, the setting changing unit 22 writes a predetermined place name (e.g., "No Name") over "Z" in the place setting 202 (place ID="Z") and creates a "placeID" folder with a folder name identical to the predetermined place name in the "Placeconf" folder. This is because a place having no place name and containing a registered file can be distinguished from a place having neither a place name nor a registered file. The setting changing unit 22 performs exclusive control to prevent redundant place names from being contained.

Operation for registering, changing, and deleting a place attribute is described below. A user is allowed to register, change, and delete a place attribute of a specified place among places displayed on the place map screen by using the operating unit 14. Upon receiving a request for registering, changing, or deleting the place attribute of the specified place via the operating unit 14, the setting changing unit 22 displays the entry support screen as shown in FIG. 9 on the display unit 15.

When the user enters the place attribute and presses the button B21 in the entry support screen shown in FIG. 9, the setting changing unit 22 creates place information (place.xml) in the "placeID" folder corresponding to the specified place, and writes the character string entered in the area A23 as the place attribute in the place information. If null is entered in the area A23, the place attribute is deleted. There can be a configuration in which, when a place attribute is already registered in the place information of the specified place, the place attribute is read from the place information and the read place attribute is displayed in the area A23.

Furthermore, when character string is entered in the area A24 and the button B21 is pressed in the entry support screen shown in FIG. 9, the setting changing unit 22 writes the character string entered in the area A24 as a comment in the corresponding place information. If null is entered in the area A24, the comment is deleted. There can be a configuration in which, when a comment is already registered in the place information of the specified place, the comment is read from the place information and the read comment is displayed in the area A24.

Operation for registering an icon image is described below. A user is allowed to register an icon image in a specified place among places displayed on the place map screen by using the operating unit 14. Upon receiving a request for registering the icon image in the specified place via the operating unit 14, the setting changing unit 22 displays the entry support screen as shown in FIG. 9.

When the user presses the button B23 in the entry support screen shown in FIG. 9, the setting changing unit 22 displays a support screen for selecting an icon image on the display unit 15. When an icon image is selected from the support screen by the user via the operating unit 14, the setting changing unit 22 reads the selected icon image from a storage location thereof and displays the read image in an area A25.

When the user specifies the icon image and presses the button B21 in the entry support screen shown in FIG. 9, the setting changing unit 22 copies the specified icon image to the "placeID" folder of the specified place, and stores that icon image as "placeicon.jpg" in the "placeID" folder. There can be a configuration in which, when an icon image is already stored in the "placeID" folder corresponding to the specified place, the icon image is read from the "placeID" folder and the read icon image is displayed in the area A25.

Operation for registering and deleting a file is described below. A user is allowed to register one or more files in a specified place having a registered place name among places displayed on the place map screen. Here, "registering files in a place" means that those registered files are managed with respect to the place. The files can be registered by using arbitrary methods. For example, one or more files can be registered in a place by drag and drop. The files can be registered by a request for registering from the place view screen described below.

Upon receiving a request for registering a file in a specified place, the setting changing unit 22 creates a "YYYYMM" folder whose folder name denoting current year and month in the "placeID" folder corresponding to the specified place. Then, the setting changing unit 22 creates a "DD" folder whose folder name denoting current day in the "YYYYMM" folder.

The setting changing unit 22 creates, in the created "DD" folder, "contentsID" folders with folder names identical to file names of registered files, respectively. Then, the setting changing unit 22 stores, in each of the "contentsID" folders, file information (content.xml) containing at least a storage location of a corresponding file, and a thumbnail image created from the corresponding file. Time information (year and date) is obtained by a timing unit (not shown) that counts year and date through counting of time. It is assumed in the first embodiment that an actual contents of a file is stored in a different storage area. However, the actual contents of the registered file can be stored in the corresponding "contentsID" folder.

Upon receiving the request for deleting a specified file registered in the place via the operating unit 14, the setting changing unit 22 deletes the "contentsID" folder corresponding to the specified file from the "placeID" folder corresponding to the place.

Operation for moving a place in the place map screen is described below. A user is allowed to move a place from one position to the other in the place map screen by using the operating unit 14. Upon receiving a request for moving a specified place to a position of another place (a target place) among places displayed on the place map screen, the setting changing unit 22 exchanges a position of the place setting of the specified place with a position of the place setting of the target place in the place map information. Thus, the position of the specified place is moved to the position of the target place.

In this manner, the setting changing unit 22 updates the setting information stored in the storage unit 16 depending on operation content received by the user via the operating unit 14.

Returning to the explanation of FIG. 2, the place-matrix reconfiguring unit 23 changes the number of layers and places contained in a place matrix on the place map screen based on setting content of the place map information changed by the setting changing unit 22, and reconfigures the place matrix according to a predetermined rule (hereinafter, "neighborhood rule"). Here, the "place matrix" means a matrix of places in multiple-stage layers in the place map screen. Operation for reconfiguring a place matrix due to addition, deletion, and move of a place is described below.

Operation for expanding a place matrix due to registration of a place name is described below. When a place name is registered by the setting changing unit 22, the place-matrix reconfiguring unit 23 determines whether a place whose place name has been just registered is on an edge of the place matrix. Specifically, the place-matrix reconfiguring unit 23 determines whether the place setting corresponding to the place whose place name has been just registered is contained in either the highest position or the lowest position in the layer setting, or whether the layer setting containing that place setting is contained in either the highest position or the lowest position in the place map information. Consequently, the place-matrix reconfiguring unit 23 determines whether the place whose place name has been just registered is on the edge of the place matrix. Hereinafter, the above-described determination is referred to as "edge determination".

Upon performing the edge determination and determining that the place whose place name has been just registered is on the edge of the place matrix, the place-matrix reconfiguring unit 23 expands the place matrix by adding a layer (a place row) or a place column in an unregistered state to an outer portion of the place. Operation performed by the place-matrix reconfiguring unit 23 when a place name is registered is described below with reference to FIGS. 5, and 10 to 12.

Figure 10:
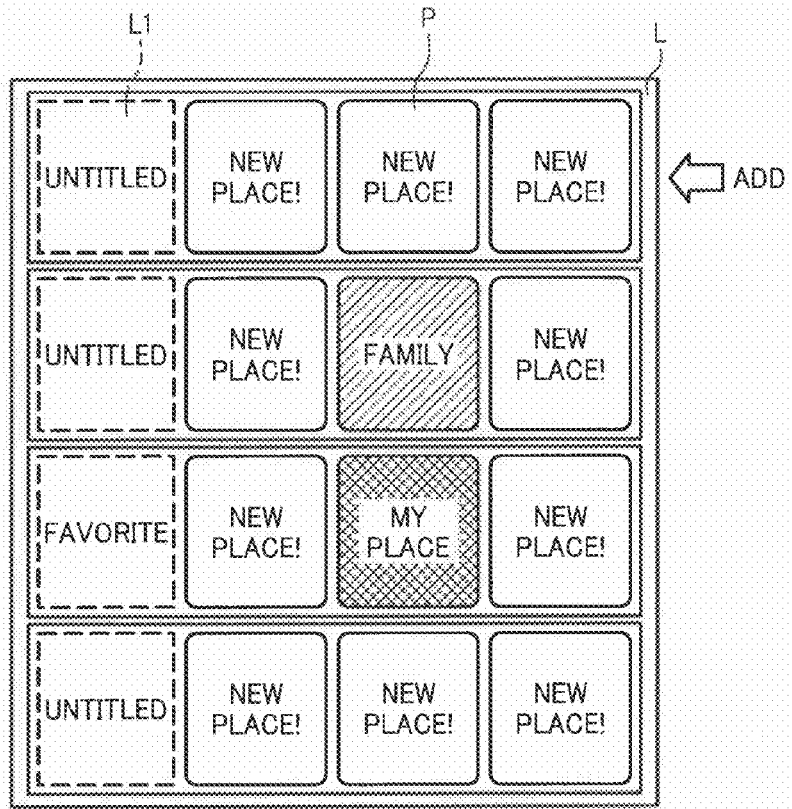
FIGS. 10 to 14 are schematic diagrams for explaining how a place matrix is reconfigured.

FIG. 5 is a schematic diagram of an example of the place map screen containing three layers having three places (areas P), that is, a place matrix with three rows and three columns. Upon receiving a request for registering a place name "Family" in a place in the middle of a top layer via the operating unit 14, the setting changing unit 22 registers the place name in the specified place in the manner described above. Meanwhile, the place-matrix reconfiguring unit 23 performs the edge determination and determines that the place whose place name has been just registered is in the top layer of the place matrix. Therefore, as shown in FIG. 10, the place-matrix reconfiguring unit 23 adds a new layer (place row) above that place.

Specifically, the place-matrix reconfiguring unit 23 adds the layer setting 201 to the highest position, that is, above the layer setting 201 currently at the highest position in the place map information. Consequently, a new layer (place row) is added to a row above the currently top layer containing the place whose place name has been just registered. At this time, the layer setting 201 of the new layer is configured such that the same numbers of the place settings 202 as those in the other layer settings 201 are contained. As a result, a rectangular place matrix is obtained. If a place name is registered in a place in a bottom layer of the place matrix, the place-matrix reconfiguring unit 23 adds the layer setting 201 to the lowest position, that is, below the layer setting 201 currently at the lowest position in the place map information.

Figure 11:
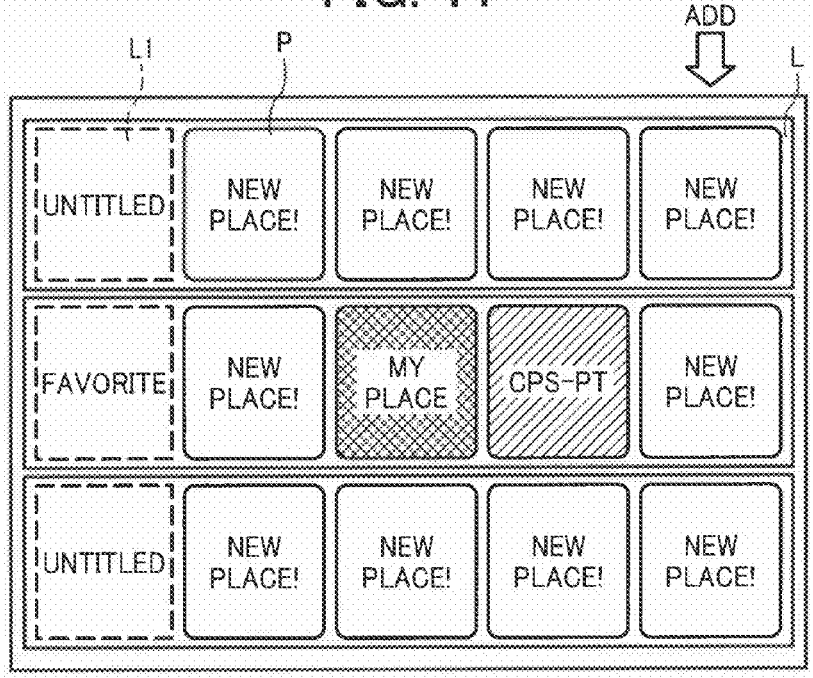

Upon receiving a request for registering a place name in a place on the right edge of any layers in the place matrix shown in FIG. 5, for example, registering a place name "CPS-PT" in a place on the right edge of a middle layer in the place matrix, via the operating unit 14, the setting changing unit 22 registers the place name in the specified place. Meanwhile, the place-matrix reconfiguring unit 23 performs the edge determination and determines that the place whose place name has been just registered is on the right edge of the place matrix. Therefore, as shown in FIG. 11, the place-matrix reconfiguring unit 23 adds a new column (place column) in a column on the right of that place.

Specifically, the place-matrix reconfiguring unit 23 adds the place setting 202 in an unregistered state to the lowest position, that is, below the place setting 202 currently at the lowest position in each of the layer settings 201 in the place map information. Consequently, a new place column is added in a column on the right of the place whose place name has been just registered. If a place name is registered in a place on the left edge of the place in any layers in the place matrix shown in FIG. 5, the place-matrix reconfiguring unit 23 adds the place setting 202 in an unregistered state to the highest position, that is, above the place setting 202 currently at the highest position in each of the layer settings 201 in the place map information.

Figure 12:
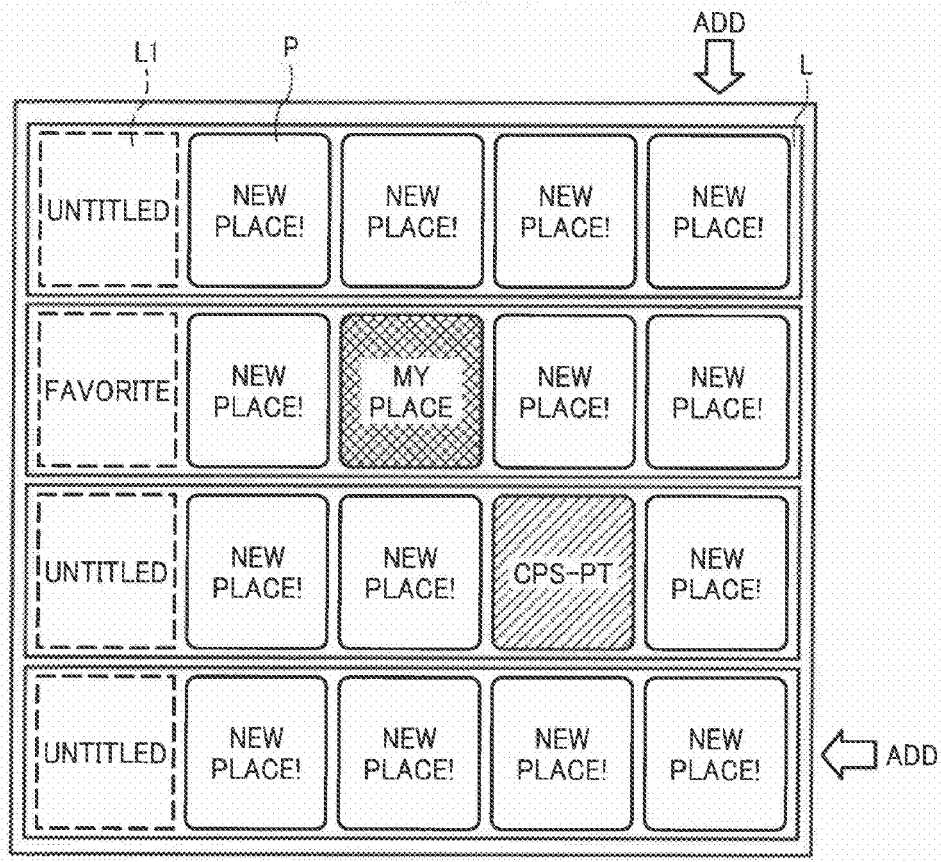

Upon receiving a request for registering a place name in a place at the corner of the place matrix shown in FIG. 5, for example, registering a place name "CPS-PT" in a place on the right edge of the bottom layer in the place matrix, via the operating unit 14, the setting changing unit 22 registers the place name in the specified place. Meanwhile, the place-matrix reconfiguring unit 23 performs the edge determination and determines that the place whose place name has been just registered is at the lower right corner of the place matrix. Therefore, as shown in FIG. 12, the place-matrix reconfiguring unit 23 adds a new layer (place row) below that place and a new place column in a column on the right of that place.

Specifically, the place-matrix reconfiguring unit 23 adds the layer setting 201 in an unregistered state to the lowest position, that is, below the layer setting 201 currently at the lowest position in the place map information, and adds the place setting 202 in an unregistered state to the lowest position, that is, below the place setting 202 currently at the lowest position in each of the layer settings 201 in the place map information.

If a place name is registered in a place at the upper left corner of the place matrix, the place-matrix reconfiguring unit 23 adds the layer setting 201 in an unregistered state to the highest position, that is, above the layer setting 201 currently at the highest position in the place map information, and adds the place setting 202 in an unregistered state to the highest position, that is, above the place setting 202 currently at the highest position in each of the layer settings 201 in the place map information. Furthermore, if a place name is registered in a place at the upper right corner of the place matrix, the place-matrix reconfiguring unit 23 adds the layer setting 201 in an unregistered state to the highest position, that is, above the layer setting 201 currently at the highest position in the place map information, and adds the place setting 202 in an unregistered state to the lowest position, that is, below the place setting 202 currently at the lowest position in each of the layer settings 201 in the place map information. Moreover, if a place name is registered in a place at the lower left corner of the place matrix, the place-matrix reconfiguring unit 23 adds the layer setting 201 in an unregistered state to the lowest position, that is, below the layer setting 201 currently at the lowest position in the place map information, and adds the place setting 202 in an unregistered state to the highest position, that is, above the place setting 202 currently at the highest position in each of the layer settings 201 in the place map information.

In this manner, the place-matrix reconfiguring unit 23 expands the place matrix according to the registration of the place name. Therefore, a user need not perform operation for adding layers or places, and thereby, usability can be improved. Furthermore, the place matrix is reconfigured so that places having no registered place names are arranged on each edge of the place matrix. Therefore, places having registered place names are displayed at around the center of the place matrix. Thus, a display with a high level of visibility can be attained. In the example described above, a layer is automatically added when a place name is registered in a place on the upper edge or the lower edge of the place matrix. Meanwhile, if a user sends a request for adding a layer via the operating unit 14, the layer can be added independent of registration of place names.

Operation for reducing a place matrix due to deletion of a place name is described below. When a place name is deleted from a specified place by the setting changing unit 22, in the place matrix, the place-matrix reconfiguring unit 23 determines whether a place having the registered place name is contained in the same row and the same column of the place.

Specifically, the place-matrix reconfiguring unit 23 identifies, from the place map information, the place setting 202 corresponding to the place whose place name has been just deleted. Then, the place-matrix reconfiguring unit 23 determines whether the place setting 202 with a registered place name is contained in the layer setting 201 containing the identified place setting 202. Furthermore, the place-matrix reconfiguring unit 23 detects a rank of the identified place setting 202 in the layer setting 201, and determines whether a place name is registered in the place setting 202 at the same rank in each of the other layer settings 201. Hereinafter, the above-mentioned processes are collectively referred to as a registration-status determination.

When the place-matrix reconfiguring unit 23 determines that a place having the registered place name is not contained in the place row (layer) or a place column due to the registration-status determination, the place-matrix reconfiguring unit 23 deletes that place row (layer) and that place column from the place matrix. Thus, the place matrix is reduced. Operation performed by the place-matrix reconfiguring unit 23 when the place name is deleted is described below with reference to FIGS. 12 and 13.

Upon receiving a request for deleting a place, for example, a place (CPS-PT) in the third layer and in the second column from the right with respect to the place matrix shown in FIG. 12, the setting changing unit 22 deletes the place name from the specified place. At this state, the setting changing unit 22 performs the registration-status determination and determines that places having registered place names are not contained in both the row and the column containing the place whose place name has been just deleted. Therefore, the setting changing unit 22 deletes the layer corresponding to the row, and places contained in the column, with respect to the specified place. As a result, the place matrix is reduced to the state shown in FIG. 5.

Figure 13:
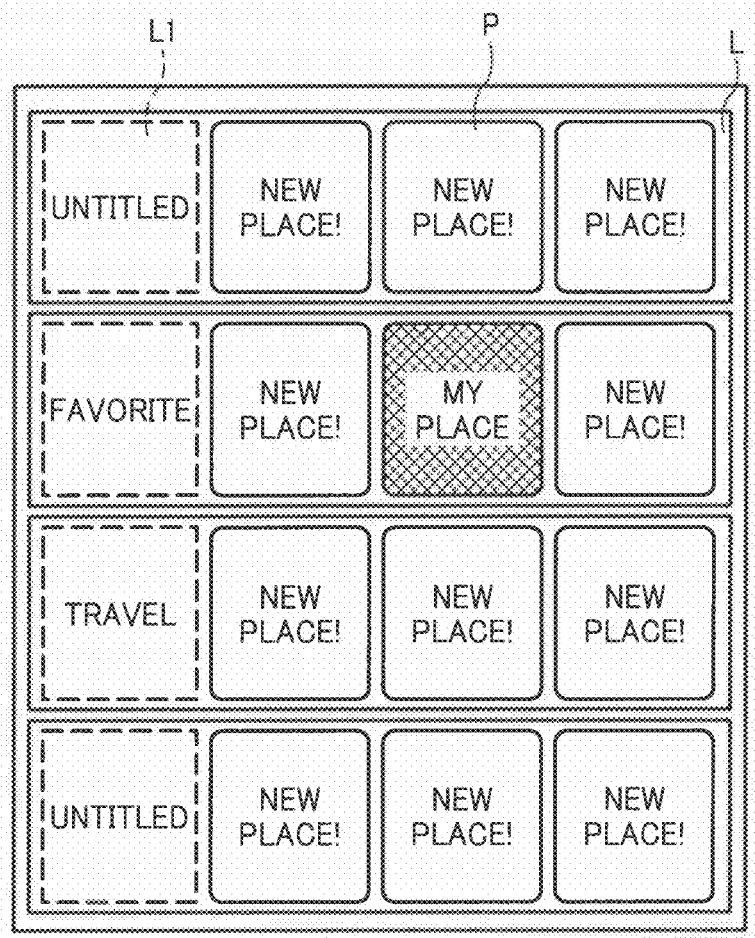

Specifically, the setting changing unit 22 deletes the place setting 202 at the rank detected by the registration-status determination from each of the layer settings 201 in the place map information, and deletes the layer setting 201 of the layer containing the place whose place name has been deleted. There can be a configuration in which a place row containing the place whose place name has been deleted, that is, a layer containing that place, is not deleted when a layer name is registered in that layer, as shown in FIG. 13. Furthermore, another configuration can be employed in which a layer is not deleted regardless of whether a layer name is registered, and maintained until when a user sends a request for deleting that layer. In this case, it is possible to maintain the layer if the layer contains a place whose place name has been registered, until when the place name is deleted.

In this manner, the place matrix is dynamically reconfigured according to deletion of the place name. Therefore, a user need not perform operation for deleing layers or places, and thereby, usability can be improved. Furthermore, it is possible to prevent a situation in which too many places in unregistered states are displayed. As a result, a display with a high level of visibility can be attained.

Operation for expanding and reducing a place matrix due to move of a place is described below. When a place is moved to another position by the setting changing unit 22, the place-matrix reconfiguring unit 23 determines whether a position of the place before move is adjacent to a place on the edge of the place matrix.

Specifically, the place-matrix reconfiguring unit 23 identifies the place setting 202 corresponding to a place before move from the place map information. Then, the place-matrix reconfiguring unit 23 determines whether the identified place setting 202 is either at the second highest position or at the second lowest position in the layer setting 201, and also determines whether the layer setting 201 containing the identified place setting 202 is either at the second highest position or the second lowest position in the place map information.

Consequently, the place-matrix reconfiguring unit 23 determines whether the place before move is adjacent to a place on the edge of the place matrix. Hereinafter, the above-described process is referred to as an adjacency determination.

Upon determining from the adjacency determination that the place before move is adjacent to a place on the edge of the place matrix, the place-matrix reconfiguring unit 23 performs the registration-status determination to determine whether a place having a registered place name is contained in the row and the column containing the place before move. Upon determining from the registration-status determination that a place having the registered place name is not contained in the row and the column, the place-matrix reconfiguring unit 23 deletes the place from the row and the column.

The place-matrix reconfiguring unit 23 determines whether a position of the place after move is on the edge of the place matrix. Upon determining that the position of the place after move is on the edge of the place matrix, the place-matrix reconfiguring unit 23 adds a place row (layer) or a place column in an unregistered state to an outer portion of the place after move. Operation for adding the place row and the place column is the same as that performed when reconfiguring the place matrix according to registration of a place name as described above, and therefore, the same explanation is not repeated. Operation performed by the place-matrix reconfiguring unit 23 when the place is moved is described in detail below with reference to FIGS. 12, 14, and 10.

Figure 14:
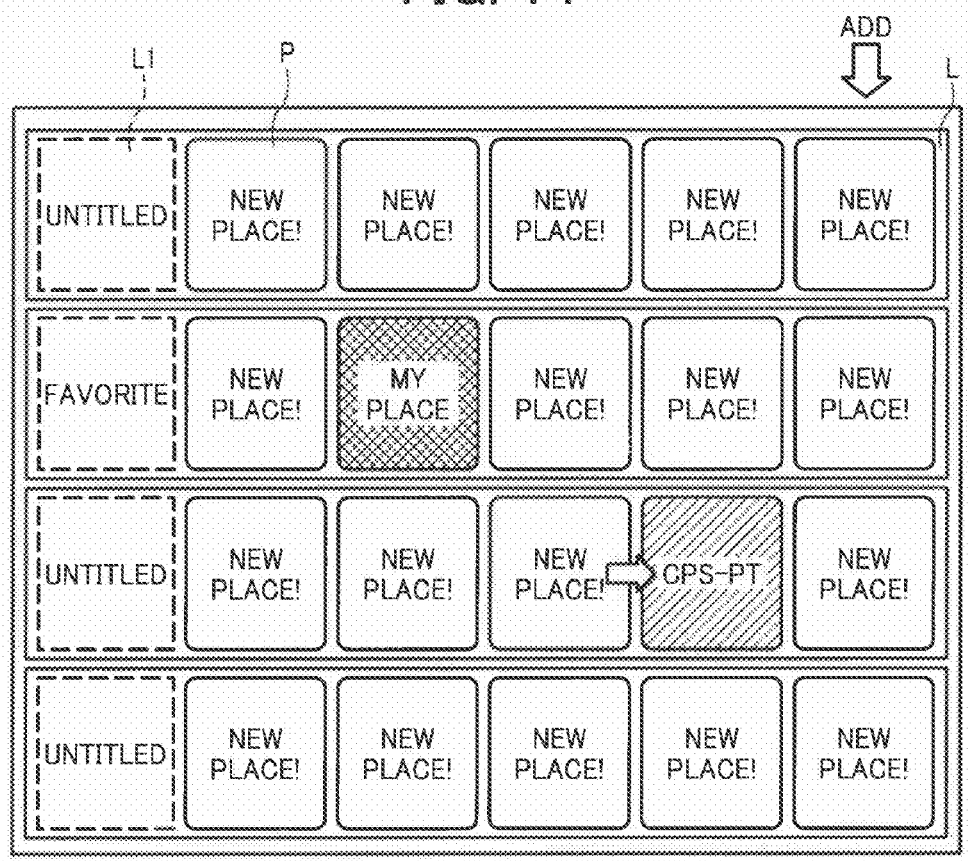

Upon receiving a request for moving a place, for example, a place (CPS-PT) in the third layer and in the second column from the right with respect to the place matrix shown in FIG. 12, to the right side thereof, the setting changing unit 22 exchanges a position of the place setting 202 of the place before move with a position of the place setting 202 of the place after move in the place map information. Consequently, the place is moved to the right side thereof. Meanwhile, the place-matrix reconfiguring unit 23 performs the edge determination and determines that the place after move is on the right edge of the place matrix. Therefore, as shown in FIG. 14, the place-matrix reconfiguring unit 23 adds a new place column in a column on the right of the place after move.

Upon receiving a request for moving a place, for example, a place (CPS-PT) in the third layer and in the second column from the right with respect to the place matrix shown in FIG. 12, to the left side thereof, the setting changing unit 22 exchanges a position of the place setting 202 of the place before move with a position of the place setting 202 of the place after move in the place map information. Consequently, the place is moved to the left side thereof. At this time, the setting changing unit 22 performs the adjacency determination and determines that the place before move is adjacent to a place on the edge of the place matrix and a place having the registered place name is not contained in the place column containing the place before move. Therefore, the setting changing unit 22 deletes the place column containing the place before move. As a result, the place matrix similar to that shown in FIG. 10 is obtained.

In this manner, the place matrix is dynamically reconfigured according to move of a place. Therefore, a user need not perform operation for adding or deleing layers or places, and thereby, usability can be improved. Furthermore, it is possible to prevent a situation in which too many places in unregistered states are displayed. As a result, a display with a high level of visibility can be attained.

Returning to the explanation of FIG. 2, the searching unit 24 searches for a file corresponding to a search key that is character string received as search criteria from a user via the operating unit 14, based on either one of a layer attribute set in each of layers and a place attribute set in each of places.

Specifically, when one or more layers are specified from the place map screen and then a search key is input, the searching unit 24 sets the specified layers as a search area and searches for a file corresponding to the search key from layer attributes of the specified layers and place attributes of places contained in the specified layers. Then, the searching unit 24 displays a list of thumbnail images of files registered both in the places contained in the layers whose layer attributes correspond to the search key and in the places whose place attributes correspond to the search key, on the display unit 15.

Furthermore, when one or more places are specified from the place map screen and then a search key is input, the searching unit 24 sets the specified places as a search area and searches for a file corresponding to the search key from place attributes of the specified places. Then, the searching unit 24 displays a list of thumbnail images of files registered in the places whose place attributes correspond to the search key, on the display unit 15.

Figure 15:
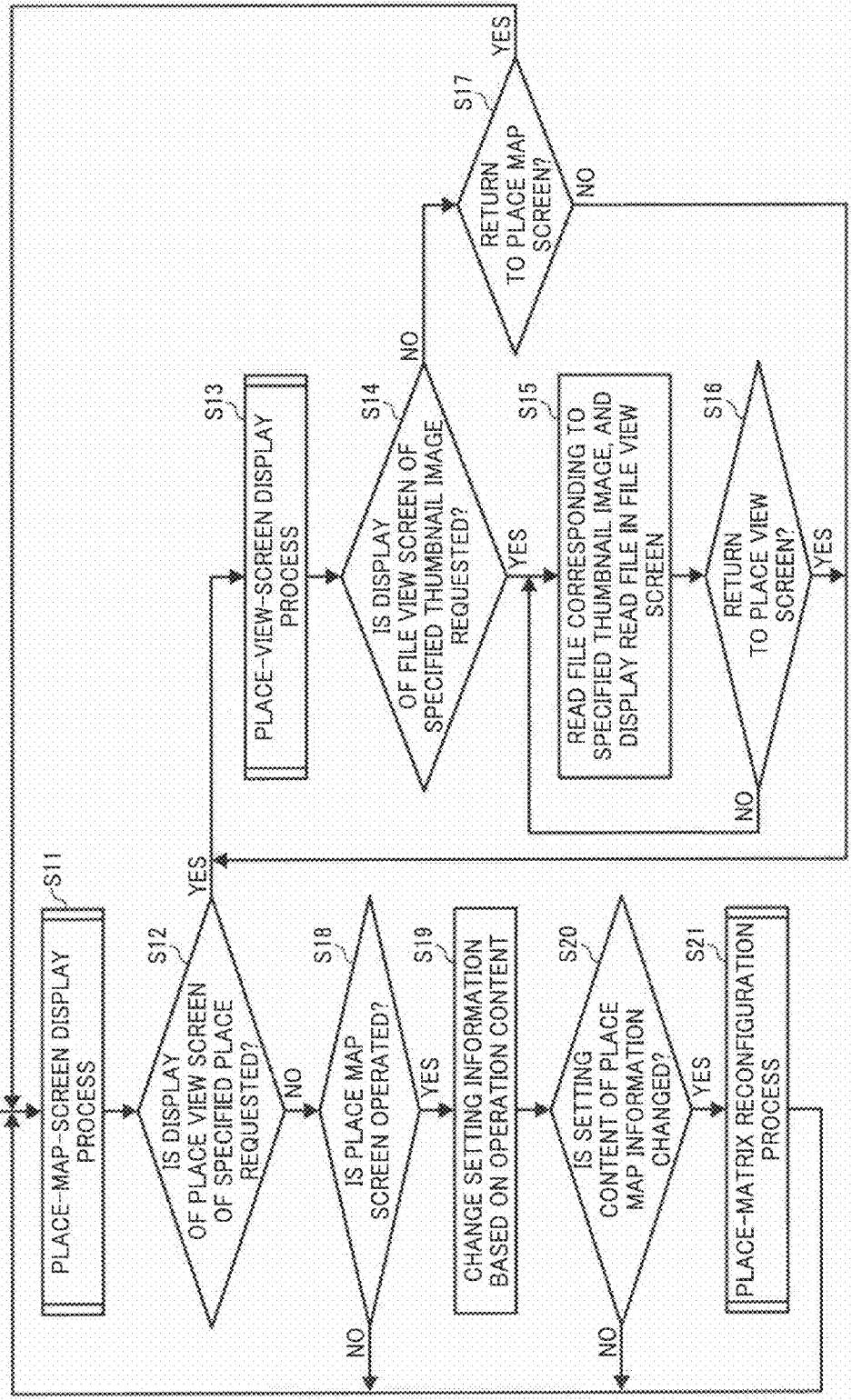
FIG. 15 is a flowchart of a procedure of an entire process performed by the file management apparatus shown in FIG. 1.

An entire operation performed by the file management apparatus 100 is described below. FIG. 15 is a flowchart of a procedure of the entire process performed by the file management apparatus 100. The display control unit 21 refers to the place map information and performs a place-map-screen display process (Step S11). The place-map-screen display process at Step S11 is described in detail below with reference to FIG. 16.

Figure 16:
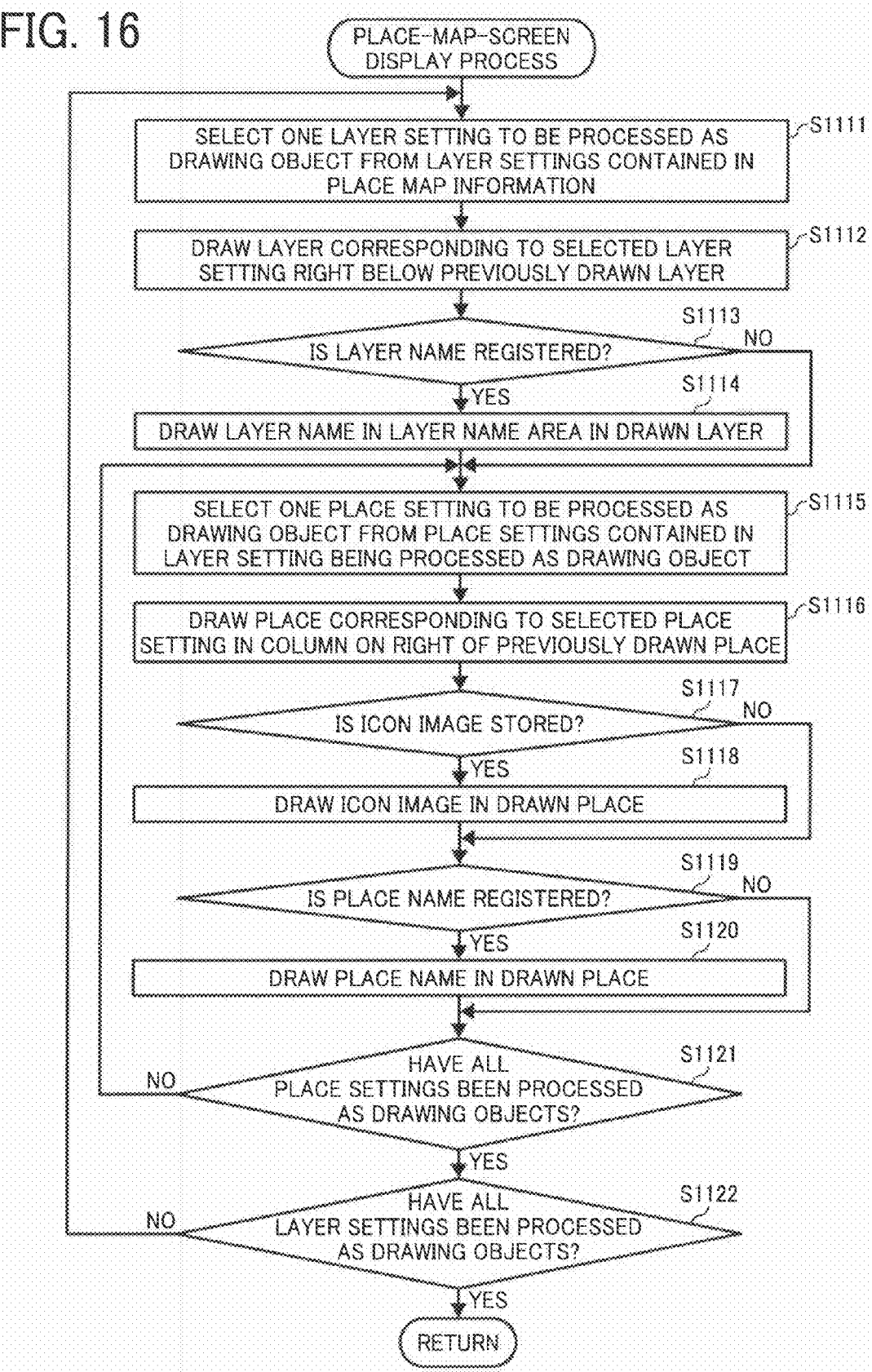
FIG. 16 is a flowchart of a procedure of a place-map-screen display process shown in FIG. 15.

FIG. 16 is a flowchart of a procedure of the place-map-screen display process. The display control unit 21 selects one of the layer settings 201 contained in the place map information, as a drawing object to be processed (Step S1111). According to the first embodiment, it is assumed that the layer settings 201 are sequentially selected in order of position contained in the place map information from the highest to the lowest. However, what order the layer settings 201 are to be selected is not limited to this example.

The display control unit 21 draws a layer corresponding to the layer setting 201 selected at Step S1111 right below a previously drawn layer (Step S1112). At the initial time when no layers are drawn, a layer selected as a drawing object is drawn in a predetermined position in the display screen.

Then, the display control unit 21 determines whether a layer name is registered in the layer setting 201 selected at Step S1111 (Step S1113). When the display control unit 21 determines that the layer name is not registered (No at Step S1113), process control proceeds to Step S1115. On the other hand, upon determining that the layer name is registered (Yes at Step S1113), the display control unit 21 draws the layer name in the layer name area L1 in the layer drawn at Step S1112 (Step S1114), and process control proceeds to Step S1115.

The display control unit 21 selects, as a drawing object to be processed, one of the place settings 202 contained in the layer setting 201 that is being processed as the drawing object (Step S1115). According to the first embodiment, it is assumed that the place settings 202 are sequentially selected in order of position contained (stored) in the layer setting 201 from the highest to the lowest. However, what order the place settings 202 are to be selected is not limited to this example.

The display control unit 21 draws a place corresponding to the place setting 202 selected at Step S1115 in a column on the right of a previously drawn place in the layer drawn at Step S1112 (Step S1116). At the initial time when no places are drawn, a place selected as a drawing object is drawn in a predetermined position in the selected layer.

The display control unit 21 determines whether an icon image is stored in the "placeID" folder corresponding to the place setting 202 that is being processed as the drawing object (Step S1117). When the display control unit 21 determines that the icon image is not stored (No at Step S1117), process control proceeds to Step S1119. On the other hand, upon determining that the icon image is stored (Yes at Step S1117), the display control unit 21 draws the icon image in the place drawn at Step S1116 (Step S1118), and process control proceeds to Step S1119.

Then, the display control unit 21 determines whether a place name is registered in the place setting 202 that is being processed as the drawing object (Step S1119). When the display control unit 21 determines that the place name is not registered (No at Step S1119), process control proceeds to Step S1121. On the other hand, upon determining that the place name is registered (Yes at Step S1119), the display control unit 21 draws the place name in the place drawn at Step S1116 (Step S1120), and process control proceeds to Step S1121.

The display control unit 21 determines whether all the place settings 202 contained in the layer setting 201 that is being processed as the drawing object have been processed (Step S1121). When the display control unit 21 determines that there is the place setting 202 that has not been processed (No at Step S1121), process control returns to Step S1115 for processing the unprocessed place setting 202.

Upon determining that all the place settings 202 contained in the layer setting 201 that is being processed as the drawing object have been processed (Yes at Step S1121), the display control unit 21 determines whether all the layer settings 201 contained in the place map information have been processed (Step S1122). When the display control unit 21 determines that there is the layer setting 201 that has not been processed (No at Step S1122), process control returns to Step S1111 for processing the unprocessed layer setting 201. On the other hand, when the display control unit 21 determines that all the layer settings 201 have been processed (Yes at Step S1122), process control proceeds to Step S12 of FIG. 15.

Returning to the explanation of FIG. 15, the display control unit 21 determines whether a request for displaying the place view screen of a place specified from places displayed on the place map screen is received via the operating unit 14 (Step S12). Upon determining that the request for displaying the place view screen is received (Yes at Step S12), the display control unit 21 refers to the "placeID" folder corresponding to the specified place from the place managing section 300 in the storage unit 16, and performs a place-view-screen display process (Step S13). The place-view-screen display process at Step S13 is described in detail below with reference to FIG. 17.

Figure 17:
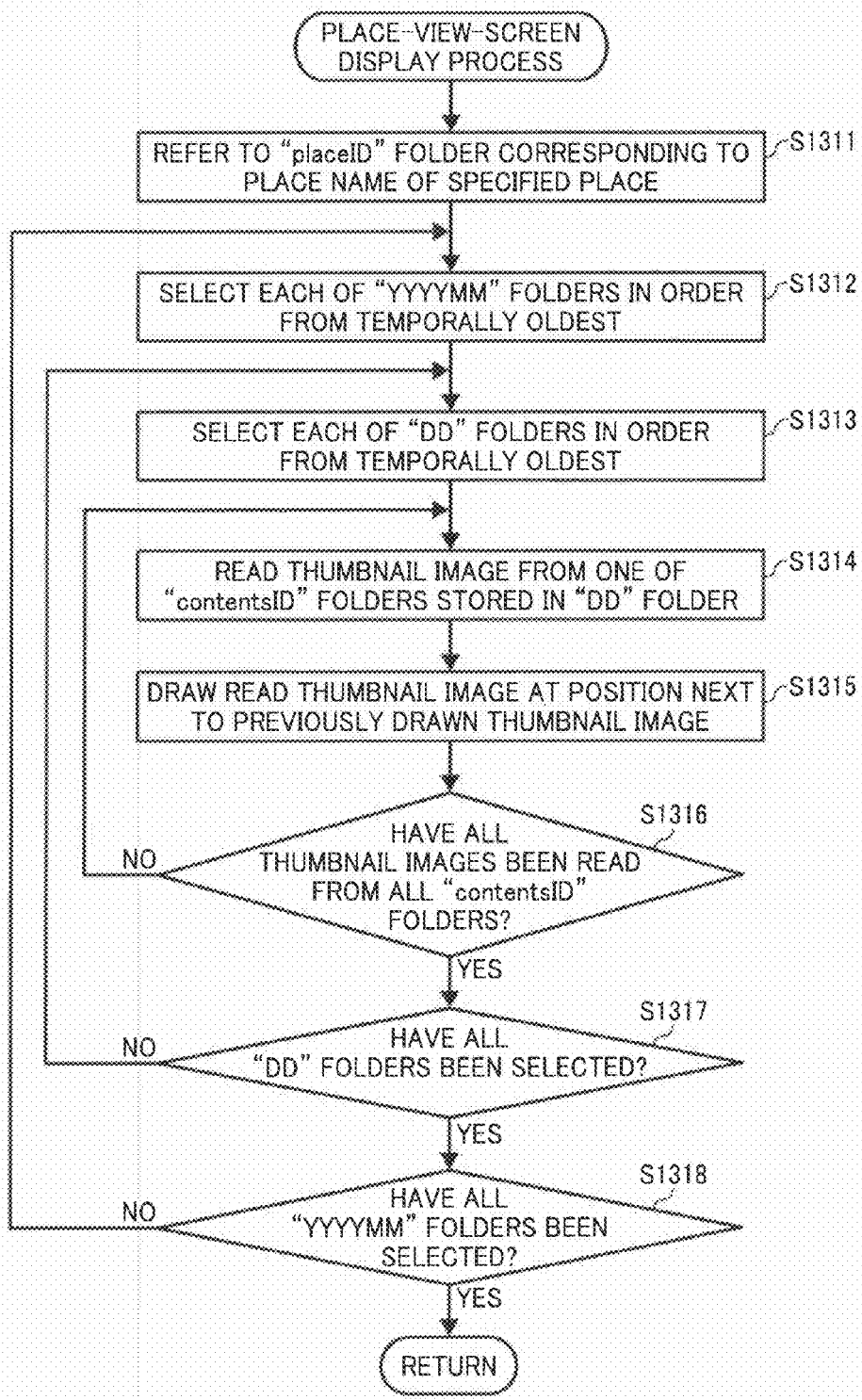
FIG. 17 is a flowchart of a procedure of a place-view-screen display process shown in FIG. 15.

FIG. 17 is a flowchart of a procedure of the place-view-screen display process. The display control unit 21 refers to the "placeID" folder corresponding to a place name of the place specified at Step S12 (Step S1311).

Then, the display control unit 21 sequentially selects each of the "YYYYMM" folders in order from temporally oldest according to the year and the month indicated by that folder, from the "placeID" folder (Step S1312). The display control unit 21 then sequentially selects each of the "DD" folders in order from temporally oldest according to the date indicated by that folder, from the "YYYYMM" folder selected at Step S1312 (Step S1313).

Then, the display control unit 21 reads a thumbnail image from one of the "contentsID" folders stored in the "DD" folder selected at Step S1313 (Step S1314), and draws the thumbnail image read at Step S1314 at a position next to a previously drawn thumbnail image (Step S1315). At the initial time when no thumbnail images are drawn, the read thumbnail image is drawn at a predetermined position in the place view screen.

Then, the display control unit 21 determines whether all the thumbnail images have been read from all the "contentsID" folders in the "DD" folder selected at Step S1313 (Step S1316). When the display control unit 21 determines that there is a "contentsID" folder that has not been processed (No at Step S1316), process control returns to Step S1314 for reading thumbnail images from that "contentsID" folder.

On the other hand, upon determining that all the thumbnail images have been read from all the "contentsID" folders (Yes at Step S1316), the display control unit 21 determines whether all the "DD" folders have been selected from the "YYYYMM" folder selected at Step S1312 (Step S1317). When the display control unit 21 determines that there is a "DD" folder that has not been selected (No at Step S1317), process control returns to Step S1313 for selecting that "DD" folder.

On the other hand, upon determining that all the "DD" folders have been selected (Yes at Step S1317), the display control unit 21 determines whether all the "YYYYMM" folders have been selected from the "placeID" folder referred to at Step S1311 (Step S1318). When the display control unit 21 determines that there is a "YYYYMM" folder that has not been selected (No at Step S1318), process control returns to Step S1312 for selecting that "YYYYMM" folder. On the other hand, when the display control unit 21 determines that all the "YYYYMM" folders have been selected (Yes at Step S1318), process control returns to Step S14 of FIG. 15. It is assumed that the place view screen is displayed in one of the display modes of the place view screens G21 to G23 shown in FIG. 7, and that display mode can be changed according to a request sent from a user via the operating unit 14.

The display control unit 21 determines whether a request for displaying a file view screen of a thumbnail image specified from among the thumbnail images displayed on the place view screen is received via the operating unit 14 (Step S14). Upon determining that the request for displaying the file view screen is received (Yes at Step S14), the display control unit 21 refers to contents information of the "contentsID" folder containing the specified thumbnail image, reads a file from a storage location contained in the contents information, and displays the read file in the file view screen on the display unit 15 (Step S15). It is assumed that the file view screen is displayed in one of the display modes of the file view screens G31 to G33 shown in FIG. 7, and the display modes can be changed depending on a request sent from a user via the operating unit 14.

The display control unit 21 determines whether a request for returning to the place view screen is received via the operating unit 14 (Step S16). When the display control unit 21 determines that the request for returning to the place view screen is not received (No at Step S16), process control returns to Step S15. On the other hand, when the display control unit 21 determines that the request for returning to the place view screen is received (Yes at Step S16), process control returns to Step S13.

Meanwhile, upon determining that the request for displaying the file view screen is not received (No at Step S14), the display control unit 21 determines whether a request for returning to the place map screen is received via the operating unit 14 (Step S17). When the display control unit 21 determines that the request for returning to the place map screen is not received (No at Step S17), process control returns to Step S13. On the other hand, when the display control unit 21 determines that the request for returning to the place map screen is received (Yes at Step S17), process control returns to Step S11.

Meanwhile, when the display control unit 21 determines that the request for displaying the place view screen is not received (No at Step S12), the setting changing unit 22 determines whether a request for operating the place map screen is received via the operating unit 14 (Step S18). When the setting changing unit 22 determines that the request for operating the place map screen is not received (No at Step S18), process control returns to Step S11.

On the other hand, upon determining that the request for operating the place map screen is received (Yes at Step S18), the setting changing unit 22 changes the setting information based on the received operation content (Step S19). Operation to be performed at Step S18 is registration, change, and deletion of layer names, layer attributes, place names, and place attributes; registration and deletion of files; and move of places. The setting information is changed at Step S19 with respect to each of the above operation.

Then, the place-matrix reconfiguring unit 23 determines whether setting content of the place map information is changed due to change of the setting information performed by the setting changing unit 22 at Step S19 (Step S20). When the place-matrix reconfiguring unit 23 determines that the setting content of the place map information is not changed (No at Step S20), process control returns to Step S11.

On the other hand, upon determining that the setting content of the place map information is changed (Yes at Step S20), the place-matrix reconfiguring unit 23 performs a place-matrix reconfiguration process (Step S21). The place-matrix reconfiguration process is described in detail below with reference to FIGS. 18 to 21.

Figure 18:
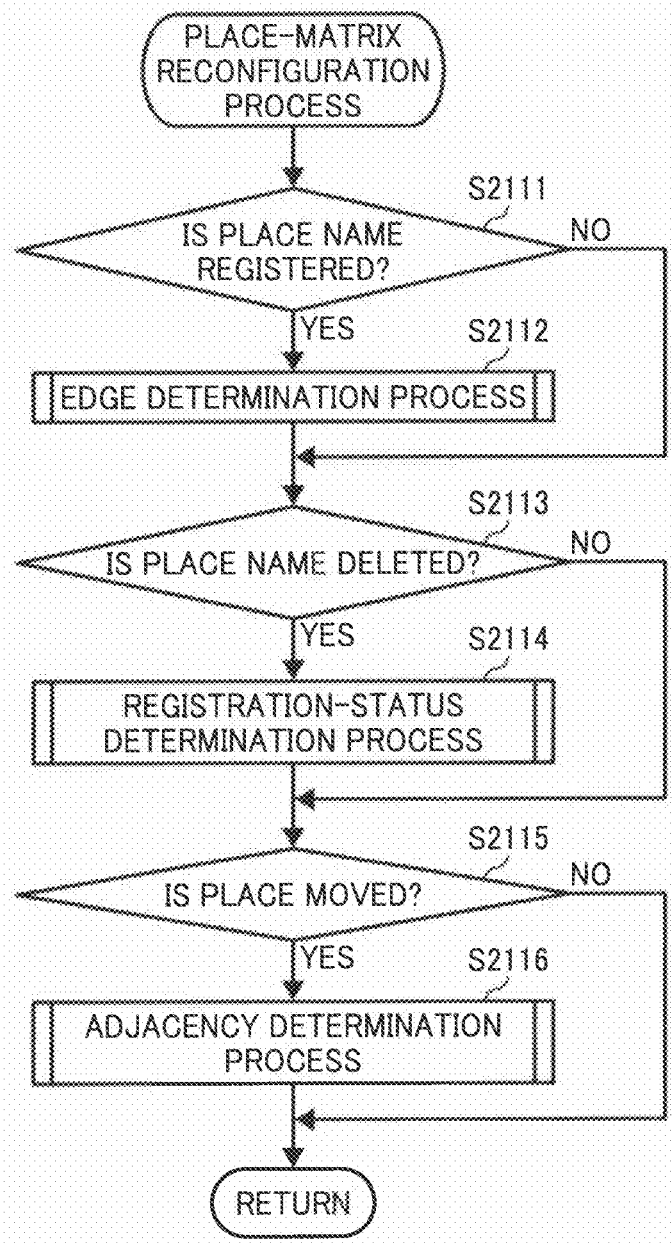
FIG. 18 is a flowchart of a procedure of a place-matrix reconfiguration process shown in FIG. 15.

FIG. 18 is a flowchart of a procedure of the place-matrix reconfiguration process. The place-matrix reconfiguring unit 23 determines whether a place name is registered at Step S19 (Step S2111). When the place-matrix reconfiguring unit 23 determines that a process other than a process of registering the place name is performed at Step S19 (No at Step S2111), process control proceeds to Step S2113.

On the other hand, upon determining that the place name is registered at Step S19 (Yes at Step S2111), the place-matrix reconfiguring unit 23 performs the edge determination process based on the place setting of the place whose place name has been just registered (Step S2112). The edge determination process performed at Step S2112 is described in detail below with reference to FIG. 19.

Figure 19:
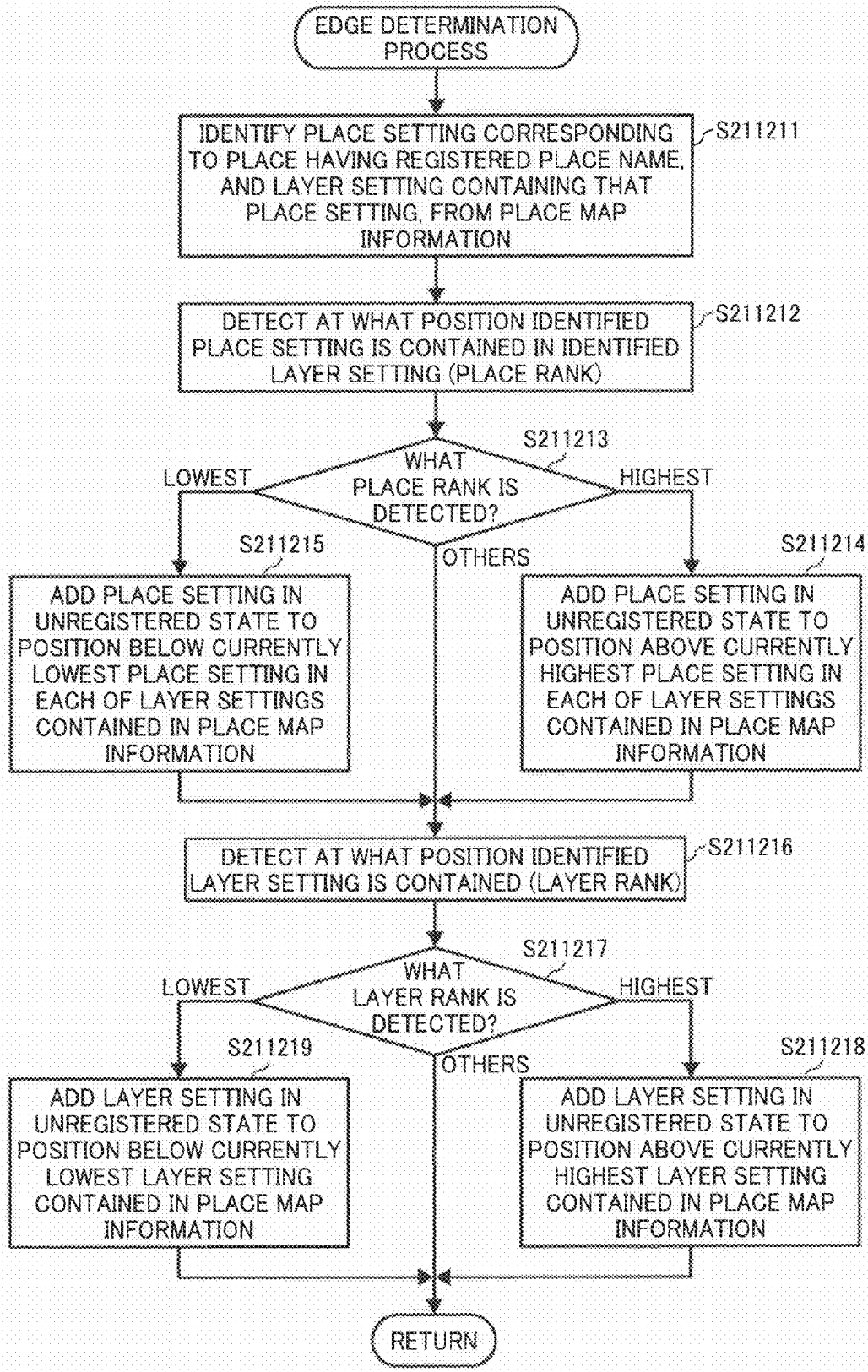
FIG. 19 is a flowchart of a procedure of an edge determination process shown in FIG. 18.

FIG. 19 is a flowchart of a procedure of the edge determination process at Step S2112. The place-matrix reconfiguring unit 23 identifies the place setting 202 corresponding to the place whose place name has been just registered, and the layer setting 201 containing that place setting 202, from the place map information (Step S211211).

Then, the place-matrix reconfiguring unit 23 detects at what position the place setting 202 identified at Step S211211 is contained in the layer setting 201 identified at Step S211211, that is, detects a rank of the place setting 202 (Step S211212). Hereinafter, the rank detected at Step S211212 is referred to as "a place rank".

Then, the place-matrix reconfiguring unit 23 checks the place rank detected at Step S211212. Upon determining that the place rank is the highest (HIGHEST at Step S211213), the place-matrix reconfiguring unit 23 adds the place setting 202 in an unregistered state to the highest position, that is, above the place setting 202 currently at the highest position in each of the layer settings 201 contained in the place map information (Step S211214), and process control proceeds to Step S211216.

Upon determining that the place rank is the lowest (LOWEST at Step S211213), the place-matrix reconfiguring unit 23 adds the place setting 202 in an unregistered state to the lowest position, that is, below the place setting 202 currently at the lowest position in each of the layer settings 201 contained in the place map information (Step S211215), and process control proceeds to Step S211216.

When the place-matrix reconfiguring unit 23 determines that the place rank is neither the highest nor the lowest (OTHERS at Step S211213), process control proceeds to Step S211216.

Then, the place-matrix reconfiguring unit 23 detects at what position the layer setting 201 identified at Step S211211 is contained in the place map information, that is, detects a rank of the layer setting 201 (Step S211216). Hereinafter, the rank detected at Step S211216 is referred to as "a layer rank".

Then, the place-matrix reconfiguring unit 23 checks the layer rank detected at Step S211216. Upon determining that the layer rank is the highest (HIGHEST at Step S211217), the place-matrix reconfiguring unit 23 adds the layer setting 201 in an unregistered state to the highest position, that is, above the layer setting 201 currently at the highest position in the place map information (Step S211218), and process control proceeds to Step S2113 of FIG. 18.

Upon determining that the layer rank is the lowest (LOWEST at Step S211217), the place-matrix reconfiguring unit 23 adds the layer setting 201 in an unregistered state to the lowest position, that is, below the layer setting 201 currently at the lowest position in the place map information (Step S211219), and process control proceeds to Step S2113 of FIG. 18.

When the place-matrix reconfiguring unit 23 determines that the layer rank is neither the highest nor the lowest (OTHERS at Step S211217), process control proceeds to Step S2113 of FIG. 18.

Returning to the explanation of FIG. 18, the place-matrix reconfiguring unit 23 determines whether the place name is deleted in the operation performed at Step S19 (Step S2113). When the place-matrix reconfiguring unit 23 determines that the operation other than deletion of the place name is performed at Step S19 (No at Step S2113), process control proceeds to Step S2115.

On the other hand, upon determining that the place name is deleted at Step S19 (Yes at Step S2113), the place-matrix reconfiguring unit 23 performs a registration-status determination process (Step S2114). The registration-status determination process at Step S2114 is described in detail below with reference to FIG. 20.

Figure 20:
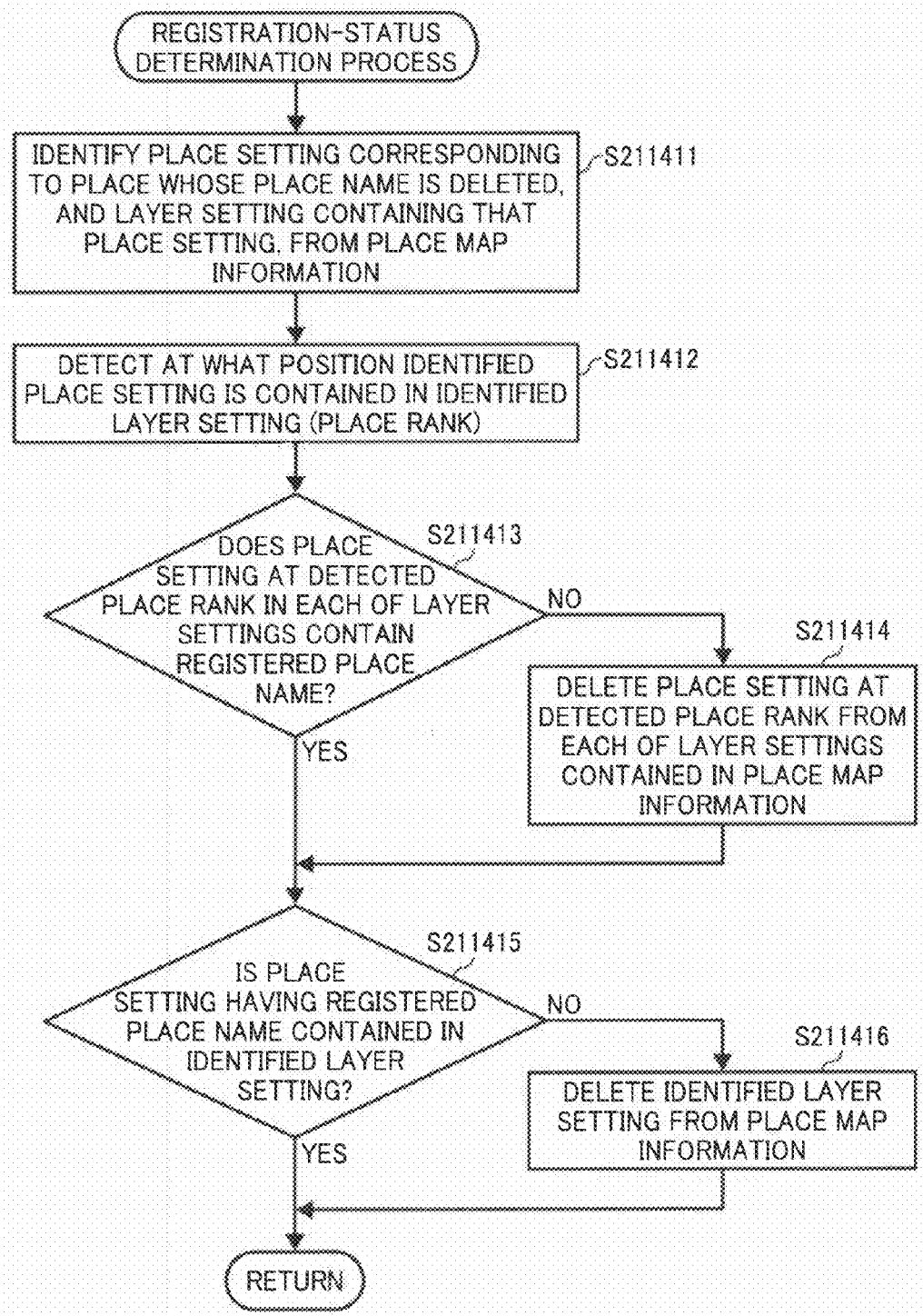
FIG. 20 is a flowchart of a procedure of a registration-status determination process shown in FIG. 18.

FIG. 20 is a flowchart of a procedure of the registration-status determination process. The place-matrix reconfiguring unit 23 identifies the place setting 202 corresponding to the place whose place name has been deleted, and the layer setting 201 containing that place setting 202, from the place map information (Step S211411).

Then, the place-matrix reconfiguring unit 23 detects at what position the place setting 202 identified at Step S211411 is contained in the layer setting 201 identified at Step S211411, that is, detects the place rank of that place setting 202 (Step S211412). Then, the place-matrix reconfiguring unit 23 determines whether the place setting 202 at the detected place rank in each of the layer settings 201 contains a registered place name (Step S211413). When the place-matrix reconfiguring unit 23 determines that the place setting 202 having the registered place name is contained (Yes at Step S211413), process control proceeds to Step S211415.

On the other hand, upon determining that the place setting 202 having the registered place name is not contained (No at Step S211413), the place-matrix reconfiguring unit 23 deletes the place setting 202 at the detected place rank from all the layer settings 201 in the place map information (Step S211414), and process control proceeds to Step S211415.

Then, the place-matrix reconfiguring unit 23 determines whether the place setting 202 having the registered place name is contained in the layer setting 201 identified at Step S211411 (Step S211415). When the place-matrix reconfiguring unit 23 determines that the place setting 202 having the registered place name is contained (Yes at Step S211415), process control proceeds to Step S2115 of FIG. 18.

On the other hand, upon determining that the place setting 202 having the registered place name is not contained (No at Step S211415), the place-matrix reconfiguring unit 23 deletes the layer setting 201 identified at Step S211411 from the place map information (Step S211416), and process control proceeds to Step S2115 of FIG. 18.

Returning to the explanation of FIG. 18, the place-matrix reconfiguring unit 23 determines whether a place is moved at Step S19 (Step S2115). When the place-matrix reconfiguring unit 23 determines that operation other than move of the place is performed at Step S19 (No at Step S2115), process control returns to Step S11 of FIG. 15.

On the other hand, upon determining that the place is moved at Step S19 (Yes at Step S2115), the place-matrix reconfiguring unit 23 performs an adjacency determination process based on place settings corresponding to the place before move and the place after move (Step S2116). The adjacency determination process at Step S2116 is described in detail below with reference to FIG. 21.

Figure 21:
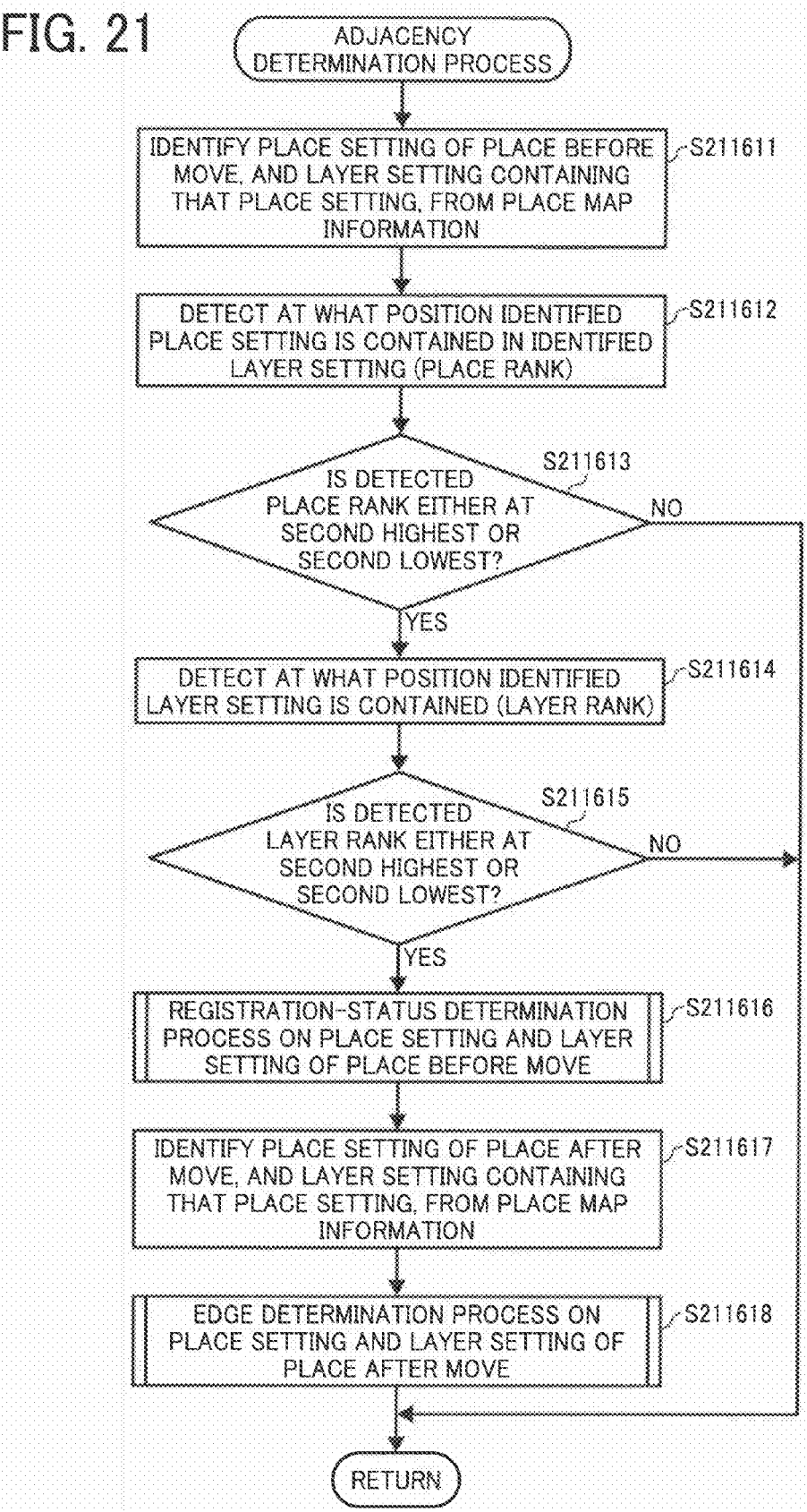
FIG. 21 is a flowchart of a procedure of an adjacency determination process shown in FIG. 18.

FIG. 21 is a flowchart of a procedure of the adjacency determination process. The place-matrix reconfiguring unit 23 identifies the place setting 202 of a place before move, and the layer setting 201 containing that place setting 202, from the place map information (Step S211611).

Then, the place-matrix reconfiguring unit 23 detects at what position the place setting 202 identified at Step S211611 is contained in the layer setting 201 identified at Step S211611, that is, detects the place rank of that place setting 202 (Step S211612).

The place-matrix reconfiguring unit 23 checks the place rank detected at Step S211612, and determines whether the detected place rank is either at the second highest position or at the second lowest position (Step S211613). When the place-matrix reconfiguring unit 23 determines that the detected place rank is neither at the second highest position nor at the second lowest position (No at Step S211613), process control returns to Step S11 of FIG. 15.

On the other hand, upon determining that the detected place rank is either at the second highest position or at the second lowest position (Yes at Step S211613), the place-matrix reconfiguring unit 23 detects at what position the layer setting 201 identified at Step S211611 is contained in the place map information, that is, detects the layer rank of that layer setting 201 (Step S211614).

The place-matrix reconfiguring unit 23 checks the layer rank detected at Step S211614, and determines whether the detected layer rank is either at the second highest position or at the second lowest position (Step S211615). When the place-matrix reconfiguring unit 23 determines that the detected layer rank is neither at the second highest position nor at the second lowest position (No at Step S211615), process control returns to Step S11 of FIG. 15.

On the other hand, upon determining that the detected layer rank is either at the second highest position or at the second lowest position (Yes at Step S211615), the place-matrix reconfiguring unit 23 performs the registration-status determination process on the place setting 202 corresponding to the place before move and the layer setting 201 containing that place setting 202, which are identified at Step S211611 (Step S211616). The registration-status determination process performed at Step S211611 is the same as that performed at Step S2114 of FIG. 20, and therefore, the same explanation is not repeated.

Then, the place-matrix reconfiguring unit 23 identifies the place setting 202 corresponding to a place after move, and the layer setting 201 containing that place setting 202, from place map information (Step S211617).

The place-matrix reconfiguring unit 23 performs the edge determination process on the place setting 202 of the place after move and the layer setting 201 containing that place setting 202, which are identified at Step S211617 (Step S211618), and process control proceeds to Step S11 of FIG. 15. The edge determination process performed at Step S211618 is the same as that performed at Step S2112 of FIG. 19, and therefore, the same explanation is not repeated.

The place map information whose setting content have been changed due to the place-matrix reconfiguration process at Step S21 is read in a process at Step S11. As a result, the updated place map information is displayed on the display unit 15.

In this manner, the place settings 202 contained in each of the layer settings 201 are displayed as places, each of which is used as unit for managing files, in the same hierarchy. When one place is selected from the displayed places, thumbnail images of files stored in association with the place setting 202 of the selected place are displayed on the display unit 15. Accordingly, a relationship between the places, each of which is a unit for managing files, can be intuitively recognized, and thereby, files can be effectively managed. Furthermore, because the places are displayed as a matrix, a relationship between the places can be orderly viewed in an array. As a result, the relationship between the places can be more effectively and intuitively recognized.

Figure 22:
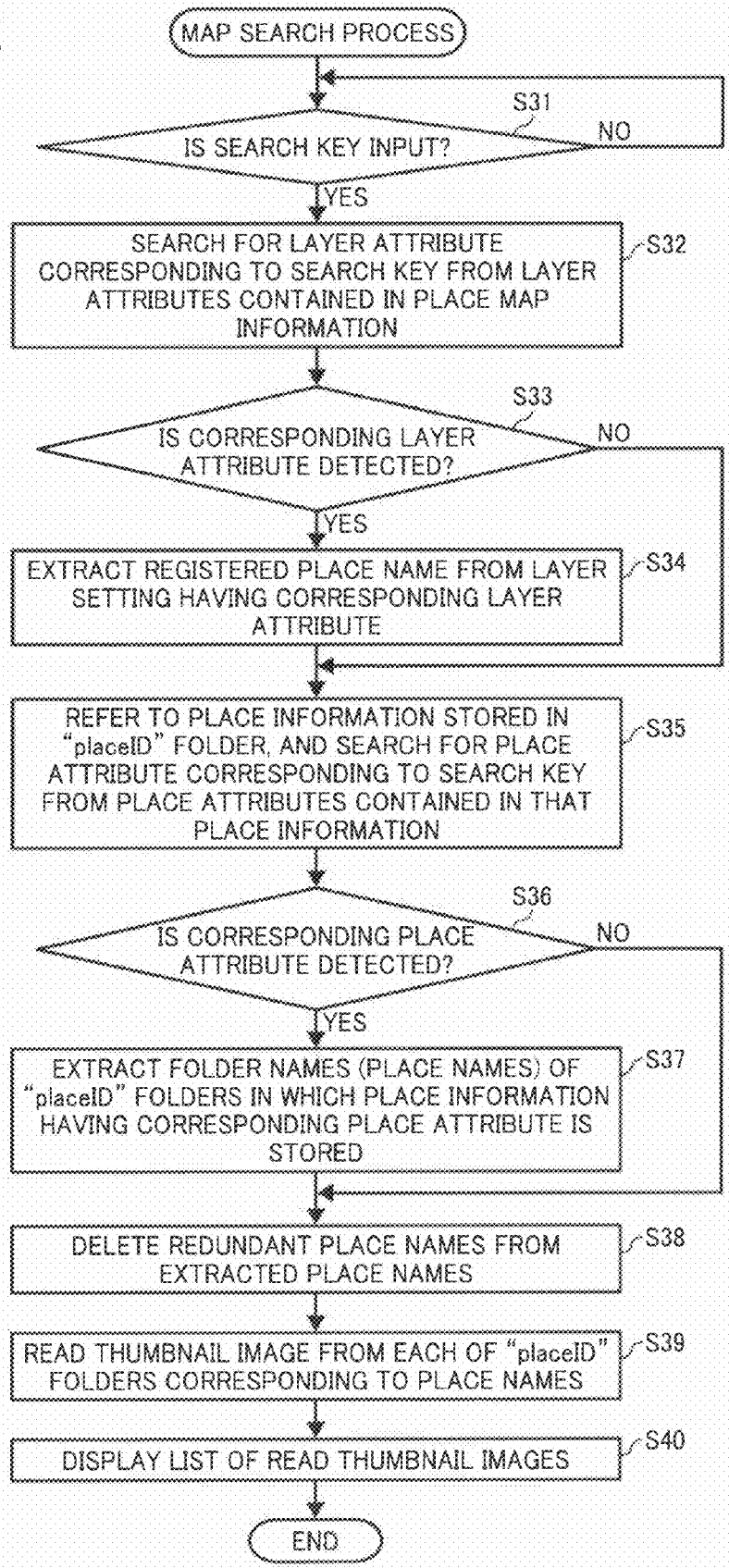
FIG. 22 is a flowchart of a procedure of a map search process performed by the file management apparatus shown in FIG. 1.

Operation performed by the searching unit 24 is described below with reference to FIGS. 22 to 24. FIG. 22 is a flowchart of a procedure of a process for searching for a file from the place map screen (a map search process) performed by the searching unit 24.

The searching unit 24 waits for reception of character string (search key) to be a retrieval target from a user via the operating unit 14 (No at Step S31). Upon receiving the search key (Yes at Step S31), the searching unit 24 refers to the layer attributes in the layer settings 201 contained in the place map information, and searches for the layer attribute corresponding to the search key (Step S32). The search can be performed by a full-text search or a truncated phrase search.

When the searching unit 24 determines that the layer attribute corresponding to the search key is not detected (No at Step S33), process control proceeds to Step S35. On the other hand, upon determining that the layer attribute corresponding to the search key is detected (Yes at Step S33), the searching unit 24 extracts a place name registered in the place setting 202 from the layer setting 201 whose layer attribute corresponds to the search key (Step S34).

Then, the searching unit 24 refers to the place information stored in each of the "placeID" folders, and searches for the place attribute corresponding to the search key from the place attributes contained in the place information (Step S35).

When the searching unit 24 determines that the place attribute corresponding to the search key is not detected (No at Step S36), process control proceeds to Step S38. On the other hand, upon determining that the place attribute corresponding to the search key is detected (Yes at Step S36), the searching unit 24 extracts a folder name of the "placeID" folder in which the place information containing the detected place attribute is stored, that is, extracts a place name (Step S37).

The searching unit 24 deletes redundant place names from place names extracted at Steps S34 and S37 (Step S38). Then, the searching unit 24 sequentially reads thumbnail images from each of the "placeID" folders corresponding to each of the place names obtained at Step S38 (Step S39). The searching unit 24 displays a list of the read thumbnail images on the display unit 15 (Step S40), and process control ends. If no thumbnail images are read, that is, if a file corresponding to the search key is not detected, it is applicable to display information indicating no files (e.g., not applicable) on the display unit 15.

In this manner, files can be retrieved from the place map screen based on the layer attribute and the place attribute. Therefore, files can be effectively managed.

Figure 23:
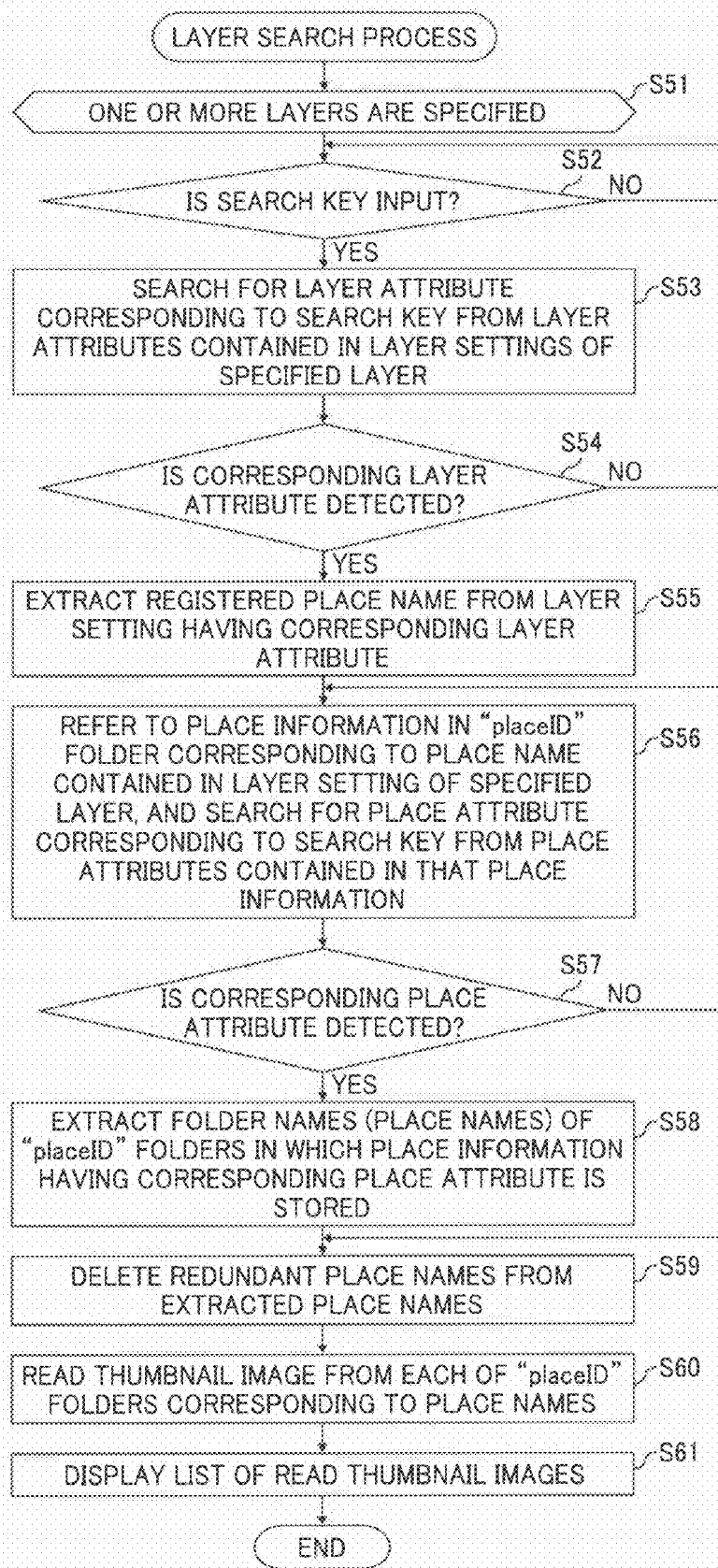
FIG. 23 is a flowchart of a procedure of a layer search process performed by the file management apparatus shown in FIG. 1.

FIG. 23 is a flowchart of a procedure of a layer search process performed when one or more layers are specified as refinement criteria from the place map screen. Assuming that one or more layers are specified as the search area from the layers displayed on the place map screen by using the operating unit 14 (Step S51).

The searching unit 24 waits for reception of a search key to be a retrieval target from a user via the operating unit 14 (No at Step S52). Upon receiving the search key (Yes at Step S52), the searching unit 24 refers to layer attributes contained in the layer settings 201 corresponding to the layer specified at Step S51 from among the layer settings 201 contained in the place map information, and searches for a layer attribute corresponding to the search key (Step S53).

When the searching unit 24 determines that the layer attribute corresponding to the search key is not detected (No at Step S54), process control proceeds to Step S56. On the other hand, upon determining that the layer attribute corresponding to the search key is detected (Yes at Step S54), the searching unit 24 extracts the place name registered in the place setting 202 from the layer setting 201 whose layer attribute corresponds to the search key (Step S55).

The searching unit 24 then refers to the place information stored in the "placeID" folder corresponding to the place name of the place contained in the layer specified at Step S51, and searches for a place attribute corresponding to the search key from the place attributes contained in the place information (Step S56).

When the searching unit 24 determines that the place attribute corresponding to the search key is not detected (No at Step S57), process control proceeds to Step S59. On the other hand, upon determining that the place attribute corresponding to the search key is detected (Yes at Step S57), the searching unit 24 extracts a folder name of the "placeID" folder in which the place information containing the detected place attribute is stored, that is, extracts a place name (Step S58).

The searching unit 24 deletes redundant place names from place names extracted at Steps S55 and S58 (Step S59). Then, the searching unit 24 sequentially reads thumbnail images from each of the "contentsID" folders in the "placeID" folder corresponding to each of the place names obtained at Step S59 (Step S60). The searching unit 24 displays a list of the read thumbnail images on the display unit 15 (Step S61), and process control ends.

In this manner, file search can be performed by refining the search area to a specified layer. That is, file search can be performed for each of rows in the place matrix. Therefore, files can be effectively managed.

Figure 24:
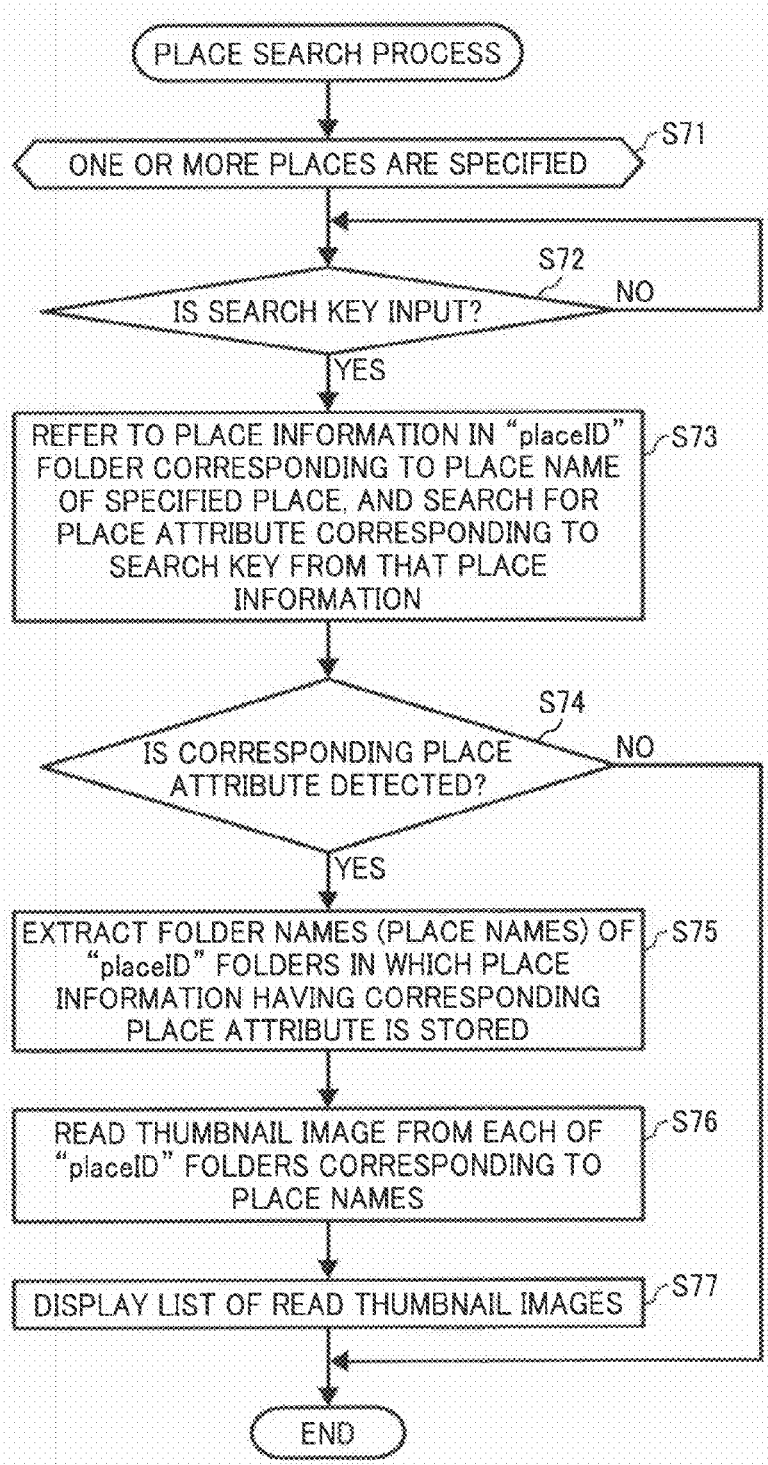
FIG. 24 is a flowchart of a procedure of a place search process performed by the file management apparatus shown in FIG. 1.

FIG. 24 is a flowchart of a procedure of a place search process performed when one or more places are specified as refinement criteria from the place map screen. Assuming that one or more places are specified as the search area from the places displayed on the place map screen by using the operating unit 14 (Step S71).

The searching unit 24 waits for reception of a search key to be a retrieval target from a user via the operating unit 14 (No at Step S72). Upon receiving the search key (Yes at Step S72), the searching unit 24 refers to the place information stored in the "placeID" folder corresponding to the place name of the place specified at Step S71, and searches for a place attribute corresponding to the search key from the place attributes contained in the place information (Step S73)

When the searching unit 24 determines that the place attribute corresponding to the search key is not detected (No at Step S74), process control ends. If a file corresponding to the search key is not detected, it is applicable to display information indicating that no files are detected on the display unit 15.

On the other hand, upon determining that the place attribute corresponding to the search key is detected (Yes at Step S74), the searching unit 24 extracts a folder name of the "placeID" folder in which the place information containing the detected place attribute is stored, that is, extracts a place name (Step S75).

Then, the searching unit 24 sequentially reads thumbnail images from each of the "contentsID" folders in the "placeID" folder corresponding to the place name extracted at Step S75 (Step S76). The searching unit 24 then displays a list of the read thumbnail images on the display unit 15 (Step S77), and process control ends.

In this manner, file search can be performed by refining the search area to a specified place. Therefore, files can be effectively managed using place groups in a place matrix. Furthermore, file search can be performed by refining both layers and places. In this case, files can be retrieved with respect to refined rows and columns.

Figure 25:
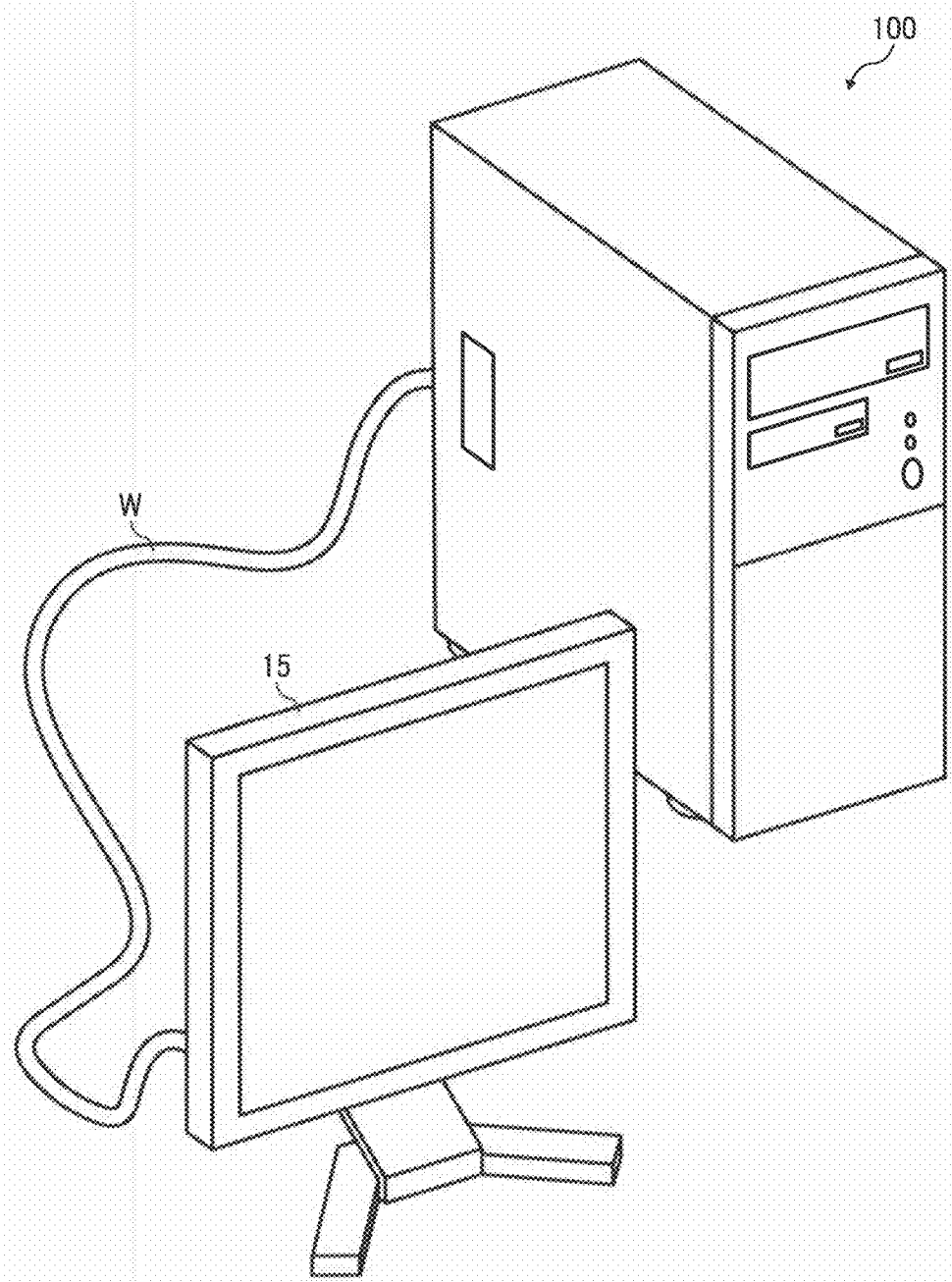
FIG. 25 is a perspective view of the file management apparatus shown in FIG. 1.

Explanation about an exterior of the file management apparatus 100 is given below. FIG. 25 is a perspective view of a body of the file management apparatus 100 connected to the display unit 15 that displays place view images, file view images, and the like. The display unit 15 is connected to the body of the file management apparatus 100 with a wire W such as a DVI cable. The file management apparatus 100 sends the place view images and the file view images to the display unit 15 via the wire W.

Figure 26:
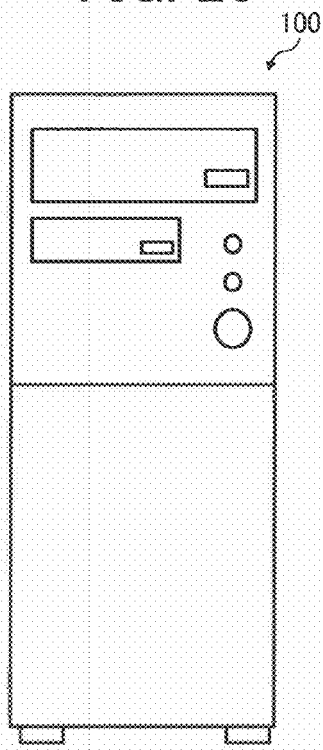
FIG. 26 is a front view of the file management apparatus shown in FIG. 25.
Figure 27:
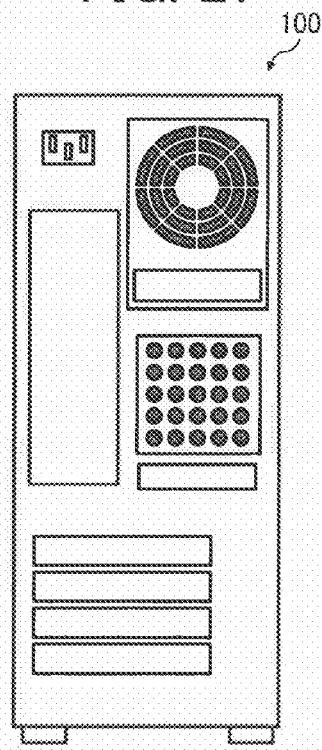
FIG. 27 is a back view of the file management apparatus shown in FIG. 25.
Figure 28:
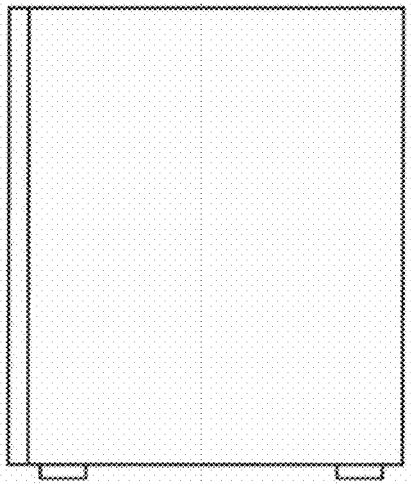
FIG. 28 is a right side view of the file management apparatus shown in FIG. 25.
Figure 29:
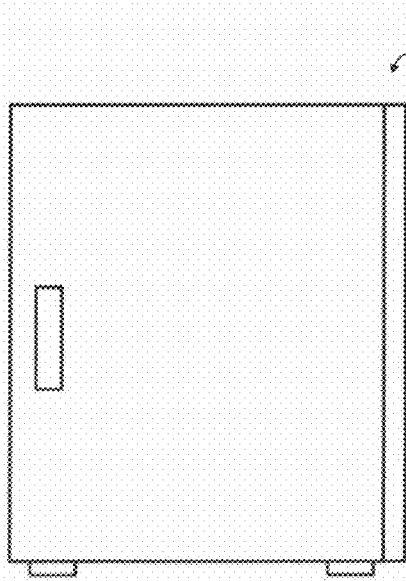
FIG. 29 is a left side view of the file management apparatus shown in FIG. 25.
Figure 30:
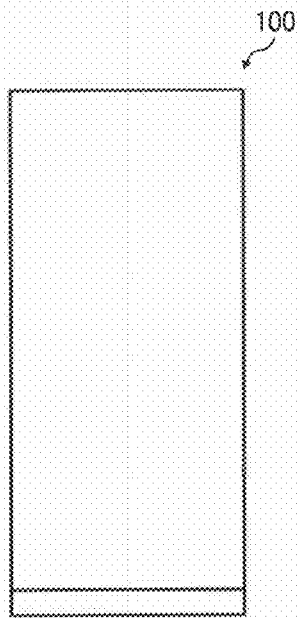
FIG. 30 is a top view of the file management apparatus shown in FIG. 25.
Figure 31:
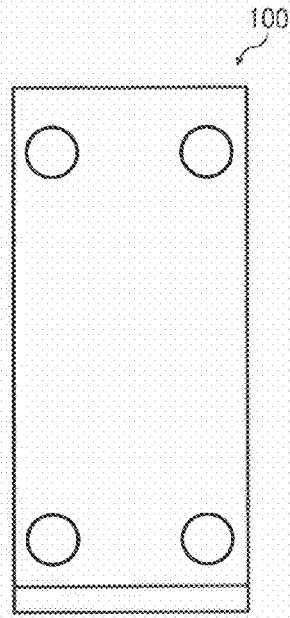
FIG. 31 is a bottom view of the file management apparatus shown in FIG. 25.

FIG. 26 is a front view of the file management apparatus 100. FIG. 27 is a back view of the file management apparatus 100. FIG. 28 is a right side view of the file management apparatus 100. FIG. 29 is a left side view of the file management apparatus 100. FIG. 30 is a top view of the file management apparatus 100. FIG. 31 is a bottom view of the file management apparatus 100.

A second embodiment of the present invention is described below. In the first embodiment, it is assumed that the file management apparatus 100 is used individually by a user, which means the file management apparatus 100 is a stand alone type. On the contrary, in the second embodiment, a file management system having a server-and-client configuration is explained in which a plurality of users share the file management system. The same constituents as those of the first embodiment are assigned with the same reference numerals and symbols, and therefore, the same explanation is not repeated.

Figure 32:
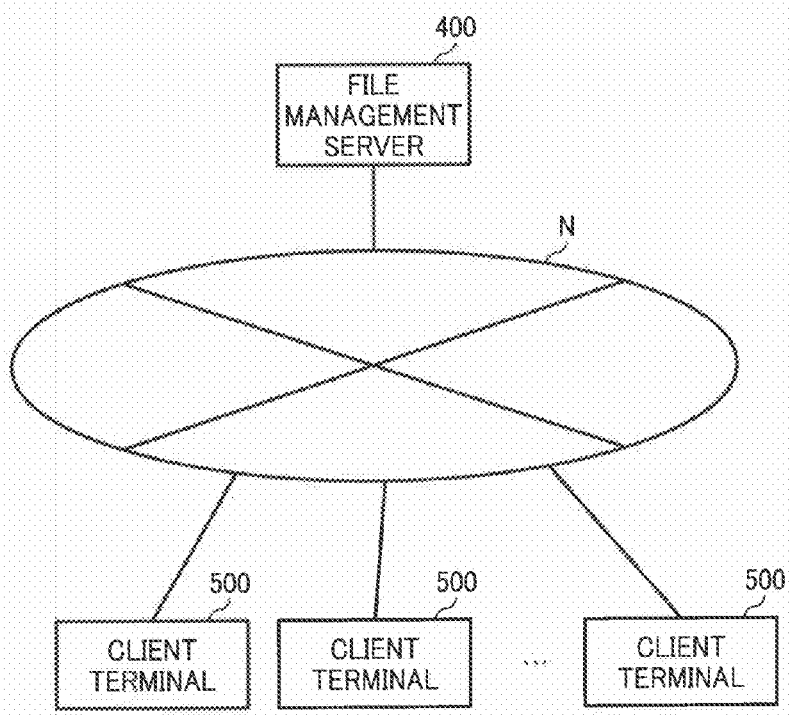
FIG. 32 is a block diagram of a configuration of a file management system according to a second embodiment of the present invention.

FIG. 32 is a block diagram of a configuration of the file management system according to the second embodiment. The file management system includes a file management server 400 and a plurality of client terminals 500, which are communicably connected to one another via a network N.

The file management server 400 has the same file management function included in the file management apparatus 100. The file management server 400 stores therein and manages files such as text, image, or video received (uploaded) from the client terminals 500.

Figure 33:
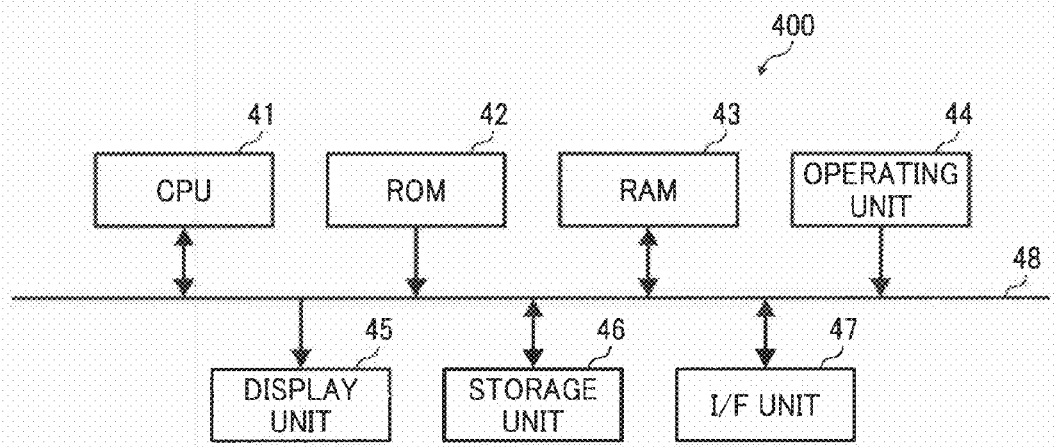
FIG. 33 is a block diagram of a hardware configuration of a file management server shown in FIG. 32.

FIG. 33 is a block diagram of a hardware configuration of the file management server 400. The file management server 400 includes a CPU 41, a ROM 42, a RAM 43, an operating unit 44 that includes an input device such as a mouse and a keyboard, a display unit 45 that includes a display device such as a liquid crystal display monitor, a storage unit 46 that includes a storage device such as an HDD, an I/F unit 47 that controls communication with external devices, and a bus 48 that connects the above units to one another. The exterior of the file management server 400 is the same as that of the file management apparatus 100 shown in FIGS. 25 to 31.

The ROM 42 and the storage unit 46 store therein various computer programs and various data. The CPU 41 loads the computer programs from the ROM 42 and the storage unit 46 onto the RAM 43, and executes the loaded computer programs to control the file management server 400 and realize various functional units, which will be described later.

The storage unit 46 has a predetermined folder structure for managing files sent from users (the client terminals 500) and storing therein and managing various setting information used for creating user interfaces that are support tools for managing files. Details about the setting information stored and managed by the storage unit 46 will be described later.

Figure 34:
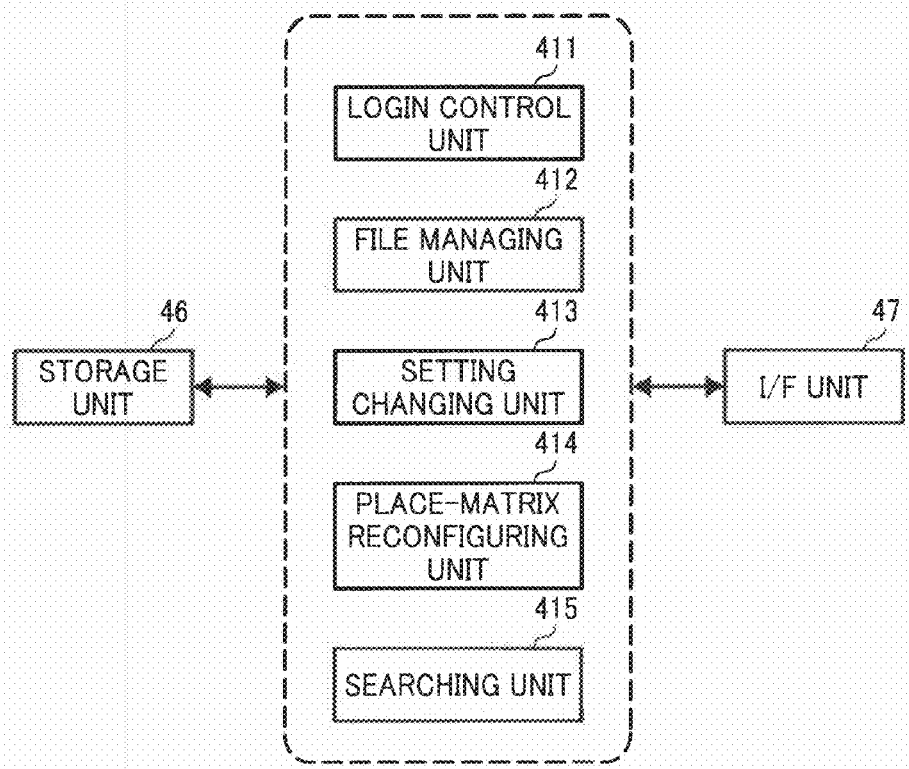
FIG. 34 is a block diagram of a functional configuration of the file management server shown in FIG. 32.

FIG. 34 is a block diagram of a functional configuration of the file management server 400. The file management server 400 includes a login control unit 411, a file managing unit 412, a setting changing unit 413, a place-matrix reconfiguring unit 414, and a searching unit 415, as functional units realized by executing computer programs stored in the ROM 42 and the storage unit 46 by the CPU 41.

The login control unit 411 receives a login request from the client terminal 500 and performs authentication of a user by comparing a pair of a user ID and a password contained in the login request with a verification data that is stored in the storage unit 46 in advance. The verification data contains a pair of a user ID and a password of a user registered as a valid user. The user ID is identification information for identifying a user. For example, arbitrary character string indicating a nickname of a user and numbers indicating license numbers of a user, or the like can be used as the user ID.

The file managing unit 412 extracts the setting information associated with the user who has been authenticated as a valid user by the login control unit 411, and sends the setting information to the client terminal 500 from which the user attempts the login. A folder structure of the storage unit 46 for storing therein the setting information is described below with reference to FIG. 35.

Figure 35:
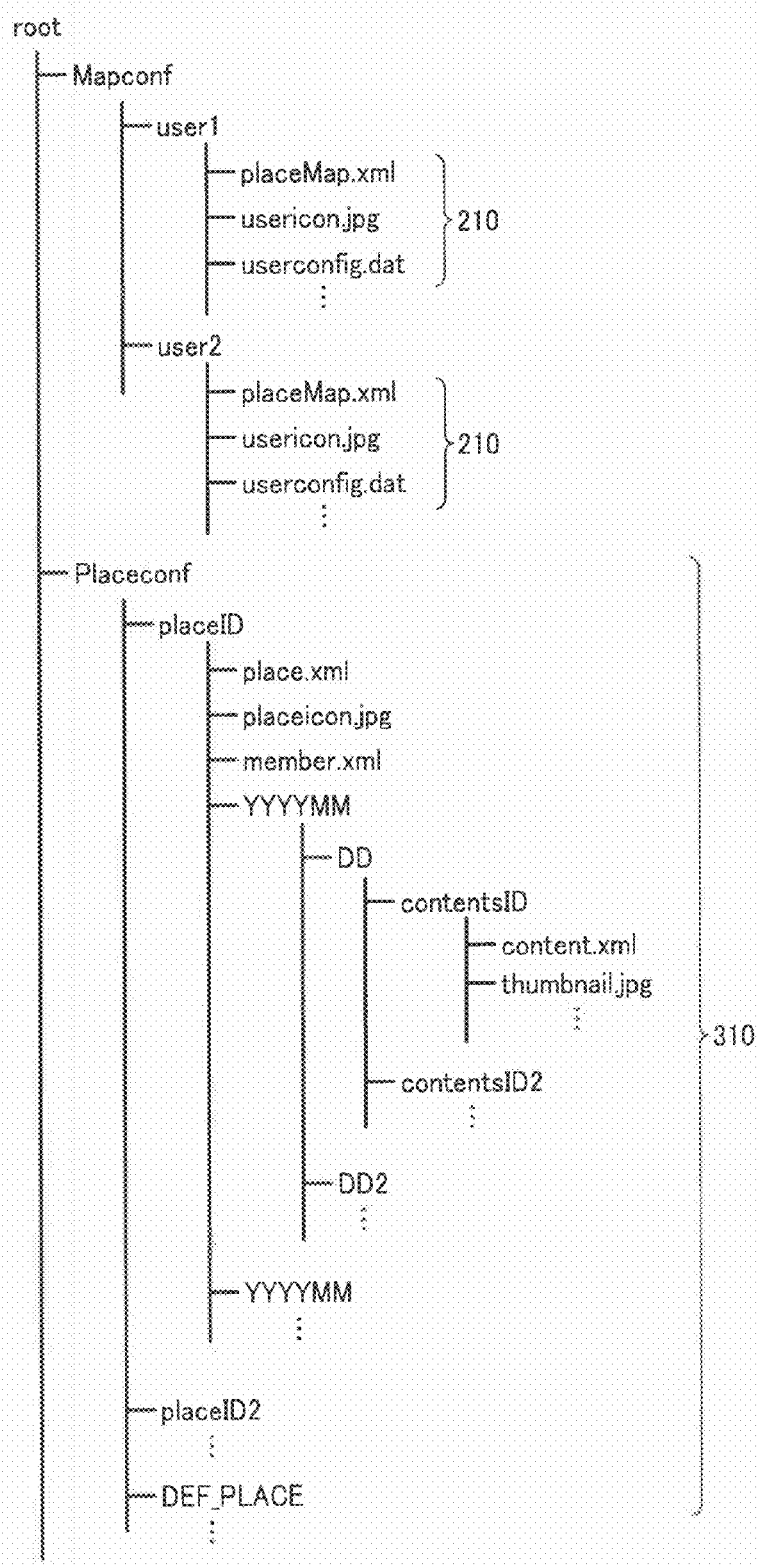
FIG. 35 is a diagram of an example of a folder structure for storing setting information.

FIG. 35 is a diagram of an example of the folder structure of the storage unit 46 for storing therein the setting information. The storage unit 46 is constituted of a map managing section 210 corresponding to the map managing section 200, and a place managing section 310 corresponding to the place managing section 300.

The map managing section 210 is configured with respect to each user folder (user1, user2, etc.) created for each user (user ID) who uses the file management system. Each of the user folders contains place map information (placeMap.xml)

for a user ID corresponding to a user folder name, an icon image (usericon.jpg) for the same user ID, and "userConfig.dat" for storing therein information about a user identified by the same user ID, such as a user name or a contact address (e.g., e-mail address).

The place managing section 310 contains "member.xml" with respect to each "placeID" folder, in addition to the place information explained with reference to FIG. 3. The "member.xml" contains information about an owner of the "placeID" folder (namely, place) and user IDs of community members who share the "placeID" folder. Hereinafter, the "member.xml" is referred to as a member list. If a plurality of user IDs are registered in the member list, a corresponding place is shared by users identified by the user IDs registered on the member list. Hereinafter, a place shared by users is referred to as a shared place.

It is assumed that identification information is appended to a user ID of a user who has created a place corresponding to the "placeID" folder that contains the member list among user IDs registered in the member list. The identification information indicates that the user is an owner of the place. Furthermore, access authority is granted to each of the user IDs of the community members of the place. The access authority will be described later.

The "contentsID" folder stored in the "placeID" folder contains at least "content.xml" and "thumbnail.jpg" that is a thumbnail image of a file.

It is assumed that the thumbnail image of the file is created by executing a predetermined computer program by the CPU 41. A timing of creating the thumbnail image can be arbitrary. For example, it is possible to create the thumbnail image when a user uploads the file to the file management server 400, or when a user downloads the file from the file management server 400. By storing the thumbnail image of an original file in the "contentsID" folder as described above, it is possible to realize a configuration in which only thumbnail images are downloaded to the client terminal 500 at the initial access to the file management server 400, and original files are selectively downloaded depending on a request to the file management server 400. Furthermore, there can be another configuration in which a user can select either original files or thumbnail images to be downloaded depending on a type of the client terminal 500.

The file managing unit 412 reads the place map information associated with the user ID whose login has been permitted by the login control unit 411, and the "placeID" folder, from the storage unit 46. Then, the file managing unit 412 sends the place map information and the "placeID" folder to the client terminal 500.

Specifically, the file managing unit 412 identifies a user folder corresponding to the user ID whose login has been permitted, and reads the place map information from the map managing section 210 of the identified user folder. The file managing unit 412 also reads a "placeID" folder that is corresponding to the "placeID" contained in the place map information and that contains a member list in which the permitted user ID is registered.

When a user folder corresponding to the user ID whose login is permitted is not contained in the map managing section 210, that is, when the permitted user ID is a new user ID, the file managing unit 412 creates a new user folder whose folder name is identical to the new user ID in the map managing section 210. Then, the file managing unit 412 creates the map managing section 210 and the place managing section 310 under the created user folder. The created map managing section 210 contains place map information containing places in unregistered states. For example, a place matrix with three rows and three columns is set in the place map information as an initial setting.

When the setting changing unit 413 and the place-matrix reconfiguring unit 414 update the setting information, the file managing unit 412 sends the updated setting information to the client terminal 500 thereby the setting information in the client terminal 500 is updated. The updated setting information to be sent can be differential data containing only updated pieces of data, or can be whole data containing all the setting information associated with the user ID that is currently logged in.

The file managing unit 412 is configured to receive a view request for viewing a specified file from the client terminal 500. Upon receiving the view request, the file managing unit 412 reads the specified file from the storage unit 46, and sends the read file to the client terminal 500 that has sent the view request.

The setting changing unit 413 is configured to receive a request for changing settings of the place map screen or the place view screen, that is, a request for registering (uploading) and deleting files, changing settings of layer names and place names, moving or deleting places. Upon receiving such a request, the setting changing unit 413 updates the setting information in the storage unit 46 based on the contents of the request.

The place-matrix reconfiguring unit 414 determines whether the place map information is updated due to update of the setting information by the setting changing unit 413. Upon determining that the place map information is updated, the place-matrix reconfiguring unit 414 performs the place-matrix reconfiguration process as described above. As a result, the place map information associated with the user ID that is contained in the request for changing the settings is updated.

The searching unit 415 is configured to receive a search request with a search key, such as attribute information (tag) appended to each of layers, places, and files, or character string (hereinafter, "keyword"), from the client terminal 500. Upon receiving the search request, the searching unit 415 searches for a file corresponding to the search key.

The searching unit 415 identifies a "contentsID" folder corresponding to the retrieved file from the place managing section 310. Then, the searching unit 415 makes copies of data contained in the "contentsID" folder as well as a tree structure containing a "DD" folder and a "YYYYMM" folder to which the "contentsID" folder belongs, in the RAM 43 or a different storage location in the storage unit 46.

The searching unit 415 then merges the copy of the "contentsID" folder based on the date indicated by the "YYYYMM" folder and the "DD" folder, and creates a "placeID" folder containing files retrieved by the search (hereinafter, referred to as "a search result folder" as appropriate). The search result folder is provided with place information that contains correspondence between a folder name of each copy of "contentsID" folders and contents of place information stored in a "placeID" folder containing an original of each copy of the "contentsID" folders.

The searching unit 415 sends the created search result folder to the client terminal 500, as a search result of the search request.

Returning to the explanation of FIG. 32, the client terminal 500 is a terminal apparatus to be operated by a user who uses the file management apparatus. Examples of the client terminal 500 include a PC and a cell phone. In the second embodiment, the client terminal 500 serves as a front end of the file management server 400. The client terminal 500 is configured such that a user can manage and view files uploaded to the file management server 400 by using a GUI, such as a place map screen, displayed on the client terminal 500. Assuming that the client terminal 500 is a PC, its external configuration is the same as that of the file management apparatus 100 as shown in FIGS. 25 to 31.

Figure 36:
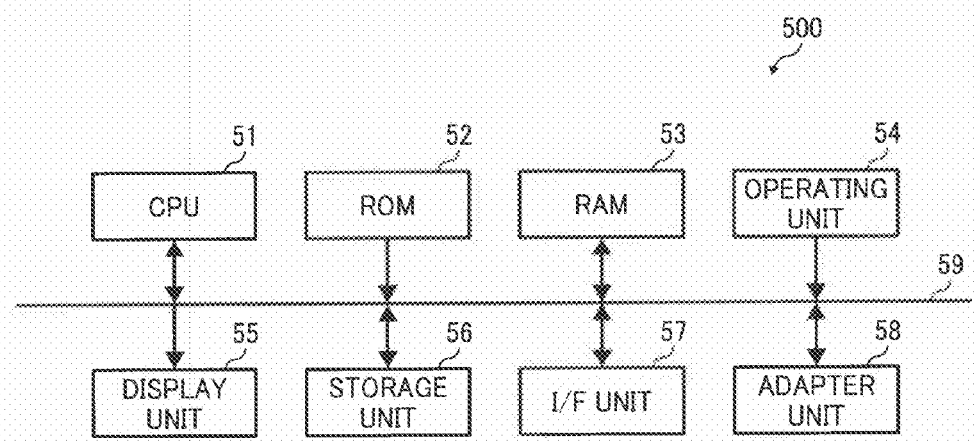
FIG. 36 is a block diagram of a hardware configuration of a client terminal shown in FIG. 32.

FIG. 36 is a block diagram of a hardware configuration of the client terminal 500. The client terminal 500 includes a CPU 51, a ROM 52, a RAM 53, an operating unit 54 that includes an input device such as a mouse and a keyboard, a display unit 55 that includes a display device such as a liquid crystal display monitor, a storage unit 56 that includes a storage device such as an HDD, an I/F unit 57 that controls communication with external devices, an adapter unit 58 to which a removable auxiliary storage device such as a memory card is attached, and a bus 59 that connects the above units to one another.

Figure 37:
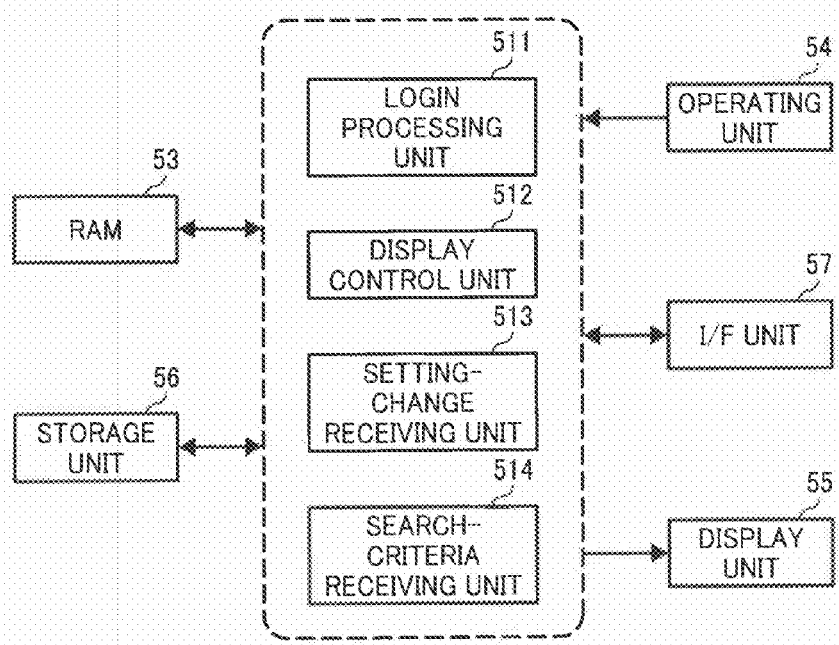
FIG. 37 is a block diagram of a functional configuration of the client terminal shown in FIG. 32.

The ROM 52 and the storage unit 56 store therein various computer programs and various data. The CPU 51 loads the computer programs from the ROM 52 and the storage unit 56 onto the RAM 53, and executes the loaded computer programs to control the client terminal 500 and realize various functional units, which are described later FIG. 37 is a block diagram of a functional configuration of the client terminal 500. The client terminal 500 includes a login processing unit 511, a display control unit 512, a setting-change receiving unit 513, and a search-criteria receiving unit 514, as functional units realized by executing computer programs stored in the ROM 52 and the storage unit 56 by the CPU 51.

The login processing unit 511 displays a login screen for logging in to the file management server 400 on the display unit 55. Upon receiving a user ID and a password from a user via the login screen, the login processing unit 511 sends a login request containing the user ID and the password to the file management server 400.

Figure 38:
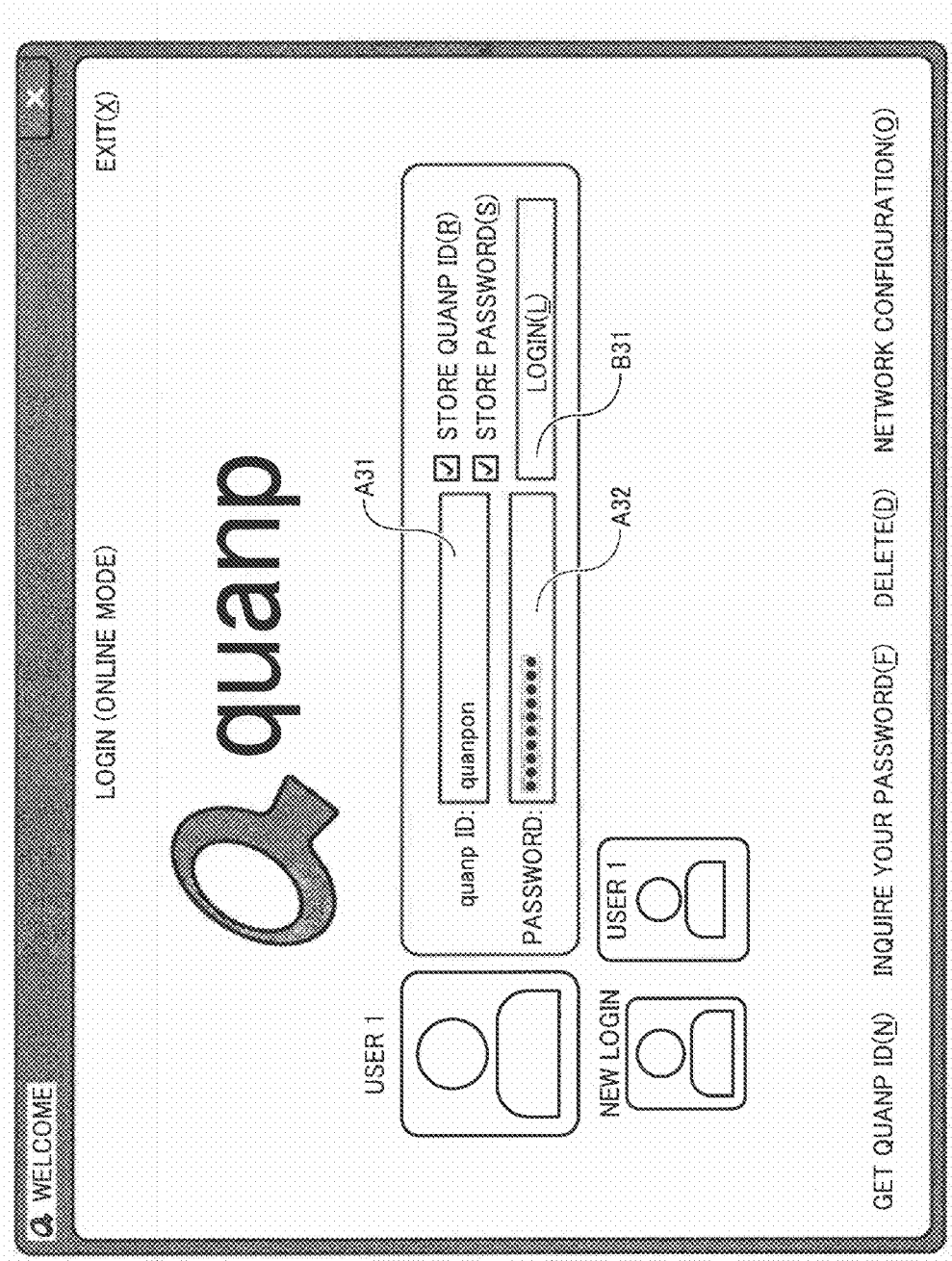
FIG. 38 is a diagram of an example of a login screen.

FIG. 38 is a diagram of an example of the login screen displayed on the display unit 55 by the login processing unit 511. The login screen contains an area A31 in which a user ID (in this example, referred to as "quanp ID") is entered and an area A32 in which a password is entered. Upon detecting that a button B31 for requesting login to the file management server 400 is pressed, the login processing unit 511 sends a login request containing at least a user ID entered in the area A31 and a password entered in the area A32 to the file management server 400.

Returning to the explanation of FIG. 37, the display control unit 512 displays a user interface, such as a place map screen as described above, on the display unit 55 based on data received from the file management server 400 via the I/F unit 57.

Specifically, upon receiving the setting information sent from the file management server 400 at the time of login or when settings are changed, the display control unit 512 stores the received setting information in the RAM 53 or the storage unit 56 using the tree structure as shown in FIG. 3.

Upon receiving an operation for displaying a screen from a user via the operating unit 54, the display control unit 512 displays a place map screen, a place view screen, or a file view screen on the display unit 55 based on the setting information stored in the RAM 53 or the storage unit 56.

Figure 39:
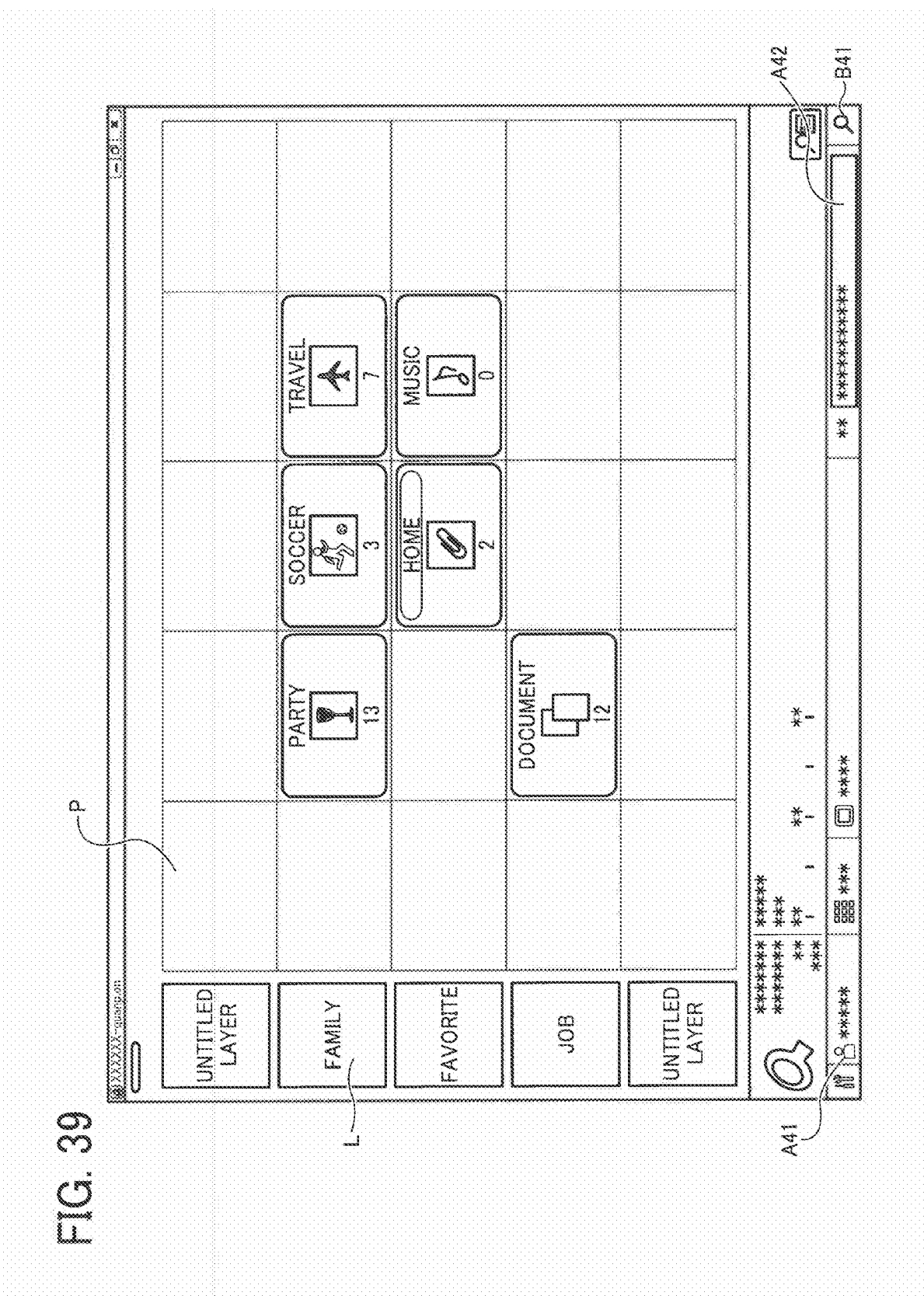
FIG. 39 is a diagram of an example of a place map screen.

FIG. 39 is a diagram of an example of the place map screen displayed on the display unit 55 by the display control unit 512. The place map screen shown in FIG. 39 is managed by a user whose user ID is "RICOH TARO" that is displayed in an area A41 by the display control unit 512. The place map screen contains three layers having layer names "Family",  "Favorite", "Work", respectively. Each of the layers contains places. For example, the layer named "Family" contains three places whose place names are "Party", "Football", and "Travel". The layer named "Favorite" contains two places whose place names are "Home" and "Music". The layer named "Work" contains one place whose place name is "Literature-Environmental Management". The number displayed on the bottom portion of each of the places corresponds to the number of files stored (uploaded) in each of the places. The total number of files is derived from the total number of "contentsID" folders stored in each of "placeID" folders.

An area A42 is used for entering a search key to be used as a keyword for file search. A button B41 is used for starting search for a file corresponding to a search key entered in the area A42. That is, when the button B41 is pressed, the search key entered in the area A42 is sent to the search-criteria receiving unit 514. If a layer is selected from the place map screen, the selected layer is notified as a search area with the search key to the search-criteria receiving unit 514.

Returning to the explanation of FIG. 37, the setting-change receiving unit 513 receives a request for changing setting of the place map screen or the place view screen, and sends a setting change request corresponding to the received request to the file management server 400. Thus, the file management server 400 is caused to change the setting. Operation that requires change of setting is, for example, registration, change, or deletion of layer names, layer attributes, or place name, as described above. Upon receiving such operation from a user via the operating unit 54, the setting-change receiving unit 513 sends, as a setting change request, the operation content and information containing at least a user ID of a user who is logging in to the client terminal 500.

The search-criteria receiving unit 514 receives input of a keyword as a search key and search criteria such as a search method described later, and sends a search request containing at least the search criteria and a user ID of a user who is logging in to the file management server 400. Thus, the file management server 400 is caused to search for a file.

Operation for a file management process performed by the file management server 400 and the client terminal 500 is described below.

Figure 40:
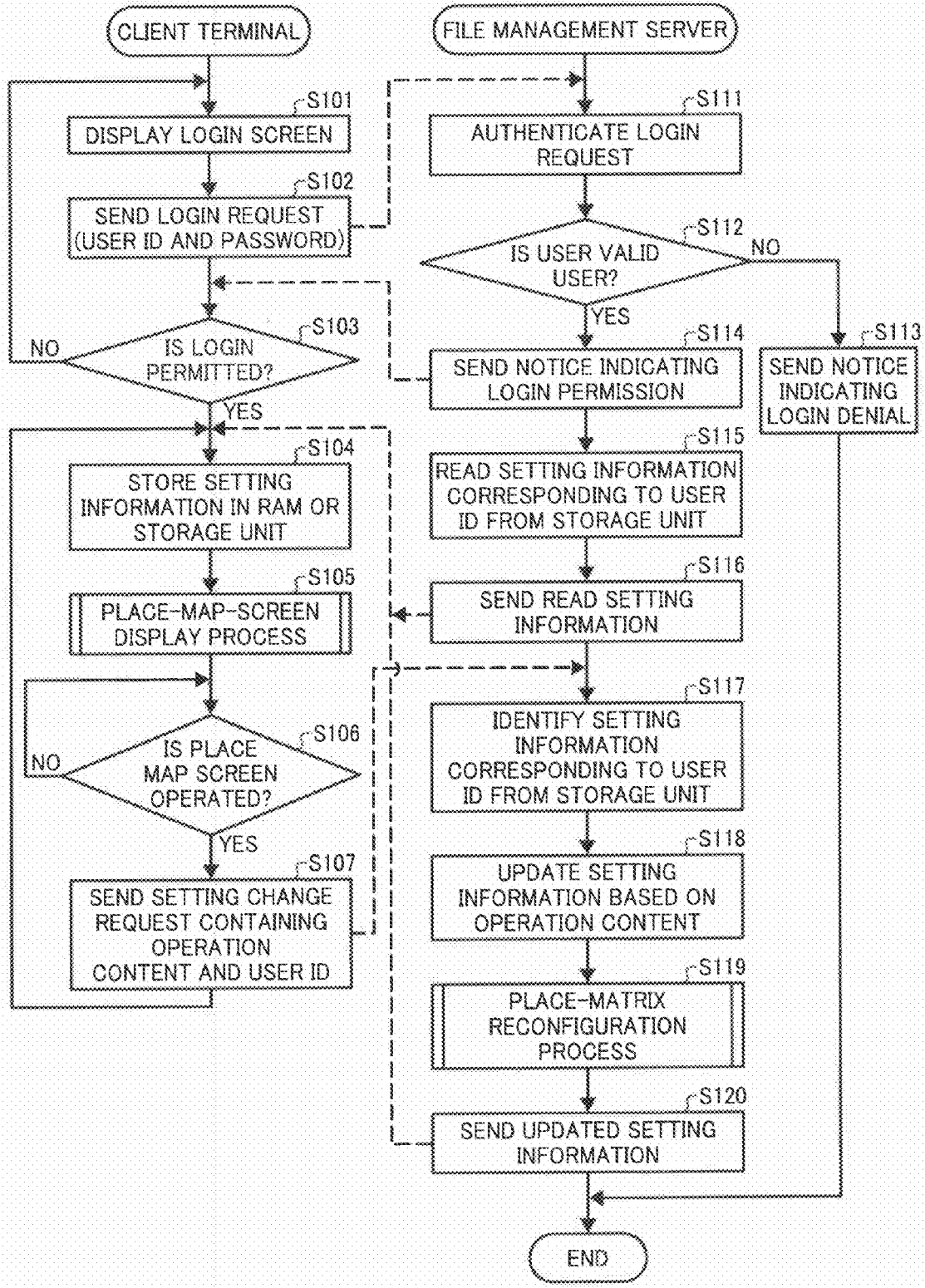
FIG. 40 is a flowchart of a procedure of a process for displaying a place map screen by the file management server and the client terminal shown in FIG. 32.

Operation for displaying a place map screen on the display unit 55 of the client terminal 500 is described below. FIG. 40 is a flowchart of a procedure of a process for displaying a place map screen by the file management server 400 and the client terminal 500. It is assumed that a user ID and a password of a user who operates the client terminal 500 are registered in advance in the file management server 400. It is also assumed that the user who uses the client terminal 500 is not invited to a shared place by other users.

The login processing unit 511 displays the login screen as shown in FIG. 38 before a user attempts to access the file management server 400 (Step S101). Upon determining that a login to the file management server 400 is requested by detecting that the button B31 is pressed, the login processing unit 511 sends a login request containing at least a user ID and a password entered in the login screen to the file management server 400 (Step S102).

Meanwhile, in the file management server 400, upon receiving the login request from the client terminal 500, the login control unit 411 performs authentication of the user by comparing the user ID and the password contained in the login request with verification data stored in the storage unit 46 (Step S111).

Upon determining that the user ID and the password contained in the login request do not match the verification data stored in the storage unit 46, that is, upon determining that the user in not a valid user (No at Step S112), the login control unit 411 returns response information indicating that the login is denied to the client terminal 500 that has requested the login (Step S113), and process control ends.

On the other hand, upon determining that the user ID and the password contained in the login request match the verification data stored in the storage unit 46, that is, upon determining that the user in a valid user (Yes at Step S112), the login control unit 411 returns response information indicating that the login is permitted to the client terminal 500 that has requested the login (Step S114), and process control proceeds to Step S115.

In the client terminal 500, the login processing unit 511 receives the response information from the file management server 400 and determines whether the response information indicates that the login is permitted (Step S103). When the login processing unit 511 determines that the response information indicates that the login is denied (No at Step S103), process control returns to Step S101 and the login screen is displayed again on the display unit 55. At this state, it is possible to display information indicating that the user ID and the password that have been entered are wrong on the display unit 55. When the response information indicates that the login is permitted (Yes at Step S103), process control proceeds to Step S104.

In the file management server 400, when the login control unit 411 determines that the user is a valid user, the file managing unit 412 reads, from the storage unit 46, the setting information (place map information, etc.) associated with the user ID that is contained in the login request (Step S115), and sends the read setting information to the client terminal 500 that has requested the login (Step S116). It is noted that, when the user who is operating the client terminal 500 is invited to a shared place, a placeID name contained in the place map information ("Z" in <placeID="Z">) does not match a folder name of the "placeID" folder containing a member list in which the user ID of that user is registered. This situation will be explained later.

In the client terminal 500, the display control unit 512 receives the setting information from the file management server 400, and stores the received setting information in the RAM 53 or the storage unit 56 using the tree structure as shown in FIG. 3 (Step S104). Then, the display control unit 512 performs the place-map-screen display process based on the setting information stored at Step S104 to display the place map screen as shown in FIG. 38 on the display unit 55 (Step S105). The place-map-screen display process performed at Step S105 is the same as that performed at Step S11, and therefore, the same explanation is not repeated.

While the place map screen is being displayed, the setting-change receiving unit 513 keeps monitoring whether operation for changing setting content is input (No at Step S106). Upon determining that operation for changing setting content is input (Yes at Step S106), the setting-change receiving unit 513 sends a setting change request containing at least information indicating the operation content and the user ID of the user who is logging in, to the file management server 400 (Step S107).

In the file management server 400, upon receiving the setting change request from the client terminal 500, the setting changing unit 413 identifies the setting information associated with the user ID contained in the setting change request from the storage unit 46 (Step S117). Then, the setting changing unit 413 updates the setting information identified at Step S117 based on the operation content contained in the setting change request (Step S118), and performs the place-matrix reconfiguration process on the place map information associated with the user ID (Step S119). The place-matrix reconfiguration process performed at Step S119 is the same as that performed at Step S21, and therefore, the same explanation is not repeated.

The file managing unit 412 reads the setting information updated at Step S118 from the storage unit 46, and sends the updated setting information to the client terminal 500 that has sent the setting change request (Step S120).

For example, upon receiving, at Step S106, a request for moving a place named "Music" that is contained in the layer named "Favorite" to a place on the left side of the place named "Home" in the place map screen shown in FIG. 39, the setting-change receiving unit 513 sends a setting change request containing at least information indicating the above move of the place (e.g., information about the place before move and the place after move) and a user name "RICOH TARO" to the file management server 400.

In this case, the setting changing unit 413 exchanges a position of the place setting of the place before move and a position of the place setting of the place after move with each other from among the place settings associated with the user name "RICOH TARO". Consequently, the place is moved as requested by the user. In the place-matrix reconfiguration process at Step S119, the edge determination process that is the same as that performed at Step S2116 is performed. However, in this example, the place map is neither expanded nor reduced.

Furthermore, upon subsequently receiving a request for registering a new place with a place name "Movie" in a column on the right of the place named "Home", the setting-change receiving unit 513 sends a setting change request containing at least information for requesting registration of the place with the place name "Movie" in the requested position and the user name "RICOH TARO" to the file management server 400. It is applicable to display a support screen as shown in FIG. 41 by the setting-change receiving unit 513 when a place name is registered.

Figure 41:
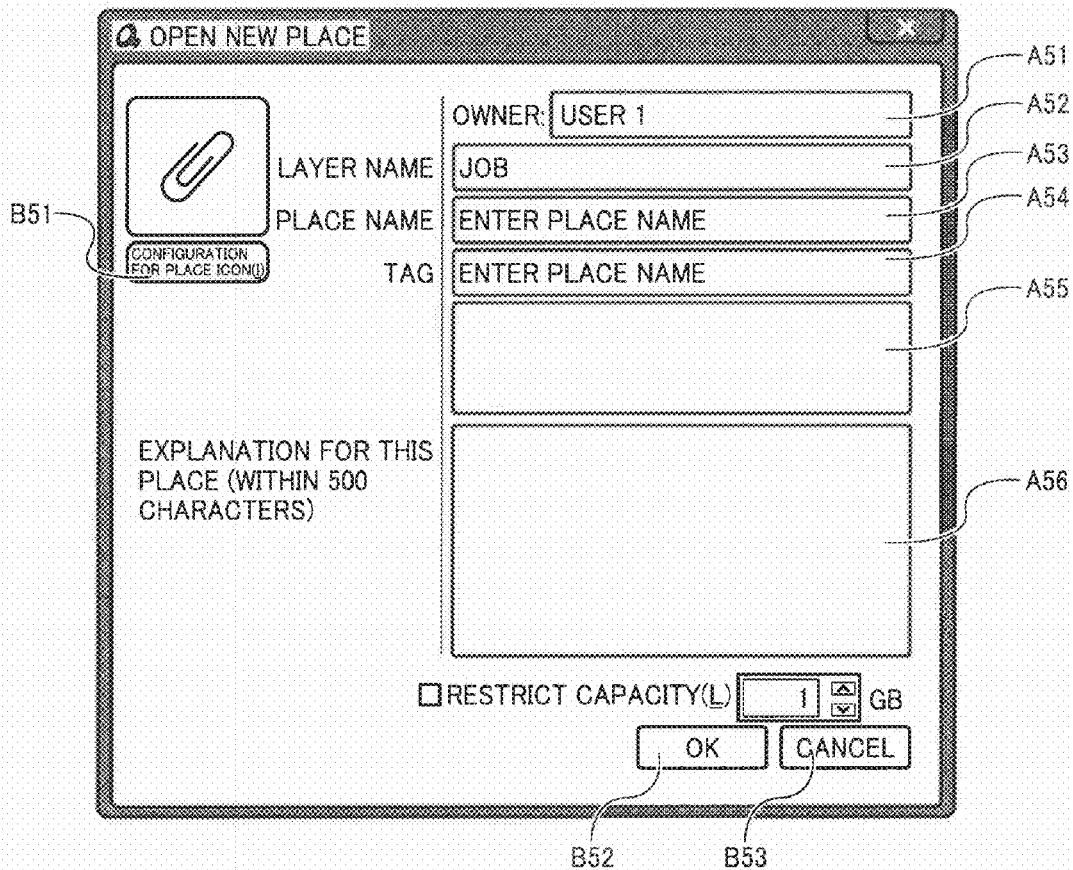
FIG. 41 is a diagram of an example of a support screen for registering a place name.

In the example shown in FIG. 41, an area A51 is used for displaying the user ID of an owner of the place. Specifically, the user ID of a user who is logging in is displayed in the area A51 in read-only mode. An area A52 is used for displaying a layer name of a layer in which the place is contained. Specifically, the layer name of a layer containing the place whose setting is to be changed is displayed in the area A52 in read-only mode. An area A53 is used for entering a place name. An area A54 is used for entering a place attribute. When the place attribute is already set, the set place attribute is displayed in an area A55. An area A56 is used for entering arbitrary character string such as a comment to be associated with the place.

Figure 42:
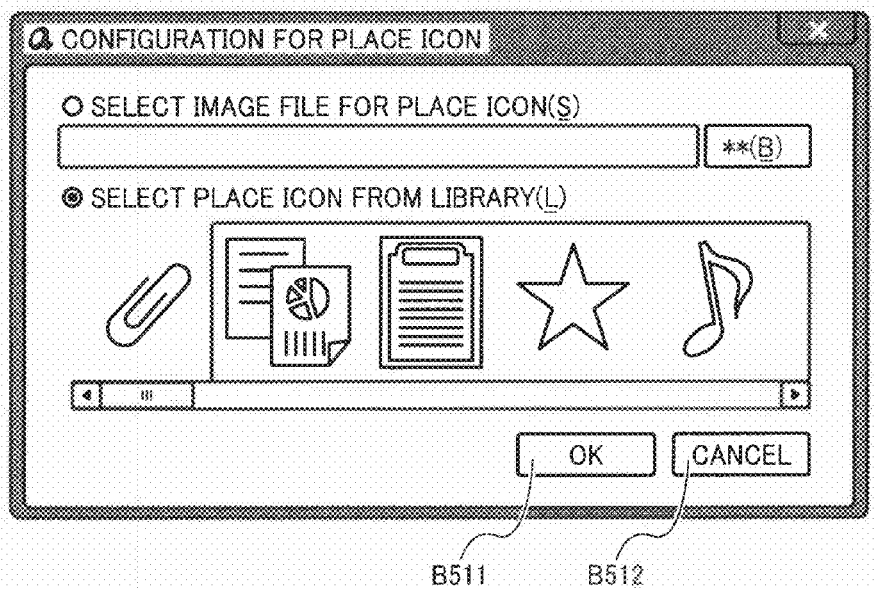
FIG. 42 is a diagram of an example of a support screen for selecting an icon image.

A button B51 is used for displaying a support screen for selecting an icon image to be displayed in the place. When the button B51 is pressed, the setting-change receiving unit 513 displays a support screen for selecting an icon image as shown in FIG. 42. With the support screen shown in FIG. 42, an icon image can be selected from among image files stored in the storage unit 56 or icon images that are installed in advance. When an icon image is selected and then a button B511 is pressed, contents entered and set in the support screen are sent to the setting-change receiving unit 513. In this case, the setting-change receiving unit 513 adds the selected icon image to the setting change request when sending the setting change request to the file management server 400. When a button B512 is pressed, the setting-change receiving unit 513 closes the support screen shown in FIG. 42.

Returning to the explanation of FIG. 41, when a user presses a button B52, contents entered and set in the support screen is sent to the setting-change receiving unit 513. When a button B53 is pressed, the setting-change receiving unit 513 closes the support screen. The support screens shown in FIGS. 41 and 42 are merely examples and configuration of the support screens is not limited to these examples.

Upon receiving the setting change request containing at least information for requesting registration of the place with the place name "Movie" and the user name "RICOH TARO" from the client terminal 500, the setting changing unit 413 registers the place name "Movie" in the place setting of the requested place among place settings associated with the user name "RICOH TARO", and registers the user ID "RICOH TARO" as an owner in the member list of the requested place. Thus, the information entered and set in the support screen shown in FIG. 41 is reflected in the setting information. When the icon image for the place is contained in the setting change request, the icon image is stored in a predetermined location (under the "placeID" folder).

Figure 43:
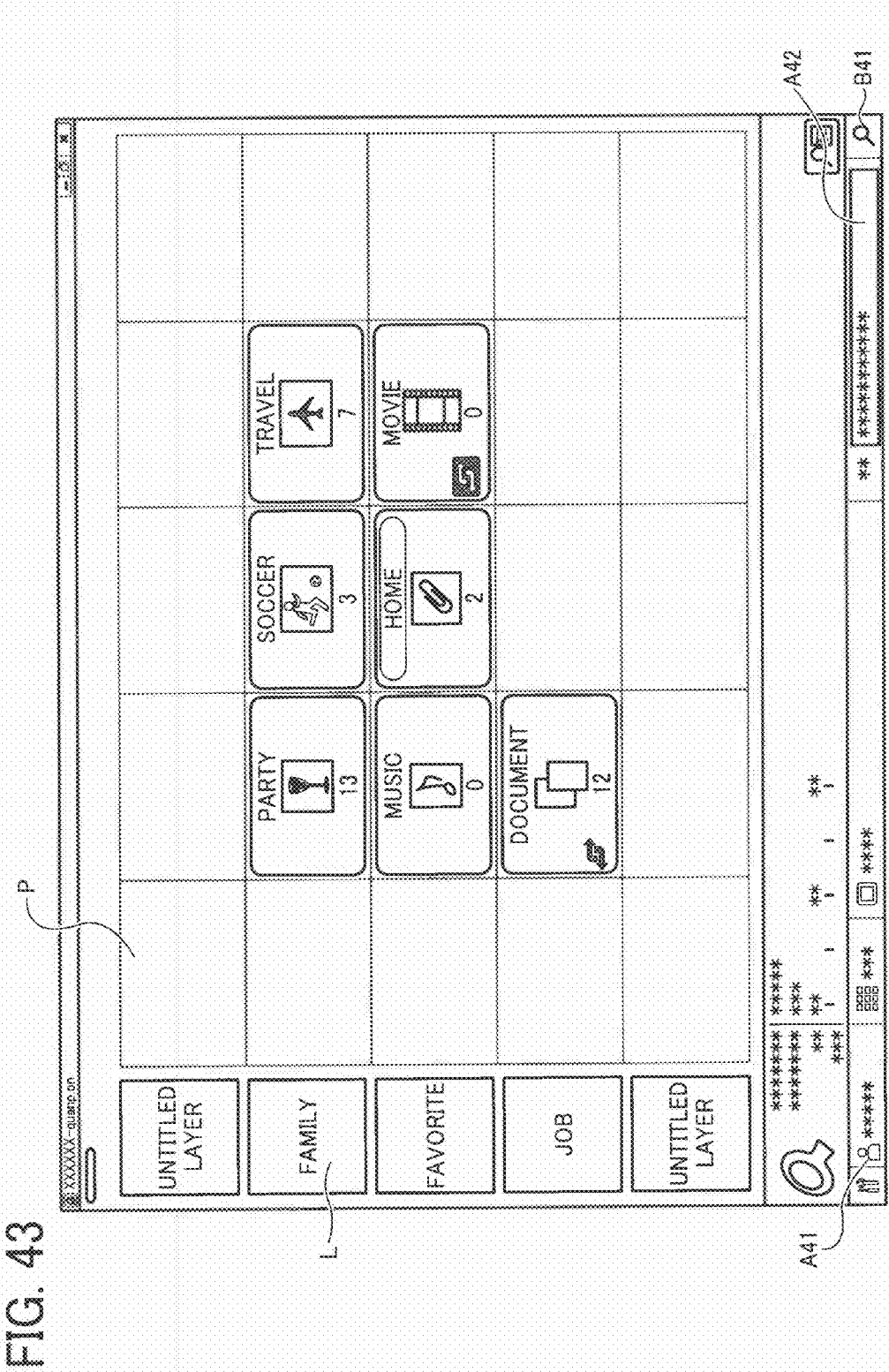
FIG. 43 is a diagram of an example of a place map screen.

FIG. 43 is a diagram of an example of the place map screen displayed on the display unit 55 by the display control unit 512 after the operation described above has been performed. In this example, the place named "Music" is moved, and the place named "Movie" is newly registered in the requested place.

In this manner, the place information associated with each of the layer information is displayed as a place image, which is a unit for managing files, in the same hierarchy. Therefore, a relationship between the places can be intuitively recognized. Thus, files can be effectively managed. Furthermore, because the places are displayed as a matrix, a relationship between the places can be orderly viewed in an array. As a result, the relationship between the places can be more effectively and intuitively recognized.

Figure 44:
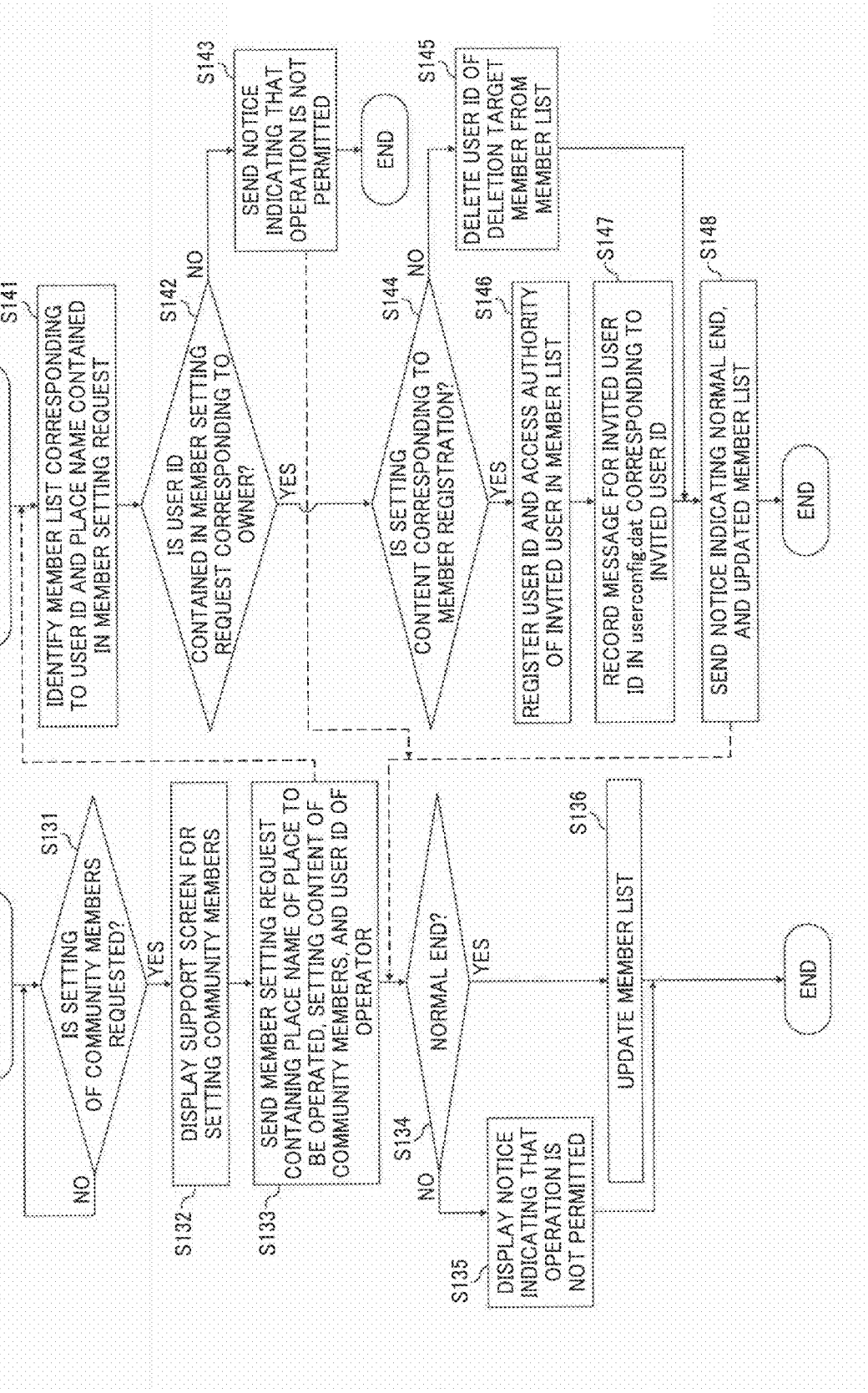
FIG. 44 is a flowchart of a procedure of a process for changing setting of a shared place by the file management server and the client terminal shown in FIG. 32.

Operation for changing setting of the member list is described below. FIG. 44 is a flowchart of a procedure of a process for changing setting of a shared place by the file management server 400 and the client terminal 500. It is assumed that the place map screen is being displayed on the display unit 55 of the client terminal 500 when performing this operation.

The setting-change receiving unit 513 waits for reception of a request for changing setting of community members who share a specified place in the place map screen displayed on the display unit 55 (No at Step S131). The community members are users registered in the member list of each of places.

Upon determining that change of setting of community members is requested (Yes at Step S131), the setting-change receiving unit 513 displays a support screen for changing the setting of the community members on the display unit 55, based on the member list of the place whose setting of the community members is to be changed due to the request (Step S132).

Figure 45:
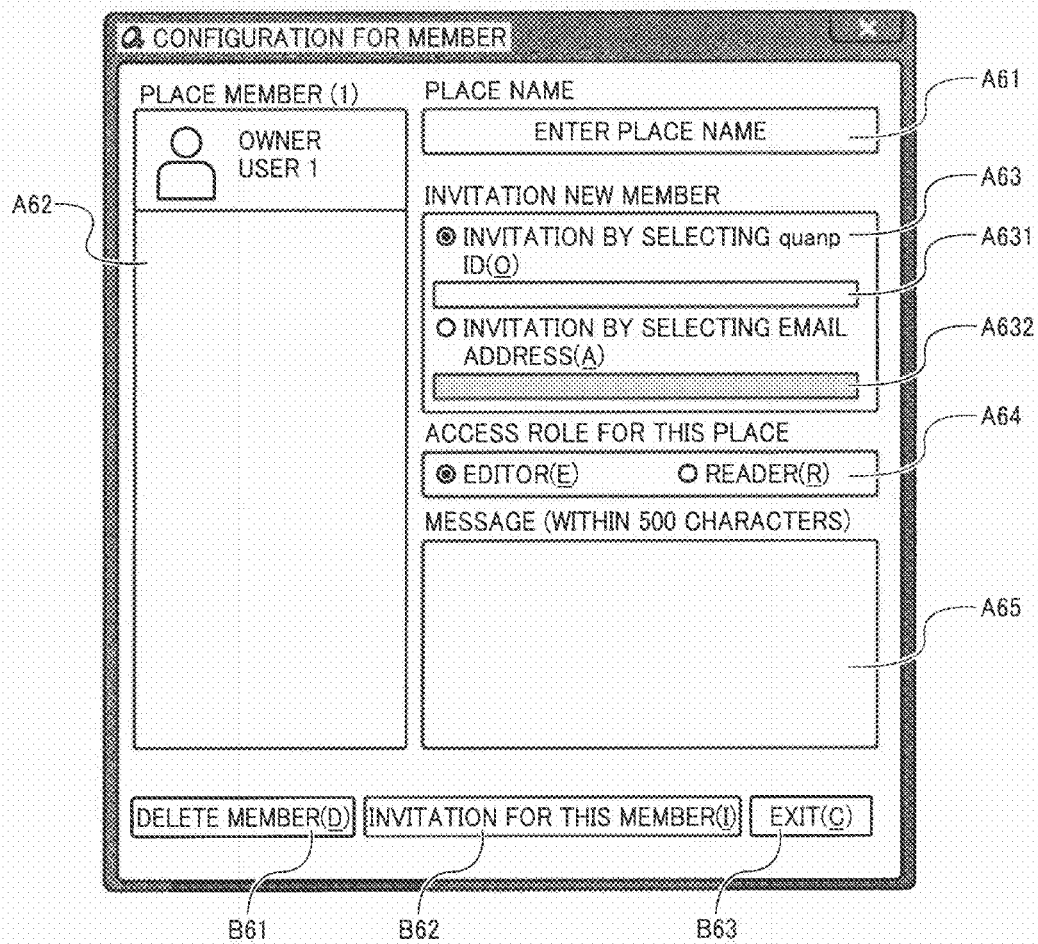
FIG. 45 is a diagram of an example of a support screen for setting a community member.

FIG. 45 is a diagram of an example of a support screen displayed at Step S132 for setting the community members. An area A61 is used for displaying a place name of a place whose setting of community members are to be changed. When a place name (placeID) is already registered in the place, the setting-change receiving unit 513 displays the place name in the area A61. When the place name is not registered in the place, it is possible to display a notice (character string) for requesting a user to enter a place name such that the place name can be registered at the same time when the setting of the community members is completed.

An area A62 is used for displaying community members (user IDs) of the place whose setting of the community members is to be changed. The setting-change receiving unit 513 reads a member list of the place and displays user IDs registered in the read member list in the area A62. A user of the client terminal 500 can select any user IDs displayed on the area A62. By selecting a user ID from the community members of the place and then pressing a button B61, the user can unregister a user of the selected user ID from the community members.

An area A63 is used for entering an user ID of a user to be registered in the member list of the place displayed in the area A61, that is, to be invited as a community member of the place (hereinafter, "invited user ID"). An area A631 is used for entering the invited user ID. An area A632 is used for entering an e-mail address of a user to be invited to the place. The user of the client terminal 500 can selectively use either an invited user ID or an e-mail address to invite a new user. When e-mail is selected, a message entered in an area A65, which will be described later, and information about invitation to be a community member of the place are sent to a user to be invited, via an e-mail system installed in the client terminal 500 or in the file management server 400.

Area A64 is used for setting access authority of a user to be invited to the place displayed in the area A61. The user of the client terminal 500 can set the access authority by selecting either one of radio buttons indicating "editor" and "reader" for the user to be invited via the area A63 (area A631). The "editor" allows a user to write (register and delete) and read files contained in the place. The "reader" allows a user only to read files contained in the place.

The area A65 is used for entering a message to the user to be invited to the place. That is, the user of the client terminal 500 can enter an arbitrary message in the area A65, and the entered message is sent to the user to be invited to the place. In the example shown in FIG. 45, it is assumed that a message must be within 500 words. However, the number of words is not limited to this example.

The button B61 is used for requesting deletion of a specified user ID from the community members. Specifically, when a user ID is selected from among user IDs displayed in the area A62, and then the button B61 is pressed, the setting-change receiving unit 513 sends a member deletion request containing a user ID of the user who is operating the client terminal 500, a place name of a place whose setting of the community members is to be changed, and a user ID to be deleted, to the file management server 400. There can be a configuration in which the button B61 is inactivated to prevent deletion of a user ID when the selected user ID is the owner of the place.

A button B62 is used for registering a user invited via the area A63 in the community members of the place displayed in the area A61. Specifically, when information is entered and setting is completed in the areas A63 (A631) to A65 and then the button B62 is pressed, the setting-change receiving unit 513 sends a member registration request containing a user ID of the user who is operating the client terminal 500 (hereinafter, "operator user ID"), a place name of the place whose setting of the community members is to be changed, and contents entered and set from the areas A63 (A631) to A65, to the file management server 400.

When e-mail is selected in the area A63 for inviting a user, it is possible to send e-mail to the user to be invited from the client terminal 500. When the file management server 400 includes an e-mail system, it is possible to send e-mail to the user to be invited by using that e-mail system. In this case, the setting-change receiving unit 513 sends a member registration request containing the operator user ID, a place name of the place whose setting of the community members is to be changed, and contents entered and set from the areas A632 to A65, to the file management server 400.

A button B63 is used for terminating setting of the community members. When the button B63 is pressed, the setting-change receiving unit 513 closes the support screen shown in FIG. 45.

Returning to the explanation of FIG. 44, upon receiving a request for deleting or registering a user ID with respect to a place whose setting of community members is to be changed, the setting-change receiving unit 513 sends a member setting request (the member deletion request or the member registration request) corresponding to the received request to the file management server 400 (Step S133). The member setting request contains a place name whose setting of the community members is to be changed, and the operator user ID.

Meanwhile, in the file management server 400, upon receiving the member setting request from the client terminal 500, the setting changing unit 413 identifies a member list corresponding to the operator user ID of the client terminal 500 and a place name of the place whose setting is to be changed, which are contained in the member setting request, from the storage unit 56 (Step S141).

The setting changing unit 413 determines whether the operator user ID contained in the member setting request is registered as the owner in the member list identified at Step S141 (Step S142). Upon determining that the operator user ID does not correspond to the owner (No at Step S142), the setting changing unit 413 sends information indicating that operation is not permitted to the client terminal 500 that has sent the member setting request (Step S143), and process control ends.

Upon determining that the operator user ID corresponds to the owner (Yes at Step S142), the setting changing unit 413 determines whether the member setting request is the member deletion request or the member registration request based on the contents of the member setting request (Step S144).

Upon determining that the member setting request is the member deletion request (No at Step S144), the setting changing unit 413 deletes the user ID specified by the member deletion request from the member list identified at Step S141 (Step S145), and process control proceeds to Step S148.

On the other hand, upon determining that the member setting request is the member registration request (Yes at Step S144), the setting changing unit 413 registers the invited user ID specified by the member registration request and appends access authority to the invited ID in the member list identified at Step S141, in an associated manner (Step S146). Then, the setting changing unit 413 registers a message contained in the member registration request for the invited user ID, in the "userconfig.dat" stored in the map managing section 210 associated with the invited user ID (Step S147), and process control proceeds to Step S148.

The file management server 400 sends information indicating change of setting of the community members is completed and the member list updated at Step S145 or S146 to the client terminal 500 that has sent the member setting request (Step S148).

Meanwhile, in the client terminal 500, the setting-change receiving unit 513 determines whether the information indicating change of setting of the community members is completed is received from the file management server 400 (Step S134). Upon determining that information indicating that operation is not permitted is received (No at Step S134), the setting-change receiving unit 513 displays information indicating that change of setting the community member is not permitted on the display unit 55 (Step S135), and process control ends.

On the other hand, upon receiving information indicating that change of setting of the community members is completed (Yes at Step S134), the setting changing unit 413 restores the updated member list received with the information in the RAM 53 or the storage unit 56, and thereby, the member list of the requested place is updated (Step S136).

In the above example, processes for inviting a user by sending an invited user ID as the user registration request are described. Alternatively, when an e-mail address of an invited user is to be used, the following process is applicable to register the invited user as a community member of the shared place. Specifically, when an e-mail address of each user is registered in each of "userconfig.dat" files, the file management server 400 searches for a "userconfig.dat" containing an e-mail address identical to the e-mail address of the invited user, and then registers a user ID associated with the retrieved "userconfig.dat" in the member list of the shared place.

When an e-mail address identical to the e-mail address of the invited user is not registered in any one of the "userconfig.dat" files, it is possible to store the e-mail address of the invited user in association with the shared place to which the user is invited. Then, when a new e-mail address of a new user is registered and the registered e-mail address corresponds to the stored e-mail address of the invited user, a user ID of the new user is registered in the member list of the invited place.

Operation performed by the client terminal 500 and the file management server 400 when a user joins a shared place is descried below. FIG. 46 is a flowchart of a procedure of a process performed by the file management server 400 and the client terminal 500 when a user joins a shared place. It is assumed that a user ID of a user who is operating the client terminal 500 is registered in advance in the file management server 400. It is also assumed that the user who is operating the client terminal 500 is permitted to login to the file management server 400. The process shown in FIG. 46 is continued from Step S114 performed by the file management server 400 and Step S103 performed by the client terminal 500 in the process of FIG. 40.

In the file management server 400, when the login control unit 411 determines that the user is a valid user, the file managing unit 412 reads setting information associated with the user ID contained in the login request sent from the client terminal 500 (Step S161).

Then, the file managing unit 412 compares a place name registered in the place map information read at Step S161 with a folder name (place name) of each of "placeID" folders whose member list containing the user ID that is contained in the login request (Step S162). The file managing unit 412 then determines whether the place names are corresponding to each other (Step S163). At this time, a place name that is explicitly defined in the place map information is to be compared with the folder name at Step S162.

Upon determining that the place names are corresponding to each other (EQ at Step S163), the file managing unit 412 sends the setting information read at Step S161 to the client terminal 500 that has sent the login request (Step S164), and process control ends. The processes performed at Steps S163 (EQ) and S164 are the same as those at Steps S115 and S116.

Upon determining that more place names are registered in the place map information than those of existing "placeID" folders (DEL at Step S163), the file managing unit 412 determines that the user ID contained in the login request has been deleted from a member list of a shared place or the shared place itself has been deleted. Then, the file managing unit 412 causes the place-matrix reconfiguring unit 414 to perform the registration-status determination process on the place map information associated with the user ID contained in the login request (Step S165). The registration-status determination process performed at Step S165 is the same as that performed at Step S2114, and therefore, the same explanation is not repeated.

The file managing unit 412 sends additional information indicating that the shared place has been deleted and the setting information read at step S161 and containing the place map information processed at Step S165 to the client terminal 500 that has sent the login request (Step S166), and process control ends. At this time, the additional information contains, as a place name of the shared place that has been deleted, a place name remained in the place map information after comparison at Step S163.

Upon determining that less place names are registered in the place map information than those of the existing "placeID" folders (ADD at Step S163), the file managing unit 412 determines that the user ID contained in the login request is invited to a shared place. The file managing unit 412 then sends additional information indicating invitation to the shared place and the setting information read at Step S161 to the client terminal 500 that has sent the login request (Step S167), and process control proceeds to Step S168. At this time, the additional information contains a place name of a remaining "placeID" folder after comparison at Step S163.

Meanwhile, in the client terminal 500, upon receiving the setting information from the file management server 400, the display control unit 512 stores the setting information in the RAM 53 or the storage unit 56 (Step S151). Then, the display control unit 512 performs the place-map-screen display process based on the setting information stored at Step S151 to display the place map screen as shown in FIG. 39 on the display unit 55 (Step S152). The place-map-screen display process performed at Step S152 is the same as that performed at Step S31, and therefore, the same explanation is not repeated.

The display control unit 512 determines whether the additional information is received with the setting information (Step S153). When the display control unit 512 determines that the additional information is not received (No at Step S153), process control ends.

Upon determining that the additional information is received (Yes at Step S153), the display control unit 512 determines whether the additional information indicates invitation to the shared place or deletion of the shared place (Step S154).

Upon determining that the additional information indicates deletion of the shared place (No at Step S154), the display control unit 512 displays a screen for notifying a place name of the shared place that has been deleted on the display unit 55 based on the additional information (Step S155), and process control ends.

On the other hand, upon determining that the additional information indicates invitation to the shared place (Yes at Step S154), the display control unit 512 displays a screen for confirming whether to join the shared place on the display unit 55 based on the additional information, the "userconfig.dat" that is the setting information stored in advance, and the member list of the shared place (Step S156).

Figure 47:
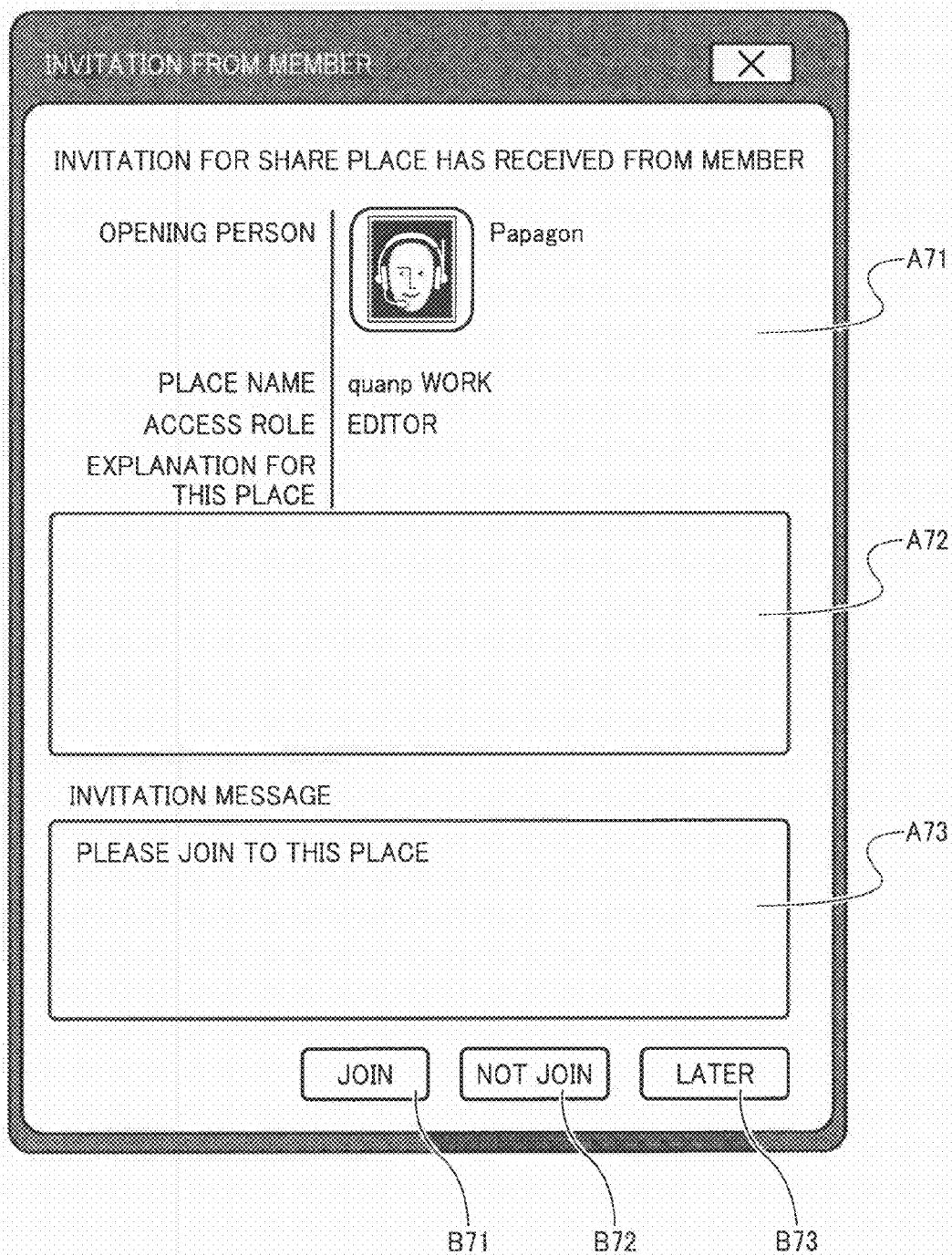
FIG. 47 is a diagram of an example of a screen for confirming whether to join a shared place.

FIG. 47 is a diagram of an example of a screen displayed at Step S156 for confirming whether to join a shared place. An area A71 is used for displaying information about the shared place to which a user who is operating the client terminal 500 is invited. The display control unit 512 displays the place name of the shared place, which is contained in the additional information, a user ID of the owner of the shared place (who opened the shared place), and an access authority of the invited user based on the member list of the shared place, in the area A71. An area A72 is used for displaying information about the shared place, other than information displayed in the area A71.

An area A73 is used for displaying a message to the user who is operating the client terminal 500 (the invited user ID). Specifically, information entered in the area A65 of FIG. 45, which is the message contained in the "userconfig.dat" by the owner of the shared place, is displayed in the area A73 by the display control unit 512.

The invited user can select whether to accept the invitation by pressing one of buttons B71 to B73 via the operating unit 54. The button B71 is used for accepting the invitation. When the button B71 is pressed, the user is continuously led to enter a position where the shared place is to be arranged in the place map screen. Upon receiving selection of the button B71, the setting-change receiving unit 513 sends response information containing information indicating acceptance of the invitation, the user ID of the user who is operating the client terminal 500, the place name of the shared place to which the user is invited, and information about a position where the shared place is to be arranged, to the file management server 400.

The button B72 is used for refusing invitation. Upon receiving selection of the button B72, the setting-change receiving unit 513 sends response information containing information indicating refusal of the invitation, the user ID of the user who is operating the client terminal 500, and the place name of the shared place to which the user is invited, to the file management server 400. The button B73 is used for holding an answer. Upon receiving selection of the button B73, the setting-change receiving unit 513 closes the support screen shown in FIG. 47.

Returning to the explanation of FIG. 46, upon determining that the user has held an answer about whether to accept the invitation via the support screen displayed at Step S156 (HOLD at Step S157), the setting-change receiving unit 513 closes the support screen displayed at Step S1456, and process control ends.

Upon determining that the user has refused the invitation via the support screen displayed at Step S156 (REFUSAL at Step S157), the setting-change receiving unit 513 closes the support screen displayed at Step S156. Then, the setting-change receiving unit 513 sends the response information containing information indicating refusal of the invitation, the user ID who is operating the client terminal 500, and the place name of the shared place to which the user is invited, to the file management server 400 (Step S158). Then, process control returns to Step S151 at which the display control unit 512 acquires the setting information from the file management server 400 in response to the response information.

Upon determining that the user has accepted the invitation via the support screen displayed at Step S156 (ACCEPTANCE at Step S157), the setting-change receiving unit 513 closes the support screen displayed at Step S156. Then, the setting-change receiving unit 513 sends the response information containing information indicating acceptance of the invitation, the user ID who is operating the client terminal 500, the place name of the shared place to which the user is invited, and a position where the shared place is to be arranged, to the file management server 400 (Step S159). Then, process control returns to Step S151 at which the display control unit 512 acquires the setting information from the file management server 400 in response to the response information.

Meanwhile, in the file management server 400, upon receiving the response information from the client terminal 500, the setting changing unit 413 determines whether the response information indicates acceptance of the invitation based on the information contained in the response information (Step S168). Upon determining that the response information indicates refusal of the invitation (No at Step S168), the setting changing unit 413 deletes the user ID contained in the response information from the member list of the "placeID" folder corresponding to the place name contained in the response information (Step S169). Then, process control proceeds to Step S172.

Upon determining that the response information indicates acceptance of the invitation (Yes at Step S168), the setting changing unit 413 identifies the place map information associated with the user ID contained in the response information from the map managing section 210, and sets the place name of the shared place to the place setting 202 at a position corresponding to the position of the shared place contained in the response information (Step S170).

Then, the setting changing unit 413 performs the edge determination process on the place map information whose setting is changed at Step S170 (Step S171), and process control proceeds to Step S172. The edge determination process performed at Step S171 is the same as that performed at Step S2112, and therefore, the same explanation is not repeated.

The file managing unit 412 sends the setting information whose setting is changed, that is, the member list processed at Step S169, or the place map information processed at Steps s170 and S171 to the client terminal 500 that has sent the response information (Step S172). In the client terminal 500, upon receiving the setting information sent at Step S172, the display control unit 512 stores the received setting information in the RAM 53 or the storage unit 56 at Step S151. As a result, the setting information is updated.

In this manner, place images can be provided for each user ID, and thereby, the user can manage files by using own place images. Furthermore, place images can be shared by a plurality of users. This is advantageous in that operation that requires a plurality of users to take part in, such as exchanging of files, can be performed easily. Moreover, a user who is invited to a shared place can select whether to accept the invitation to the shared place. Therefore, usability of the user can be improved.

Figure 48:
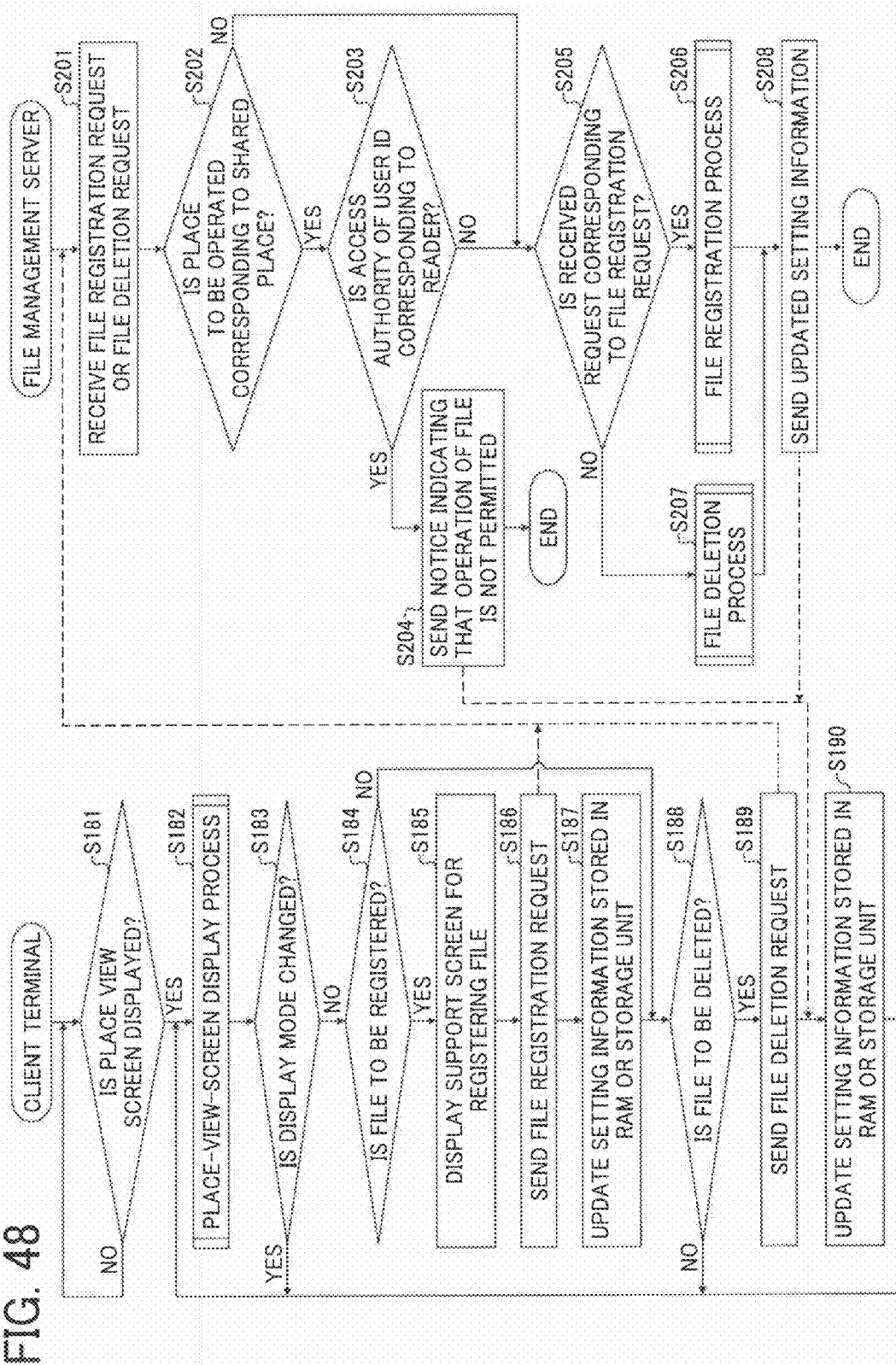
FIG. 48 is a flowchart of a procedure of a process for displaying a place view screen by the file management server and the client terminal shown in FIG. 32.

Operation for displaying the place view screen is described below. FIG. 48 is a flowchart of a procedure of a process for displaying the place view screen by the file management server 400 and the client terminal 500. It is assumed that the place map screen is being displayed on the display unit 55 of the client terminal 500.

The display control unit 512 waits for reception of request for displaying a place view screen of a place specified from places displayed on the place map screen (No at Step S181). Upon determining that display of the place view screen is requested (Yes at Step S181), the display control unit 512 refers to the "placeID" folder of the specified place from the place managing section 310 of the setting information stored in the RAM 53 or the storage unit 56, and performs the place-view-screen display process (Step S182). The place-view-screen display process performed at Step S182 is the same as that performed at Step S13, and therefore, the same explanation is not repeated.

At Step S182, the display control unit 512 displays the place view screen in a display mode corresponding to one of the place view screens G21 to G23 shown in FIG. 7. The display mode of the place-view screen is described in detail below.

Figure 49:
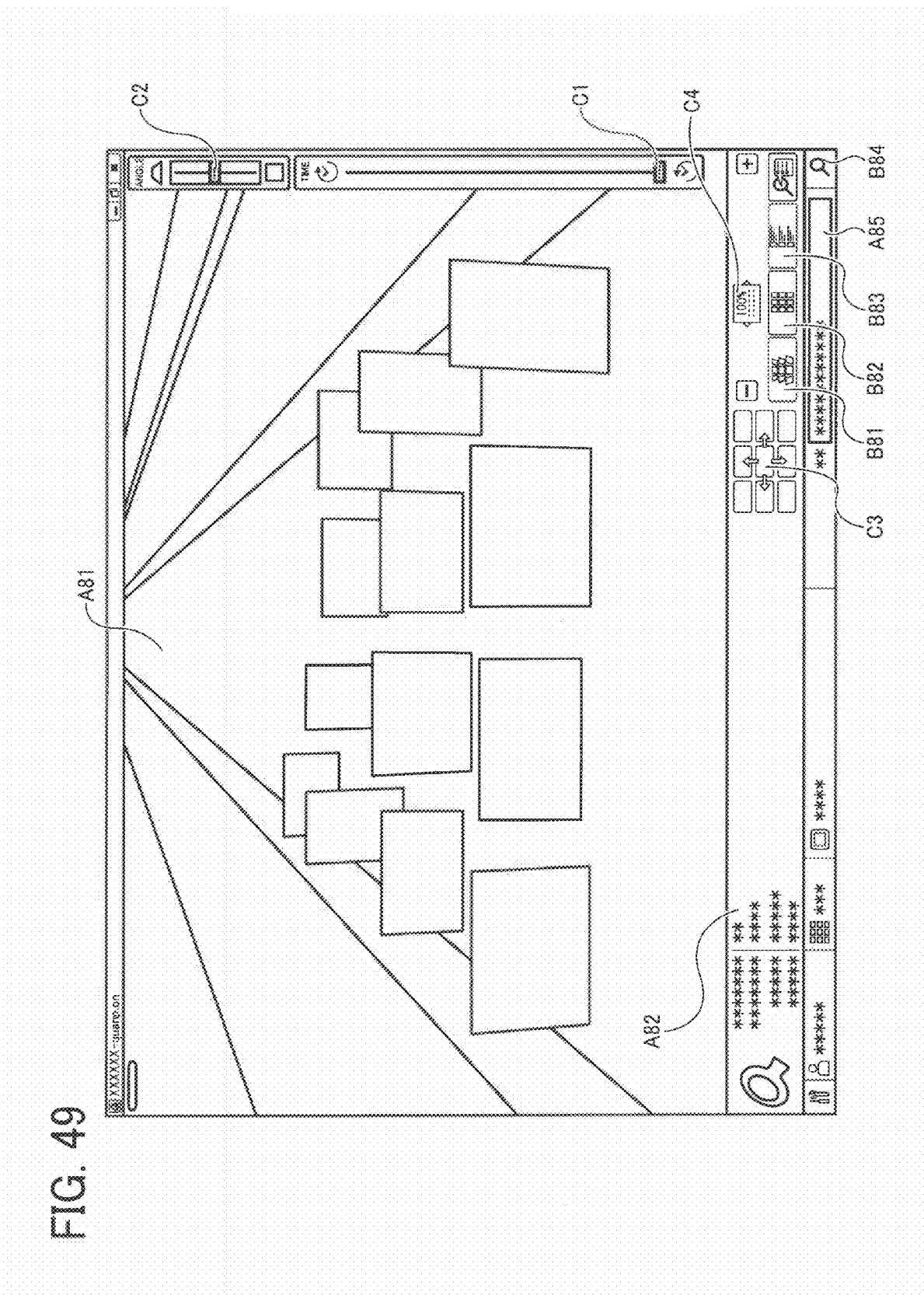
FIG. 49 is a diagram of an example of a place view screen.

FIG. 49 is a diagram of an example of the place view screen in a display mode corresponding to the place view screen G21 shown in FIG. 7. In the example shown in FIG. 49, files in a place named "Party" in the place map screen shown in FIG. 39 are displayed in the place view screen.

An area A81 is used for displaying thumbnail images of files registered in a place specified as a display target. In the example shown in FIG. 49, the thumbnail images of files registered in the place specified as the display target are displayed three-dimensionally in the area A81 in the order of dates when the files are registered.

A cursor C1 is used for moving arrays of the thumbnail images to be displayed in the area A81. When the cursor C1 is moved upward or downward, the display control unit 512 moves arrays of the thumbnail images such that thumbnail images on farther lines or on nearer lines are scrolled in the area A81 of the place view screen. Consequently, temporally newer or older thumbnail images are displayed in the place view screen.

A cursor C2 is used for changing a display angle of the thumbnail images displayed in the area A81. When the cursor C2 is moved upward or downward, the display control unit 512 changes a view point (a depression angle) for displaying arrays of thumbnail images in a horizontal direction or a perpendicular direction in proportion to the amount of move of the cursor C2.

A cursor C3 is used for changing a place to be a display target of the place view screen. When the cursor C3 is moved to the left or to the right with respect to the place view screen, the display control unit 512 changes the display target to a place on the left side or on the right side of the place currently specified as the display target, based on positions of the places in the place map screen. Similarly, when the cursor C3 is moved upward or downward with respect to the place view screen, the display control unit 512 changes the display target to a place above or below the place currently specified as the display target, based on positions of the places in the place map screen. Then, the display control unit 512 performs the place-view-screen display process on the place specified as a new display target.

Figure 50:
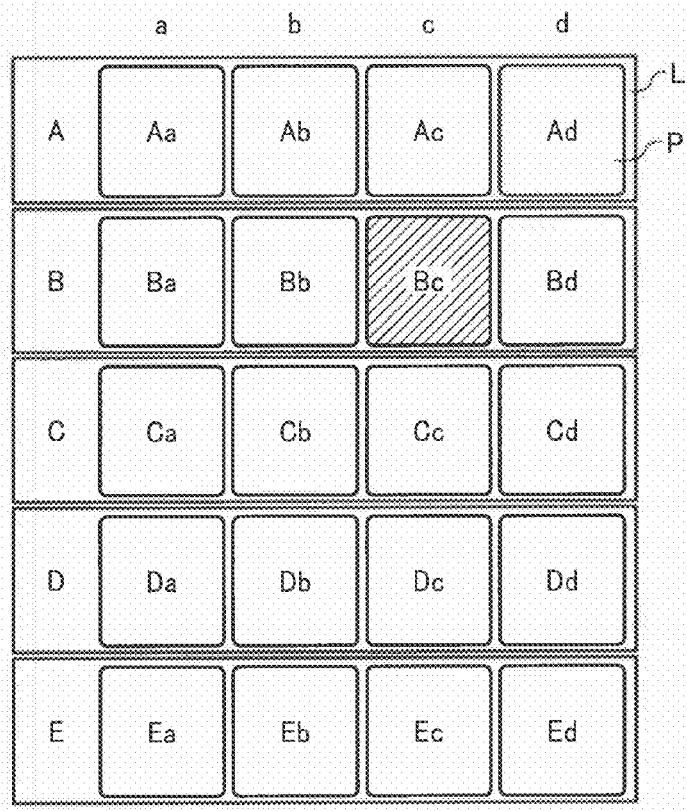
FIG. 50 is a schematic diagram of a place map screen.

Operation for changing a display mode of the place view screen by moving the cursor C3 is described below with reference to FIGS. 50 to 53. FIG. 50 is a schematic diagram of the place map screen. In the example shown in FIG. 50, a unique symbol (A to E and a to d) is assigned to each row and each column, and each of places is uniquely identified by a combination symbol of corresponding row and column. For example, a place on the third column from the left (c) of the second layer (B) is identified by "Bc". Similarly, a place on the second column from the left (b) of the third layer (C) is identified by "Cb".

When a place (e.g., the place "Bc") is specified from the place map screen by a user via the operating unit 54, the display control unit 512 displays a place view screen with respect to the specified place.

Figure 51:
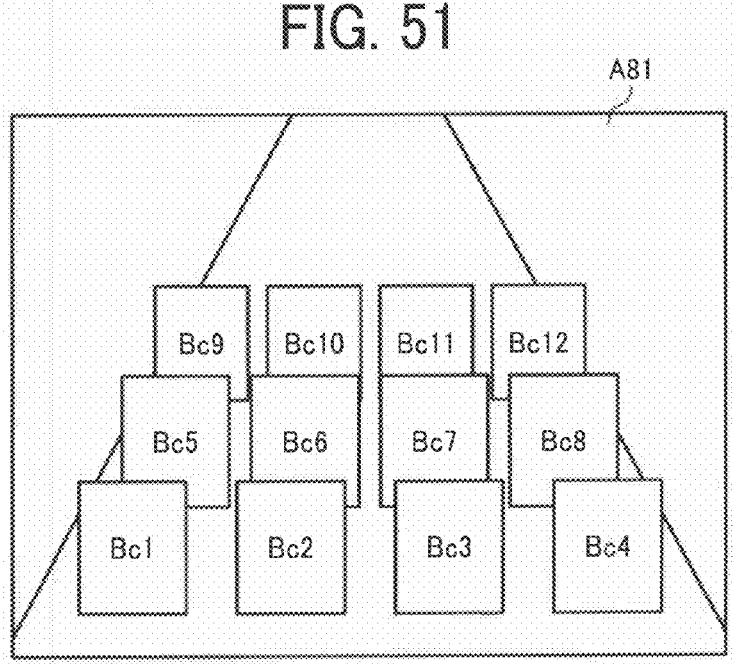
FIGS. 51 to 53 are schematic diagrams of place view screens for different places.

FIG. 51 is a schematic diagram of a place view screen (the area A81) with respect to the place "Bc" shown in FIG. 50. In this example, thumbnail images contained in "contentsID" folders stored in a "placeID" folder of the place "Bc" are displayed with symbols Bc1 to Bc12, respectively. The symbols Bc1 to Bc12 are associated with the symbol of the place "Bc".

Figure 52:
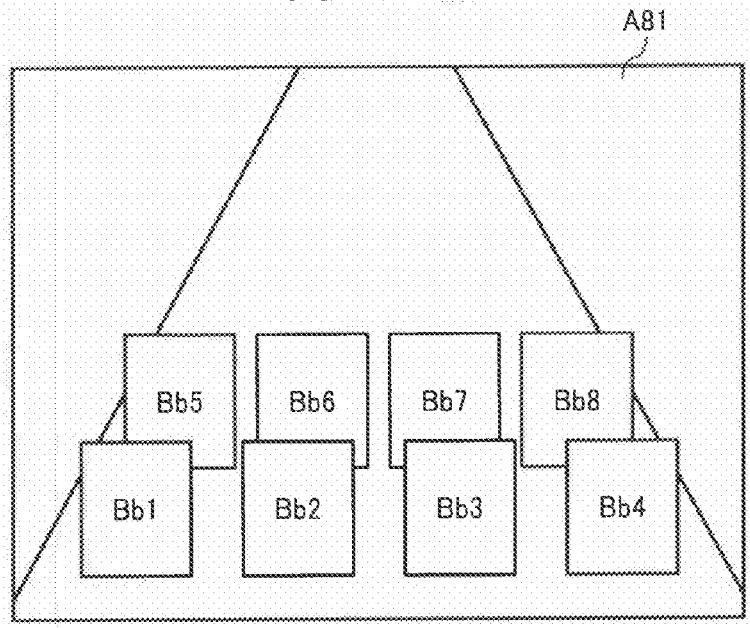

In the place view screen shown in FIG. 51, when the cursor C3 is moved to the left, the display control unit 512 changes a display target from the place "Bc" to a place "Bb" that is arranged on the left of the place "Bc" in the place map screen shown in FIG. 50. Then, the display control unit 512 displays a place view screen with respect to the place "Bb" as shown in FIG. 52. In the example shown in FIG. 52, eight thumbnail images registered in the place "Bb" are displayed with symbols Bb1 to Bb8 that are associated with the symbol of the place "Bb".

Figure 53:
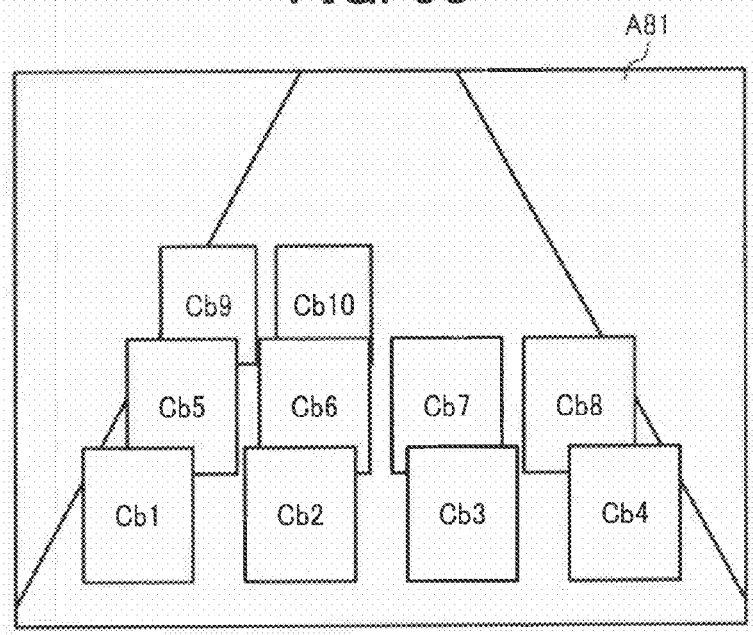

When the cursor C3 is moved downward in the place view screen shown in FIG. 52, the display control unit 512 changes a display target from the place "Bb" to a place "Cb" that is arranged below the place "Bb" in the place map screen shown in FIG. 50. Then, the display control unit 512 displays a place view screen with respect to the place "Cb" as shown in FIG. 53. In the example shown in FIG. 53, ten thumbnail images registered in the place "Cb" are displayed with symbols Cb1 to Cb10 that are associated with the symbol of the place "Cb".

As described above, the cursor C3 is used for changing a place to be a display target of the place view screen, based on positions of places in the place map screen. Upon receiving a command indicating that the cursor C3 is moved either upward, downward, to the left, or to the right while the place view screen is displayed, the display control unit 512 changes a display target from a current place to a place on a corresponding side of the current place depending on a moving direction of the cursor C3. Thus, thumbnail images in the display target can be displayed by operation associated with positions of the places. As a result, a relationship between places, each of which is a unit for managing files, can be intuitively recognized, and thereby, files can be effectively managed. In the above example, it is assumed that the cursor C3 moves in four directions, that is, upward, downward, to the left, and to the right. However, there can be a configuration in which the cursor C3 moves in eight directions including four oblique directions as well as the above four directions.

Returning to the explanation of FIG. 49, a cursor C4 is used for changing display magnification of the place view screen displayed in the area A81. When the cursor C4 is moved to the left with respect to the place view screen (to the "−" side), the display control unit 512 reduces a display size of a group of thumbnail images displayed in the area A81 in proportion to the amount of move of the cursor C4. Similarly, when the cursor C4 is moved to the right with respect to the place view screen (to the "+" side), the display control unit 512 enlarges a display size of a group of thumbnail images displayed in the area A81 in proportion to the amount of move of the cursor C4.

An area A82 is used for displaying a layer name of a layer containing the place specified as the display target, a place name of the place, total size of files registered in the place, and the like. Such information is displayed by the display control unit 512 based on folder names of folders containing the thumbnail images displayed in the area A81, "content.xml" of each of the folders, the place map information, and the like.

Buttons B81 to B83 are used for changing a display mode of the place view screen. By selectively pressing one of the buttons B81 to B83, a user who is operating the client terminal 500 can change the display mode of the place view screen.

Figure 54:
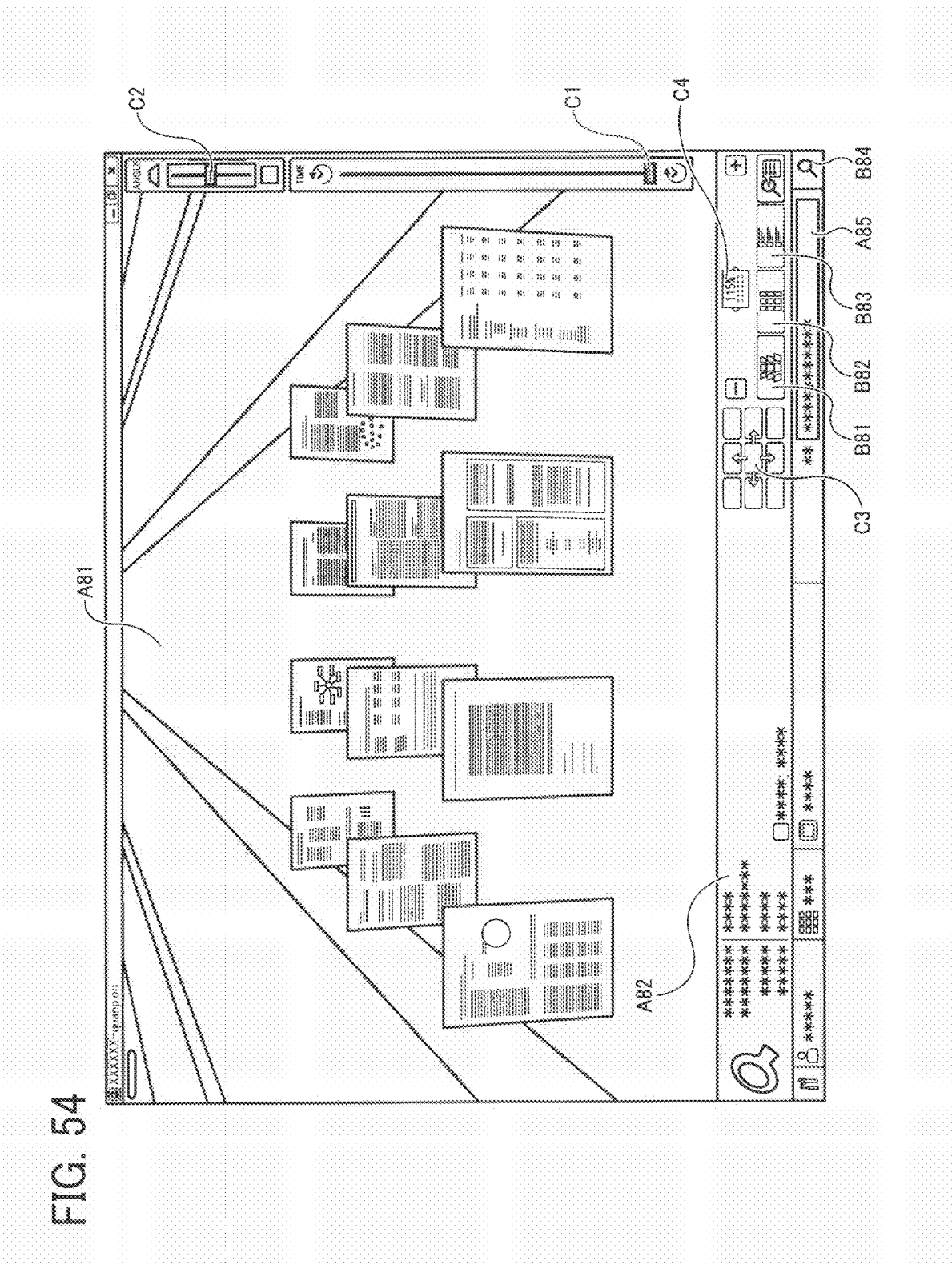
FIGS. 54 to 57 are diagrams of examples of place view screens in different display modes.

The button B81 is used for displaying a group of thumbnail images three-dimensionally as shown in FIG. 49. Upon receiving a command indicating that the button B81 is pressed, the display control unit 512 displays a group of thumbnail images three-dimensionally in the place view screen as shown in FIG. 49. In the example shown in FIG. 49, it is assumed that original files corresponding to the thumbnail images are image files. However, when original files are document files, such as text, contents of the document files are displayed in thumbnail images as shown in FIG. 54.

Figure 55:
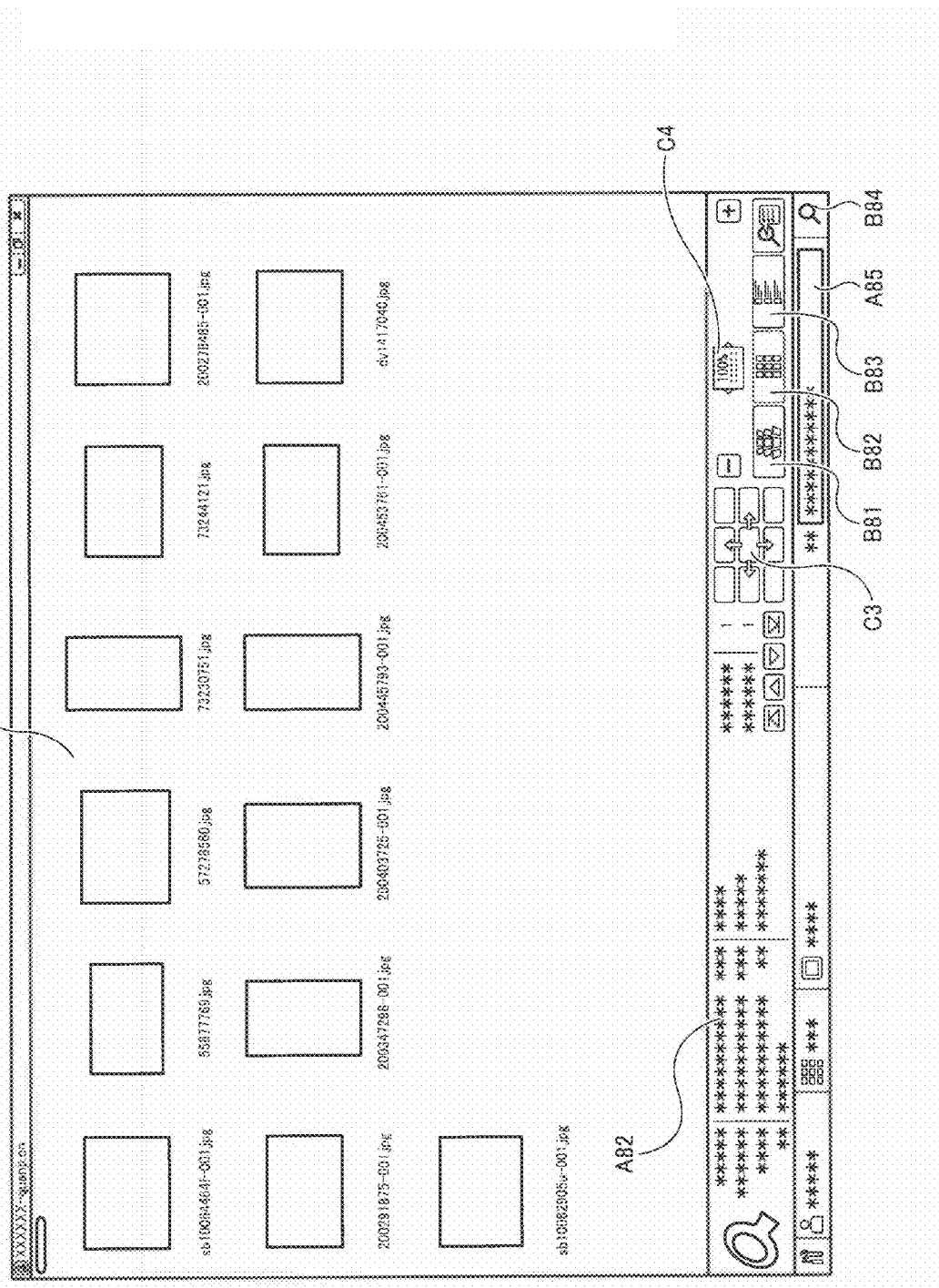

The button B82 is used for displaying thumbnail images two-dimensionally. Upon receiving a command indicating that the button B82 is pressed, the display control unit 512 two dimensionally displays thumbnail images of files registered in a place specified as a display target in the area A81 in the place view screen as shown in FIG. 55. The example shown in FIG. 55 corresponds to a display mode of the place view screen G22 shown in FIG. 7.

Figure 56:

The button B83 is used for displaying a list of thumbnail images. Upon receiving a command indicating that the button B83 is pressed, the display control unit 512 displays a list of thumbnail images in the area A81 in the place view screen as shown in FIG. 56. The example shown in FIG. 56 corresponds to a display mode of the place view screen G23 shown in FIG. 7.

In the example shown in FIG. 56, an area A83 is used for displaying information about files corresponding to thumbnail images. The display control unit 512 displays information such as a place name, a file name of a file, a file created date, a file updated date, a user name who has registered the file, and the like, based on the file information.

Figure 57:
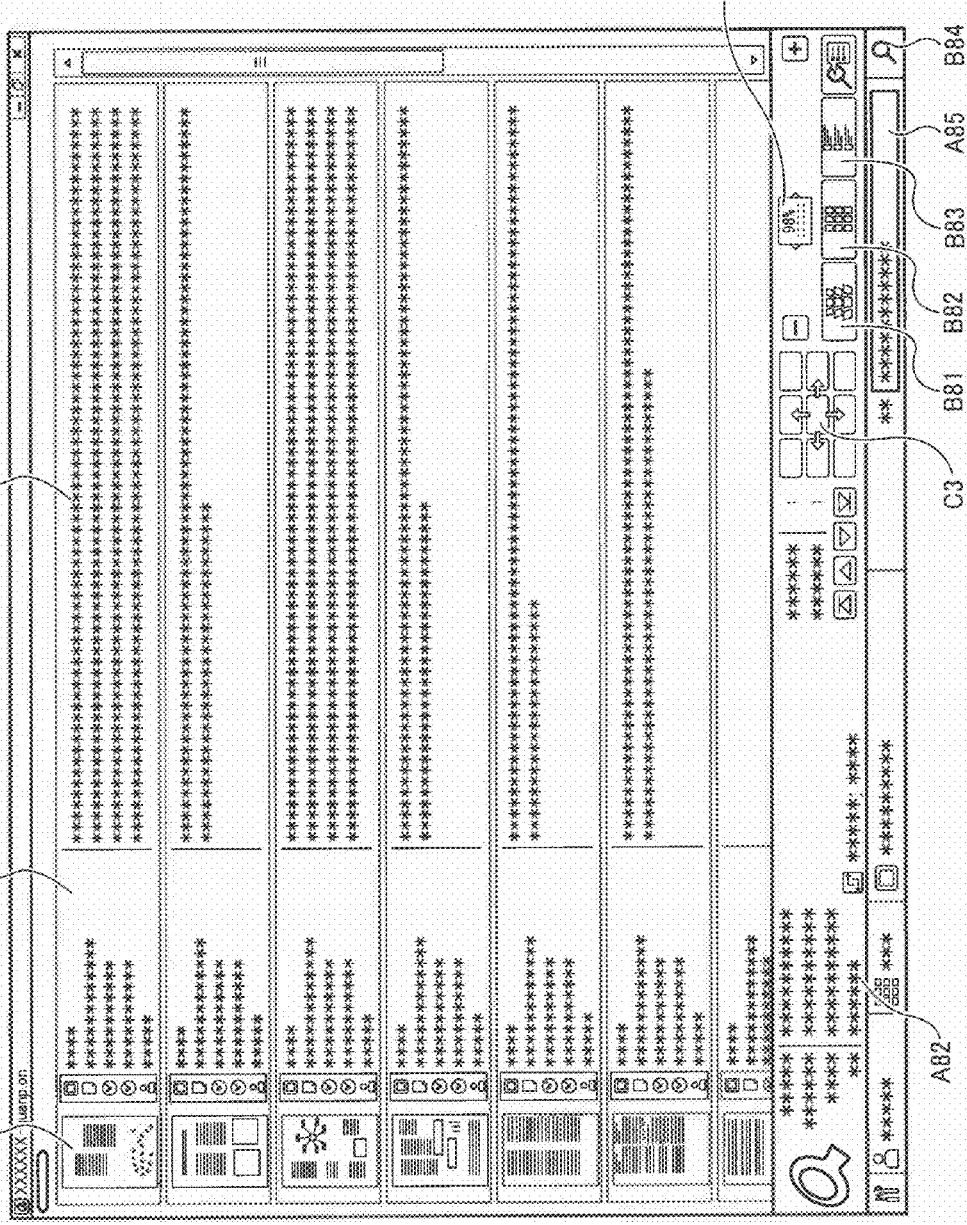

An area A84 is used for displaying contents or brief description of files corresponding to thumbnail images. In FIG. 56, it is assumed that original files corresponding to the thumbnail images are image files. Thereby, no information is displayed in the area A84. Alternatively, in the example shown in FIG. 57, it is assumed that original files corresponding to thumbnail images are document files. Thereby, parts of the contents of the document files are displayed as brief description in the area A84. It is assumed that the brief description is recorded in the file information of each of the files.

An area A85 shown in FIGS. 49 and 54 to 57 is used for entering a search key to be a keyword for file search. A button B84 is used for requesting search by the search key entered in the area A85. When the button B84 is pressed, the search key entered in the area A85 is sent to the search-criteria receiving unit 514.

Returning to the explanation of FIG. 48, the display control unit 512 determines whether change of the display mode is requested by pressing one of the buttons B81 to B83 (Step S183). When the display control unit 512 determines that the change of the display mode is requested (Yes at Step S183), process control returns to Step S182 at which the display control unit 512 displays the place view screen in the requested display mode.

When the display control unit 512 determines that the change of the display mode is not requested (No at Step S183), the setting-change receiving unit 513 determines whether registration of a file in the place that is a display target of the place view screen is requested (Step S184). When the setting-change receiving unit 513 determines that the registration of a file is not requested (No at Step S184), process control proceeds to Step S188.

On the other hand, upon determining that the registration of a file is requested (Yes at Step S184), the setting-change receiving unit 513 displays a support screen for registering a file on the display unit 55 and waits for reception of input from a user (Step S185).

Figure 58:
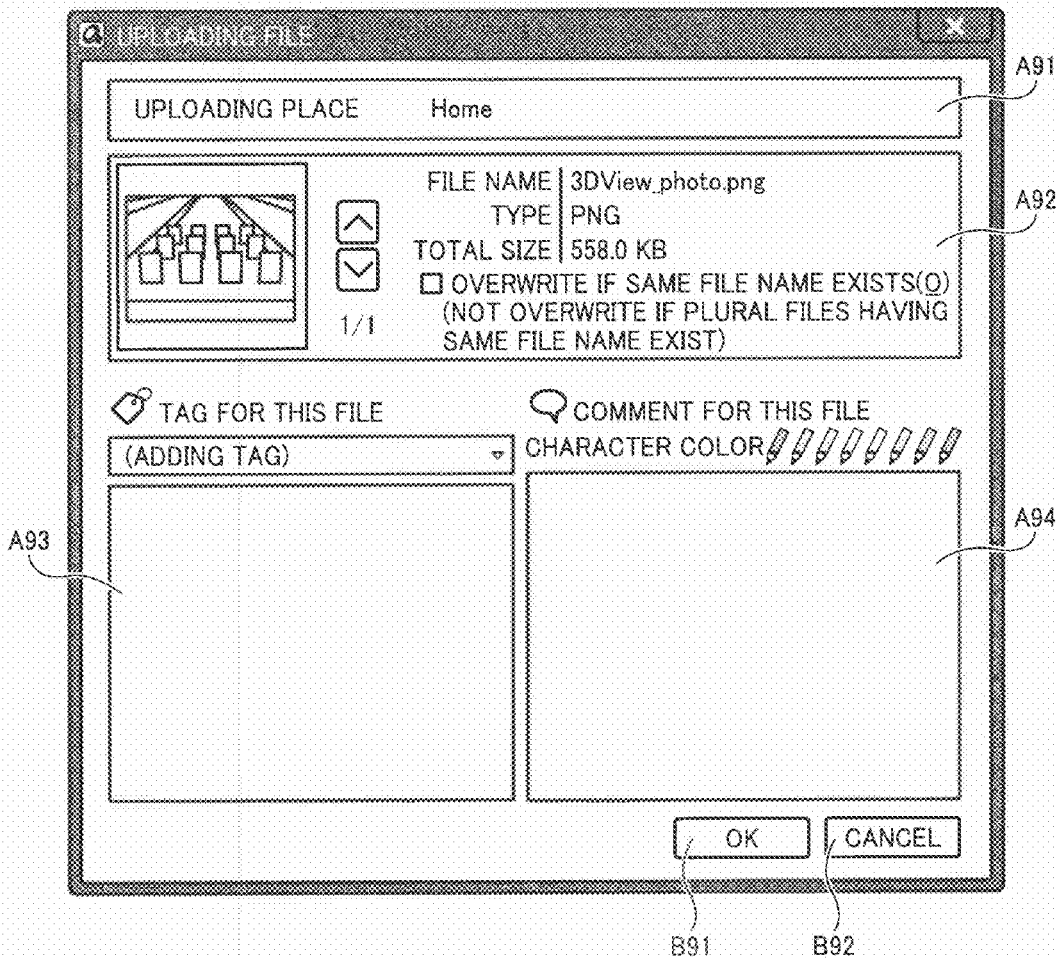
FIG. 58 is a diagram of an example of a support screen for registering a file.

FIG. 58 is a diagram of an example of a support screen for registering a file, which is displayed at Step S185. An area A91 is used for displaying a place name in which a file is to be registered. The setting-change receiving unit 513 displays a place name of a place in which a file is to be registered in the area A91. When registration of a file is requested from the place view screen, the file is to be registered in the place currently displayed in the place view screen. Therefore, the setting-change receiving unit 513 employs that place as a registration destination of the file.

An area A92 is used for displaying information about the file to be registered. The setting-change receiving unit 513 displays information such as a file name, a file type, and a file size of the file to be registered in the area A92.

An area A93 is used for entering an attribute to be appended to the file to be registered. A user can enter any arbitrary character string as an attribute of a file (hereinafter, referred to as "file attribute" as appropriate). An area A94 is used for entering a comment for the file to be registered. A user can enter any arbitrary character string as a comment.

A button B91 is used for requesting registration (upload) of a file. Upon receiving a command indicating that the button B91 is pressed, the setting-change receiving unit 513 sends a file registration request containing a file to be registered and a user ID of a user who is operating the client terminal 500 to the file management server 400 based on the information displayed and entered in the areas A91 to A94. A button B92 is used for canceling registration of a file. Upon receiving a command indicating that the button B92 is pressed, the setting-change receiving unit 513 closes the support screen shown in FIG. 58.

Figure 59:
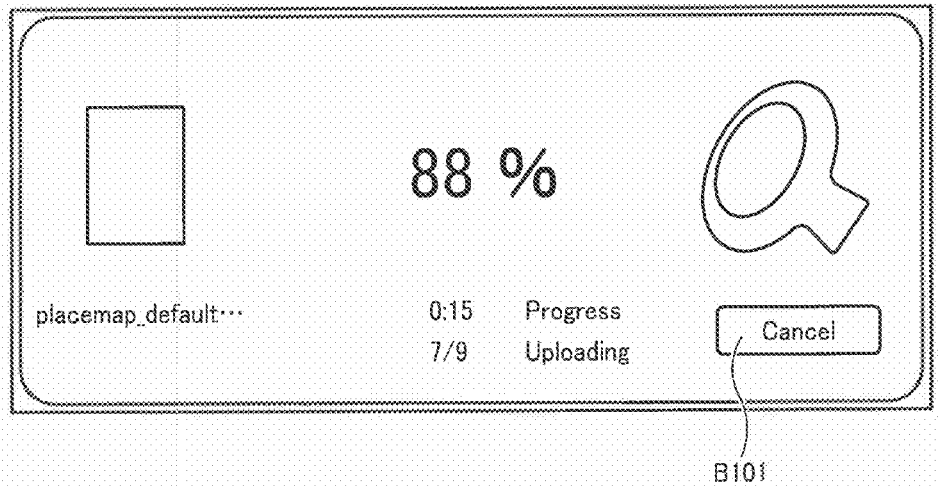
FIG. 59 is a diagram of an example of a screen for notifying file upload status.

Returning to the explanation of FIG. 48, upon receiving a request for registering a file from a user via the support screen displayed at Step S185, the setting-change receiving unit 513 sends the above-mentioned file registration request to the file management server 400 (Step S186). At this time, it is possible to display a screen for notifying upload status of the file on the display unit 55 as shown in FIG. 59. A button B101 shown in FIG. 59 is used for cancelling sending of the file registration request. When the button B101 is pressed, the setting-change receiving unit 513 stops sending of the file registration request.

Upon receiving the setting information about the place in which the file has been registered from the file management server 400 as a response to the file registration request, the display control unit 512 updates the setting information stored in the RAM 53 or the storage unit 56 (Step S187). When information indicating that operation is not permitted, which will be described later, is received, this information is displayed on the display unit 55.

Upon determining that deletion of a file displayed on the place view screen (a thumbnail image) is requested (No at Step S184→Yes at Step S188), the setting-change receiving unit 513 sends a file deletion request containing a folder name (contentsID) of a folder in which the thumbnail image to be deleted is stored, a place name of a place containing the folder, and a user ID of a user who is currently logging in, to the file management server 400 (Step S189).

Upon receiving from the file management server 400 the setting information about the place from which the file has been deleted as a response to the file deletion request, the display control unit 512 updates the setting information stored in the RAM 53 and the storage unit 56 (Step S190), and process control returns to Step S182. When information indicating that operation is not permitted, which will be described later, is received, this information is displayed on the display unit 55.

When the setting-change receiving unit 513 determines that the deletion of a file is not requested (No at Step S188), process control returns to Step S182.

Meanwhile, in the file management server 400, upon receiving the file registration request or the file deletion request (Step S201), the setting changing unit 413 refers to a member list corresponding to the place to be processed due to the request, and determines whether the place is the shared place (Step S202). When the setting changing unit 413 determines that the place is not the shared place (No at Step S202), process control proceeds to Step S205.

On the other hand, upon determining that the place is the shared place (Yes at Step S202), the setting changing unit 413 determines whether an access authority of the user ID contained in the request received at Step S201 is a reader (only read is permitted) (Step S203). Upon determining that the access authority is the reader (Yes at Step S203), the setting changing unit 413 sends information indicating that operation on the file is not permitted to the client terminal 500 that has sent the file registration request or the file deletion request (Step S204), and process control ends.

Upon determining that the access authority is an editor (read and write are permitted) (No at Step S203), the setting changing unit 413 identifies whether the request received at Step S201 is the file registration request or the file deletion request (Step S205). Upon identifying that the request is the file registration request (Yes at Step S205), the setting changing unit 413 performs a file registration process (Step S206). The file registration process performed at Step S206 is described in detail below with reference to FIG. 60.

Figure 60:
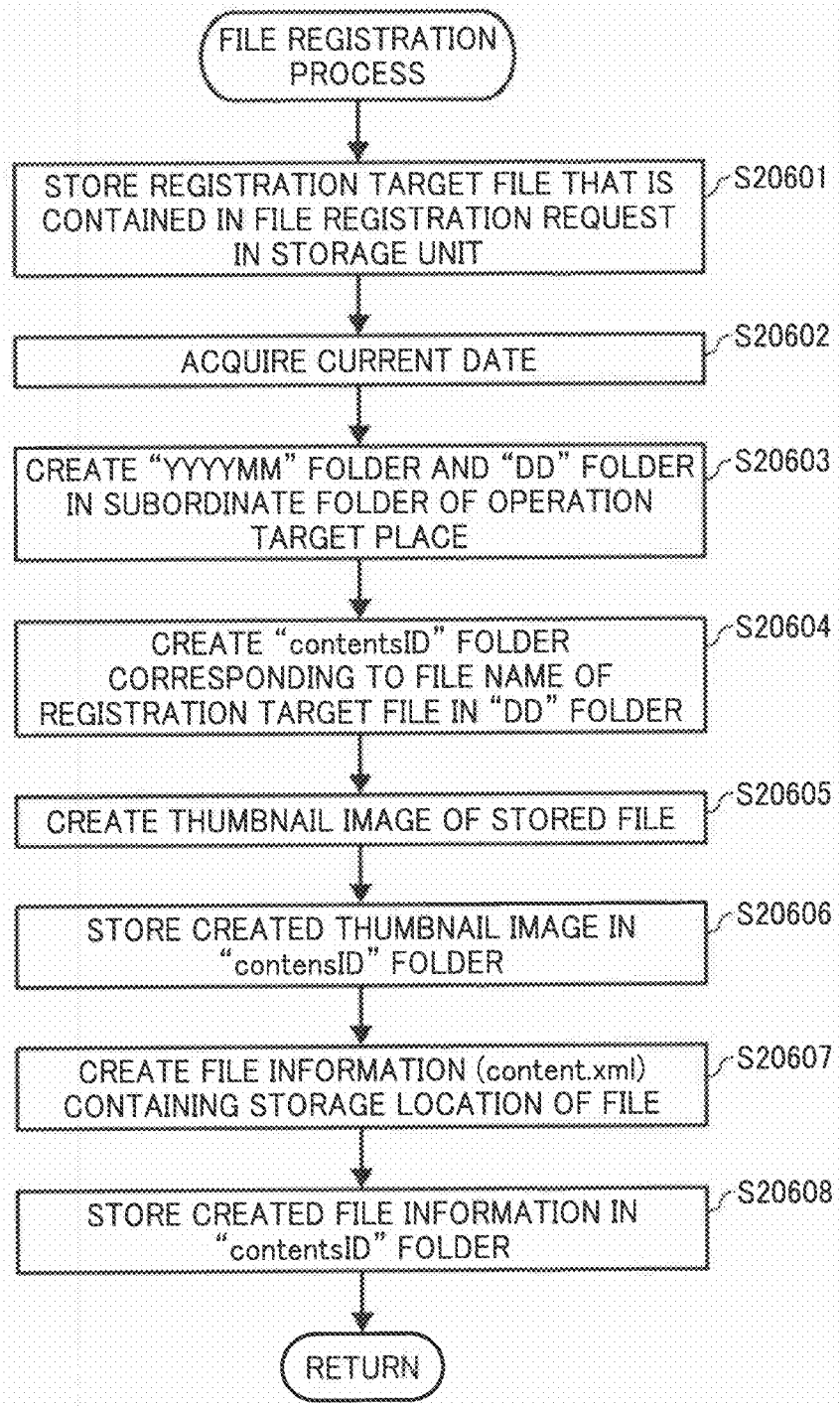
FIG. 60 is a flowchart of a procedure of a file registration process.

FIG. 60 is a flowchart of a procedure of the file registration process. The setting changing unit 413 stores a file that is contained in the file registration request as a file to be registered, in a predetermine location of the storage unit 46 (Step S20601). The file can be arbitrary storage location. For example, the file can be stored and managed in database, or can be stored in an external storage device other than the storage unit 46.

The setting changing unit 413 acquires current date from the timing unit (not shown) that counts date and time (Step S20602), and creates a "YYYYMM" folder and a "DD" folder corresponding to the current date, in a predetermined structure under a place to be processed (Step S20603). When the "YYYYMM" folder and the "DD" folder corresponding to the current date are already created, this process is not performed.

Then, the setting changing unit 413 creates a "contentsID" folder corresponding to a file name of the file to be registered, under the "DD" folder created at Step S20603 (Step S20604). The setting changing unit 413 creates a thumbnail image from the file created at Step S20601 (Step S20605), and stores the created thumbnail image in the "contentsID" folder created at Step S20604 (Step S20606).

The setting changing unit 413 creates file information (content.xml) (Step S20607). The file information contains information contained in the file registration information (e.g., user ID, information about the file), and the storage location of the file stored at Step S20601. When the file stored at Step S20601 is a document file, the setting changing unit 413 analyzes contexts or phrases in the file, creates a summary as a brief description of the document file, and stores the summary in the file information. The analysis of the contexts or phrases can be performed by using known technique.

The setting changing unit 413 then stores the file information created at Step S20607 in the "contentsID" folder created at Step S20604 (Step S20608), and process control proceeds to Step S208 of FIG. 48.

Returning to the explanation of FIG. 48, upon determining that the request is the file deletion request (No at Step S205), the setting changing unit 413 performs a file deletion process based on the file deletion request (Step S207). The file deletion process is described in detail below with reference to FIG. 61.

Figure 61:
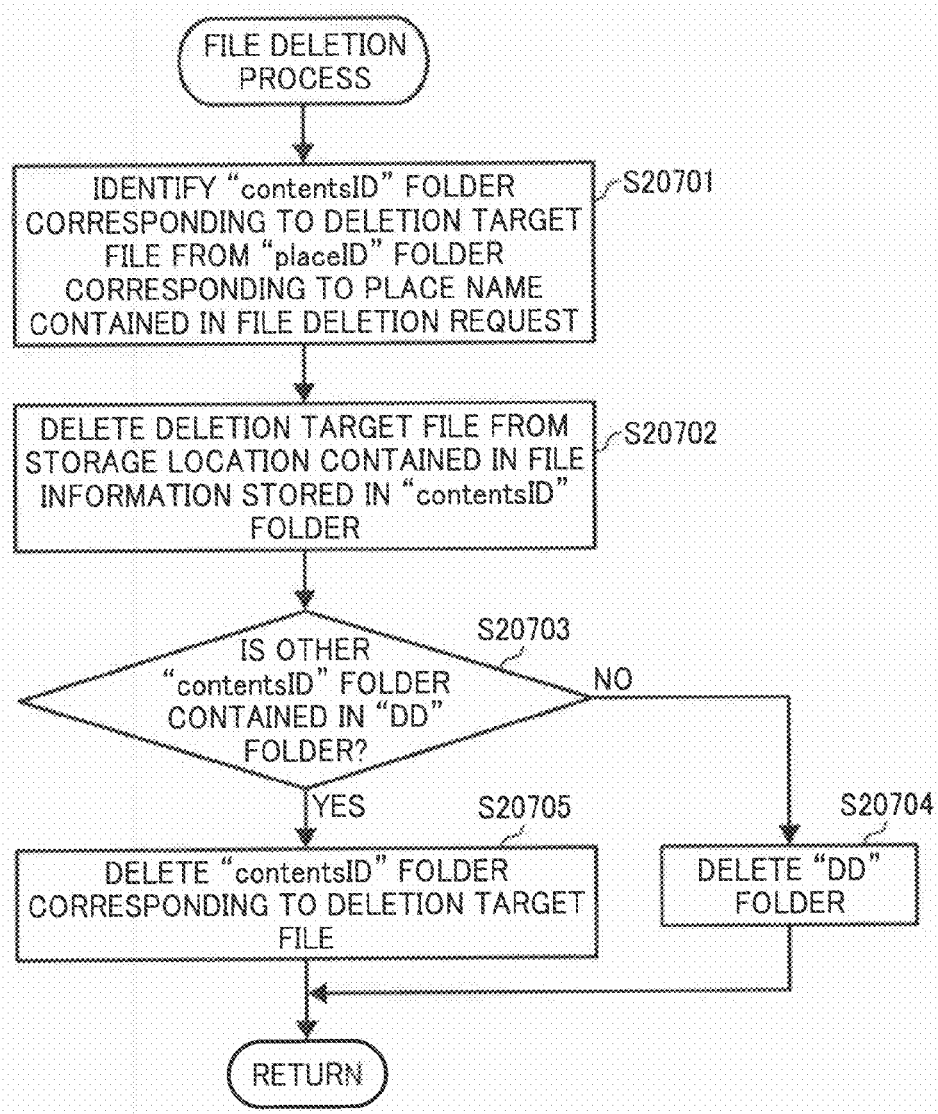
FIG. 61 is a flowchart of a procedure of a file deletion process.

FIG. 61 is a flowchart of a procedure of the file deletion process performed at Step S207. The setting changing unit 413 identifies a "contentsID" folder corresponding to a file name of a file to be deleted from the "placeID" folder corresponding to the place name contained in the file deletion request (Step S20701).

The setting changing unit 413 refers to the file information stored in the "contentsID" folder identified at Step S20701, and deletes a file to be deleted from the storage location contained in the file information (Step S20702).

Then, the setting changing unit 413 determines whether other "contentsID" folders are contained in the "DD" folder that contains the "contentsID" folder identified at Step S20701 (Step S20703). Upon determining that other "contentsID" folders are not contained (No at Step S20703), the setting changing unit 413 deletes the "DD" folder (Step S20704), and process control proceeds to Step S208 of FIG. 48.

On the other hand, upon determining that other "contentsID" folders are contained (Yes at Step S20703), the setting changing unit 413 deletes only the "contentsID" folder identified at Step S20701 (Step S20705), and process control proceeds to Step S208 of FIG. 48.

Returning to the explanation of FIG. 48, the setting changing unit 413 sends the setting information updated at Step S206 or S207 to the client terminal 500 that has sent the file registration request or the file deletion request (Step S208), and process control ends. In the client terminal 500, the setting information is updated at Step S190, and then, the updated place view screen is displayed on the display unit 55.

Figure 62:
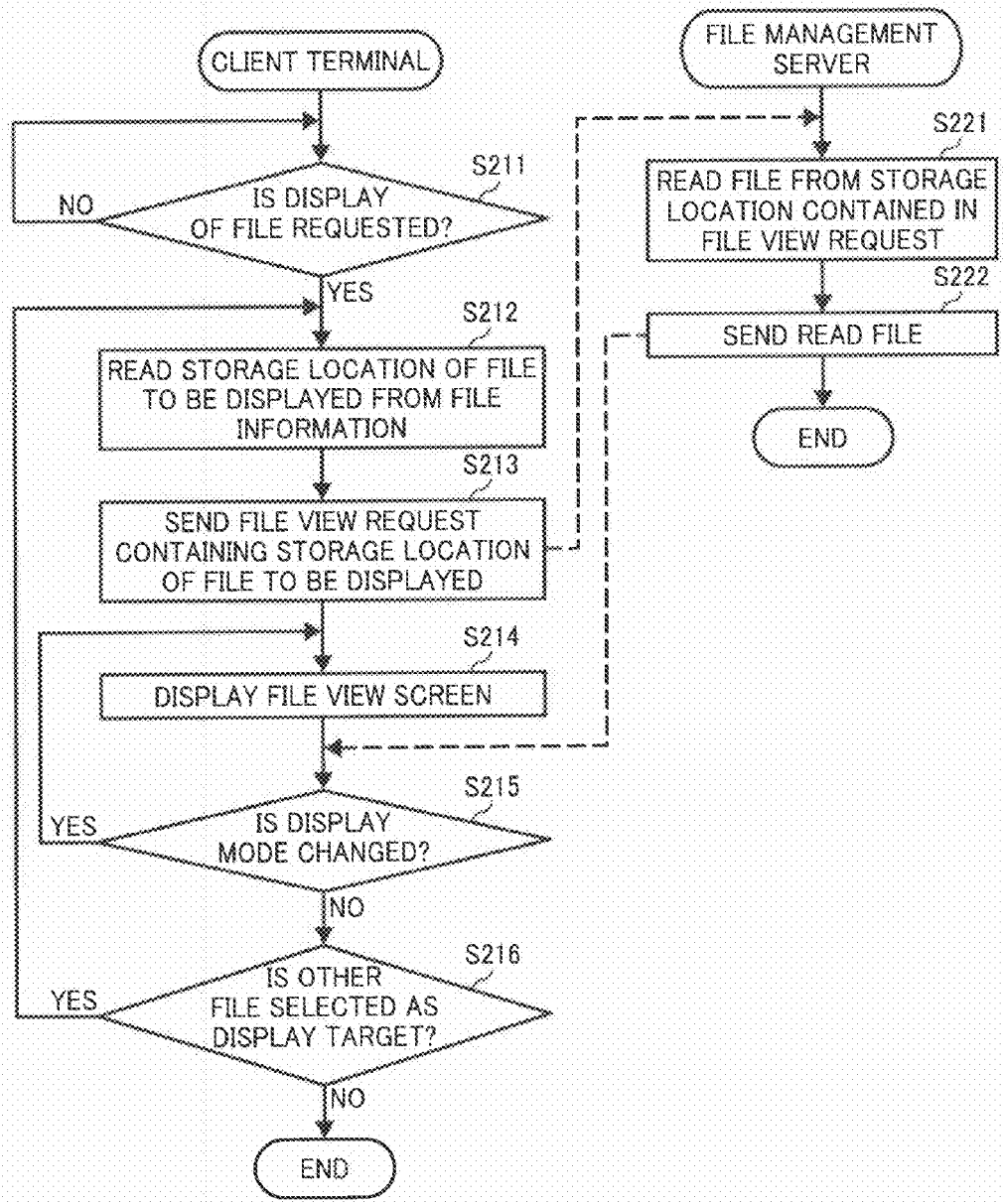
FIG. 62 is a flowchart of a procedure of a process for viewing a file, performed by the file management server and the client terminal shown in FIG. 32.

Operation for viewing a file specified from files (a group of thumbnail images) displayed on the place view screen is described below. FIG. 62 is a flowchart of a procedure of a process for viewing a file, performed by the file management server 400 and the client terminal 500. It is assumed that the place view screen is being displayed on the display unit 55 of the client terminal 500.

The setting-change receiving unit 513 waits for reception of request for displaying a file whose thumbnail image is specified from thumbnail images displayed on the place view screen (No at Step S211). Upon determining that display of a file is requested (Yes at Step S211), the setting-change receiving unit 513 reads the storage location of a file corresponding to the specified thumbnail image, from the file information in a folder ("contentsID" folder) containing the specified thumbnail image (Step S212). Then, the setting-change receiving unit 513 sends a file view request containing information about the storage location read at Step S212 to the file management server 400 (Step S213).

Meanwhile, in the file management server 400, upon receiving the file view request, the file managing unit 412 reads the file from the storage location contained in the file view request (Step S221). Then, the file managing unit 412 sends the file read at Step S221 to the client terminal 500 that has sent the file view request (Step S222).

In the client terminal 500, upon receiving the file from the file management server 400 as a response to the file view request, the display control unit 512 displays a file view screen in a display mode of one of the file view screen G31 to G33 shown in FIG. 7 (Step S214). The display mode of the file view screen is described below.

Figure 63:
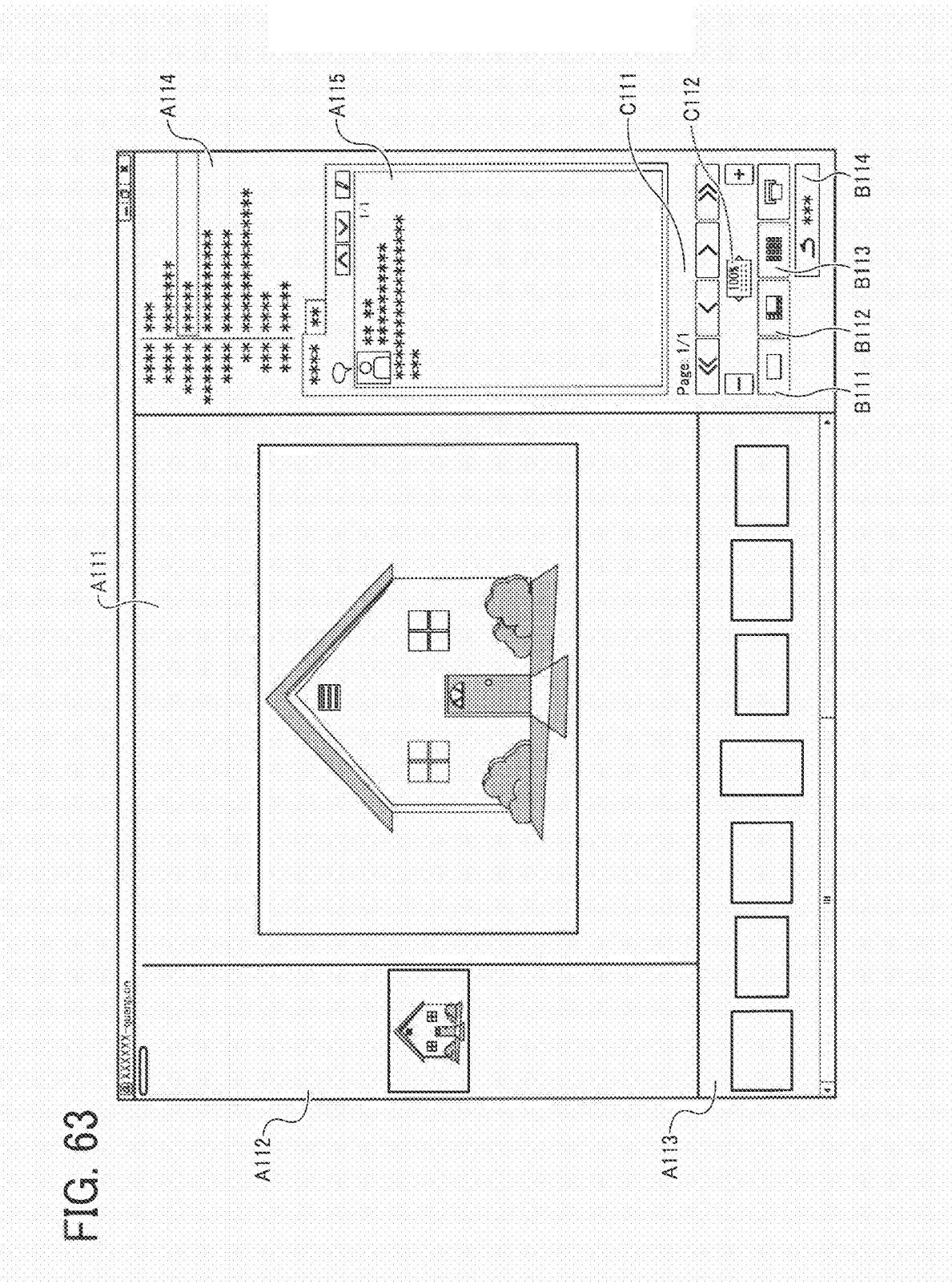
FIGS. 63 to 66 are diagrams of examples of file view screens in different display modes.
Figure 64:
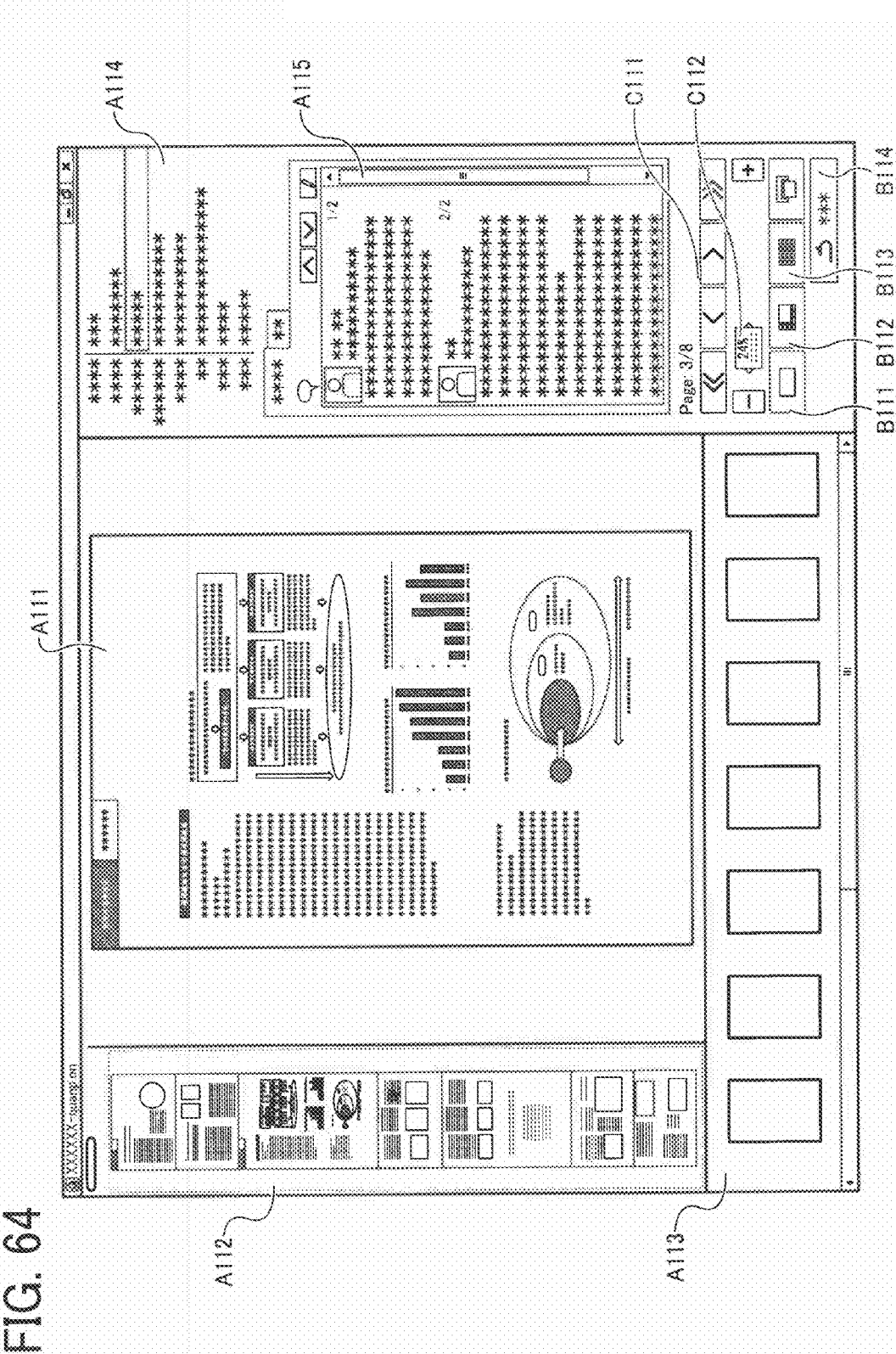

FIG. 63 is a diagram of an example of a file view screen in a display mode corresponding to the file view screen G31 of FIG. 7. An area A111 is used for displaying a file that is a display target, that is, for displaying a file sent from the file management server 400 with respect to each page. An area A112 is used for displaying a thumbnail image of each page contained in the file. In the example shown in FIG. 63, only one thumbnail image is displayed in the area A112 because the file contains only one image file. However, when a file contains a plurality of pages, a plurality of thumbnail images of the pages are displayed in the area A112 as shown in FIG. 64.

Upon receiving a command indicating that one thumbnail image is selected from thumbnail images of corresponding pages displayed in the area A112, or that a page is specified by using a cursor C111, the display control unit 512 displays the specified page in the area A111. It is assumed that, the first page of the specified file is displayed in the area A111 in the default state.

An area A113 is used for displaying all thumbnail images of all files registered in a place that contains a file specified as a display target. The display control unit 512 identifies a "placeID" folder containing a thumbnail image of the file specified as the display target by the user, reads thumbnail images from all the "contents ID" folders contained in the identified "placeID" folder, and displays the read thumbnail images in the area A113. When a thumbnail image of another file is specified from the area A113, processes from Step S212 to Step S214 are performed on the specified thumbnail image to display the file view screen with respect to a file corresponding to the specified thumbnail image.

An area A114 is used for displaying various information about a file specified as a display target. Specifically, the display control unit 512 displays a place name or a layer name of a place or a layer containing a "contentsID" folder corresponding to the file specified as the display target, and information about the file, such as a file name, a file created date, a file updated date, a file type, a file size, and an owner (creator) of the file, in the area A114 based on the file information or the information appended to the file.

An area A115 is used for displaying a comment for the file that is entered when the file is registered, or a file attribute (tag). Specifically, the display control unit 512 reads a comment entered for the file or a file attribute from the file information corresponding to the file specified as the display target, and displays the read information in the area A115. In the example shown in FIG. 63, it is assumed that the comment and the file attribute are displayed in a format using tabs. However, the information can be displayed in other formats.

A cursor C111 is used for specifying a page number of a page to be displayed in the area A111. When one of cursor buttons arranged in the middle of the cursor C111 with symbols representing forward and reverse is pressed, the display control unit 512 retrieves a page corresponding to a forwarded page number or a reversed page number from the file specified as the display target, and then displays the read page in the area A111. Cursor buttons at edges of the cursor C111 are used for displaying the first page and the last page, respectively, from the file.

A cursor C112 is used for changing display magnification of a file screen displayed in the area A111. When the cursor C112 is moved to the left with respect to the file view screen ("−" side), the display control unit 512 reduces the display size of the file screen displayed in the area A111 in proportion to the amount of move of the cursor C112. Similarly, when the cursor C112 is moved to the right with respect to the file view screen ("+" side), the display control unit 512 enlarges the display size of the file screen displayed in the area A111 in proportion to the amount of move of the cursor C112.

Buttons B111 to B113 are used for changing a display mode of the file view screen. The button B111 is used for requesting a display mode in which a file specified as a display target and thumbnail images of other files registered in the same place are displayed. Upon receiving a command indicating that the button B111 is pressed, the display control unit 512 displays the file view screen in the display mode as shown in FIGS. 63 and 64.

Figure 65:
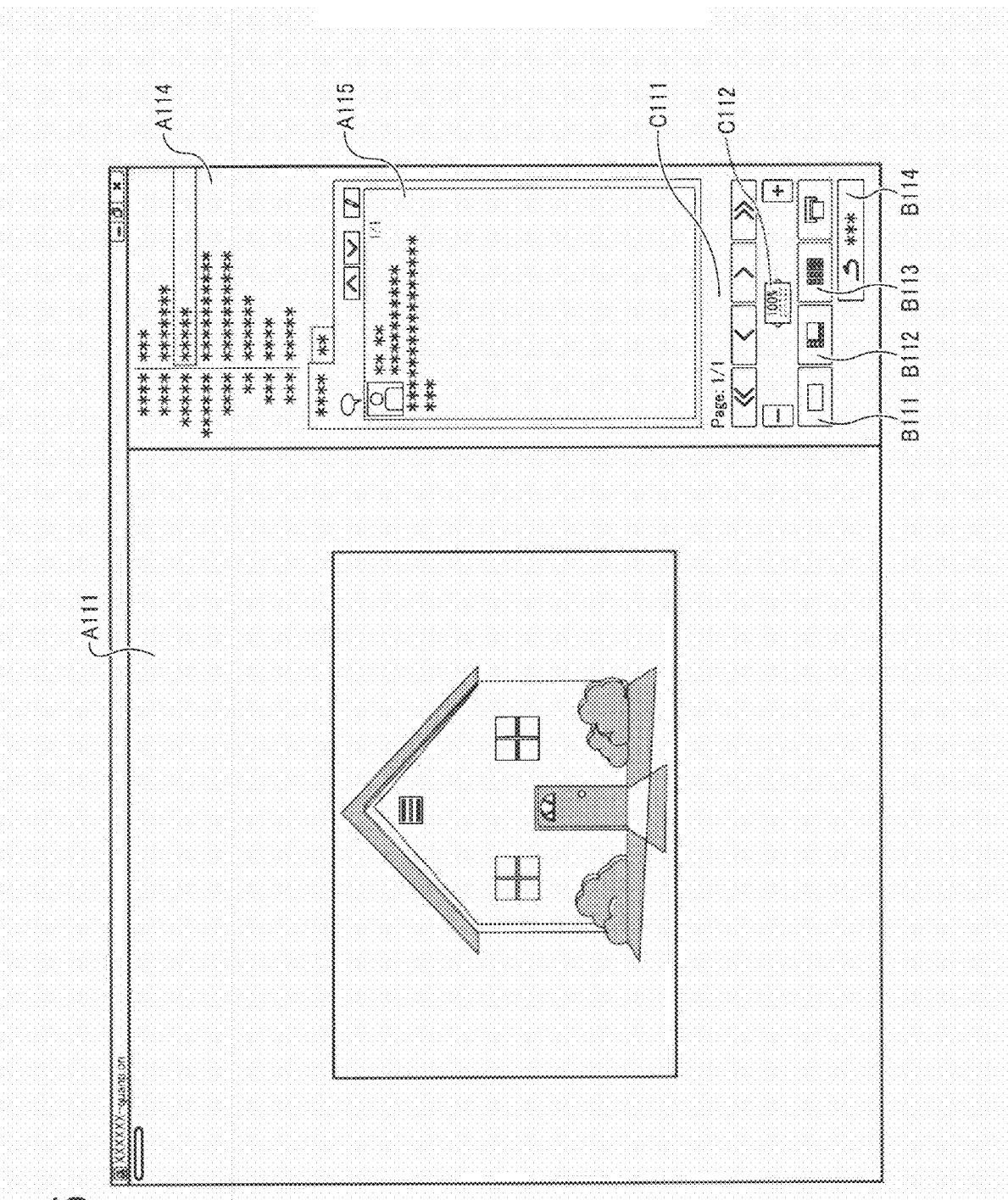
Figure 66:
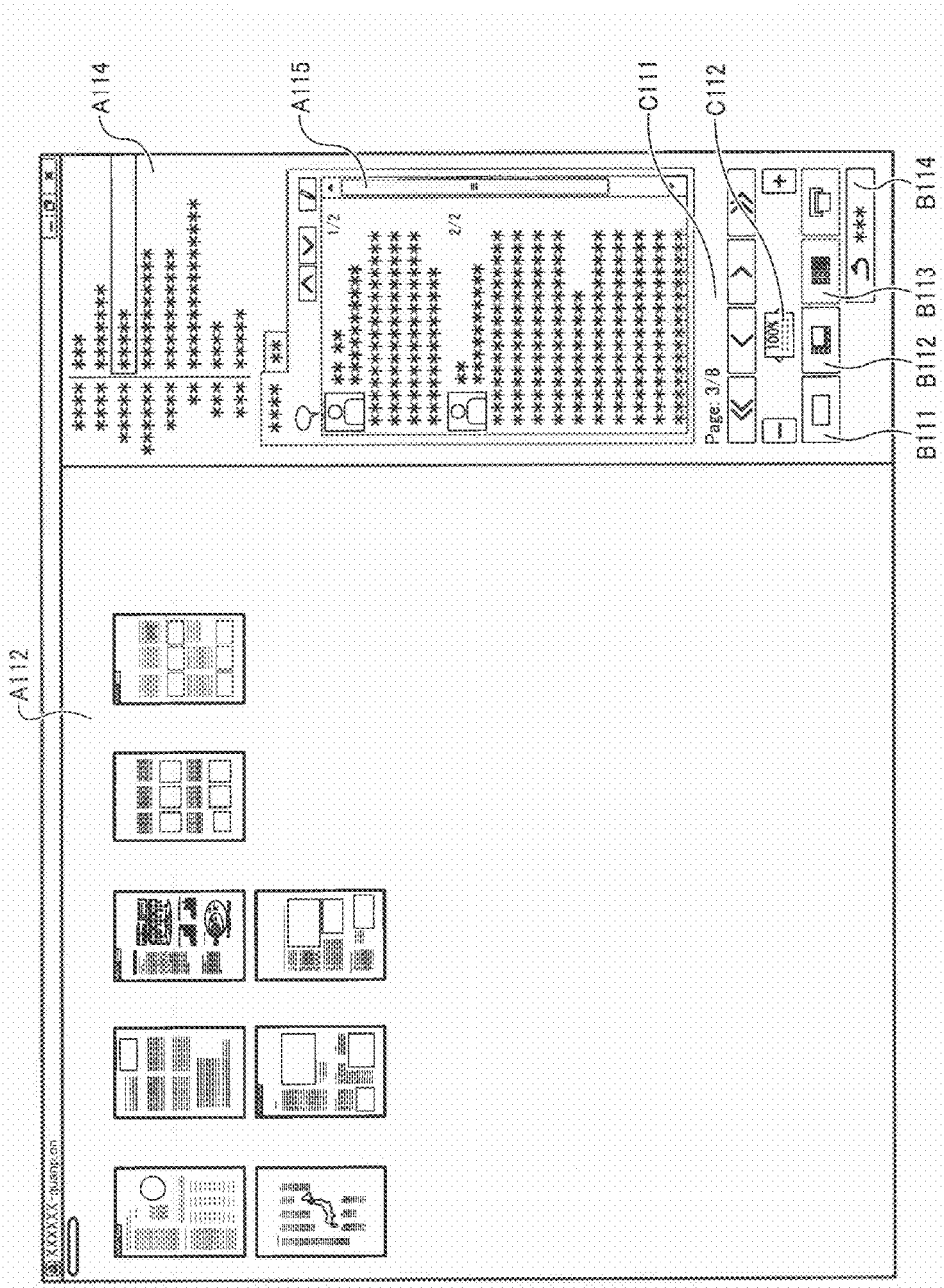

A button B112 is used for requesting a display mode in which only a file specified as a display target is displayed as shown in FIG. 66. Upon receiving a command indicating that the button B112 is pressed, the display control unit 512 displays the file specified as the display target in the area A111. Thus, the file view screen in the display mode as shown in FIG. 65 is displayed. The example shown in FIG. 65 corresponds to the display mode of the file view screen G32 shown in FIG. 7.

A button B113 is used for requesting a display mode in which a list of thumbnail images of pages contained in a file specified as a display target is displayed as shown in FIG. 66. Upon receiving a command indicating that the button B113 is pressed, the display control unit 512 displays thumbnail images created from pages contained in the file specified as the display target in the area A112. Thus, the file view screen in the display mode as shown in FIG. 66 is displayed. The example shown in FIG. 66 corresponds to the display mode of the file view screen G33 shown in FIG. 7. In this display mode, upon receiving a selection of a thumbnail image from among the thumbnail images displayed in the area A112 from a user, the display control unit 512 displays the page corresponding to the selected thumbnail image in the display mode shown in FIG. 63 or FIG. 65.

A button B114 is used for closing the file view screen. Upon receiving a command indicating that the button B114 is pressed, the display control unit 512 closes the file view screen and subsequently displays a place view screen.

Operation for changing the display mode among the above-described file view screens is described below with reference to FIGS. 67 to 69. Similar to the examples shown in FIGS. 50 to 53, in the examples shown in FIGS. 67 to 69, it is assumed that each of places is uniquely identified by a combination symbol of corresponding row and column (A to E and a to d) based on positions in the place matrix. Furthermore, each of thumbnail images (files) stored in each of the places is uniquely identified by a sequence number appended to the symbol of the place.

Figure 67:
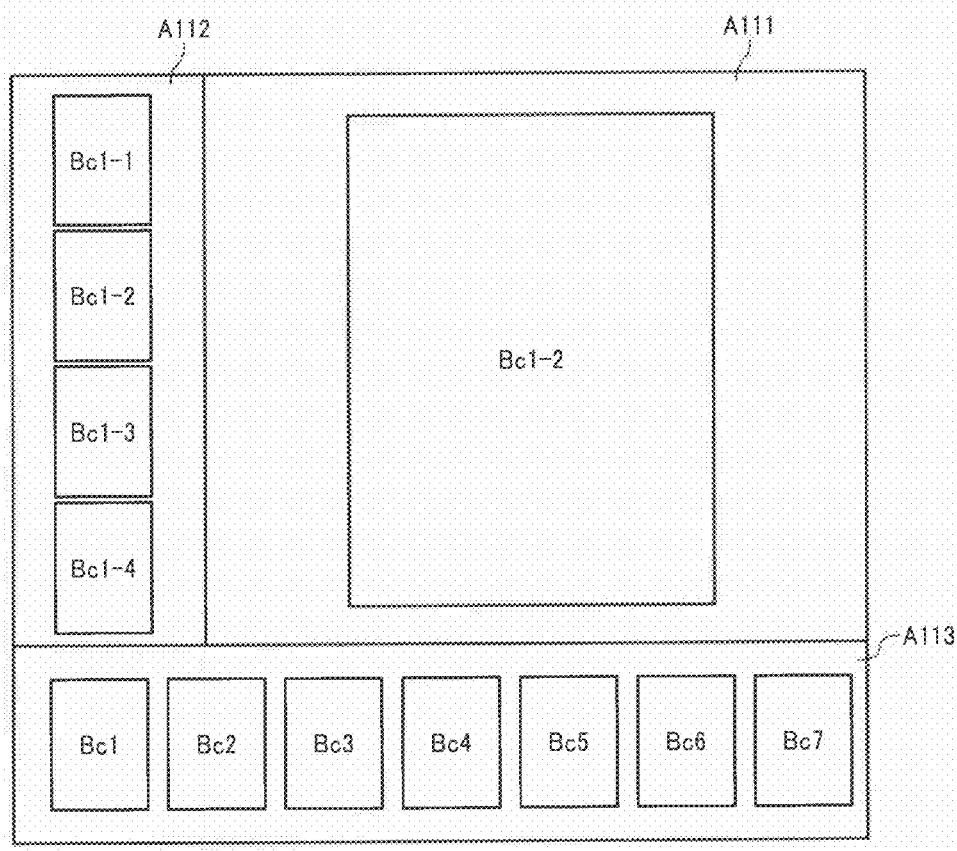
FIGS. 67 to 69 are schematic diagrams of file view screens in different display modes.

FIG. 67 is a schematic diagram of a file view screen in a display mode shown in FIGS. 63 and 64. A file "Bc1" is displayed in the file view screen, from among thumbnail images stored in a "placeID" folder corresponding to a place "Bc". In the area A111, the second page of the file "Bc1" is displayed, in which the page is identified by "Bc1-2". In this case, thumbnail images of other pages ("Bc1-1" to "Bc1-4") contained in the file "Bc" are displayed in the area A112. In the area A113, thumbnail images of other files ("Bc1" to "Bc7") stored in the "placeID" folder of the place "Bc" are displayed.

Figure 68:
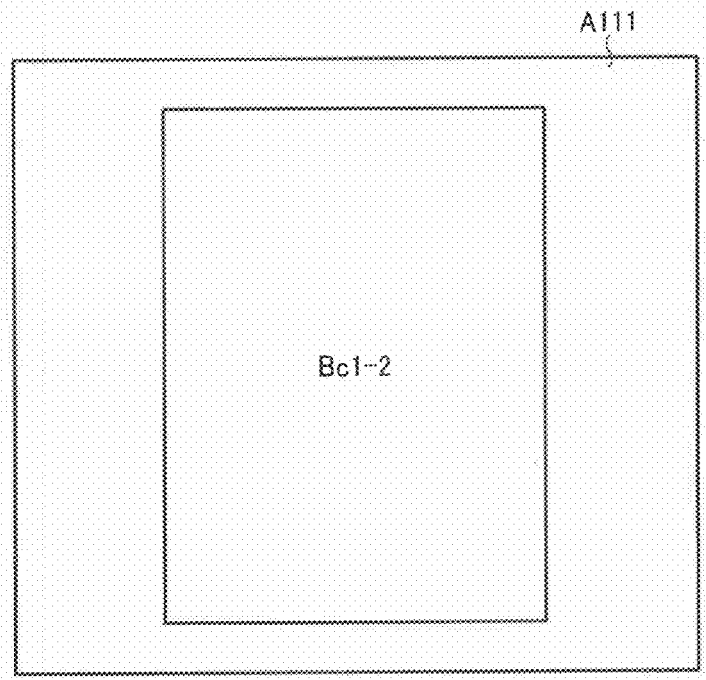
Figure 69:
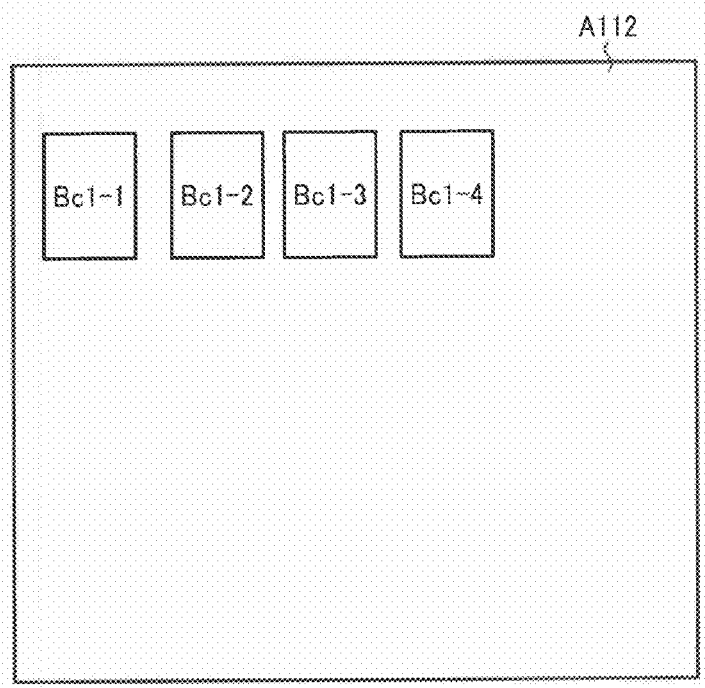

FIG. 68 is a schematic diagram of a file view screen in a display mode shown in FIG. 65. When the second page of the file "Bc1" is displayed similar to the example shown in FIG. 67, only a page image "Bc1-2" is displayed in the area A111 as shown in FIG. 68. FIG. 69 is a schematic diagram of a file view screen in a display mode shown in FIG. 66. When the file "Bc1" is displayed, as shown in FIG. 69, thumbnail images of four pages ("Bc1-1" to "Bc1-4") contained in the file "Bc1" are displayed in the area A112.

Returning to the explanation of FIG. 62, the display control unit 512 determines whether change of the display mode is requested (Step S215). When the display control unit 512 determines that the change of the display mode is requested (Yes at Step S215), process control returns to Step S214 at which the display control unit 512 displays a file view screen in the requested display mode.

On the other hand, upon determining that the change of the display mode is not requested (No at Step S215), the display control unit 512 determines whether other file is selected as a display target (Step S216). When the display control unit 512 determines that no files are selected as a display target (No Step S216), process control ends. On the other hand, upon determining that other file is selected as a display target (Yes Step S216), process control proceeds to Step S212 at which a file view request for the selected file is sent to the file management server 400.

Figure 70:
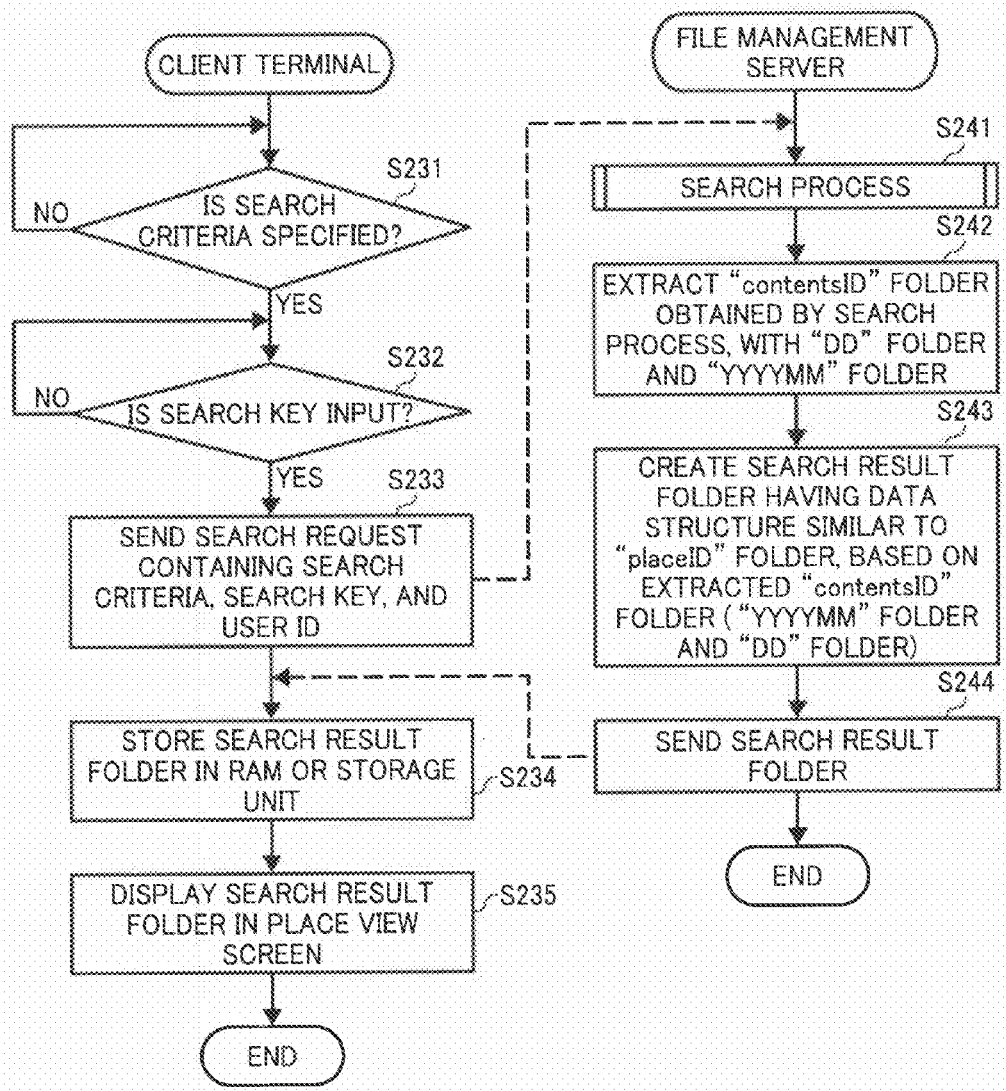
FIG. 70 is a flowchart of a procedure of a process for searching for a file, performed by the file management server and the client terminal shown in FIG. 32.

Operation for searching for a file is described below. FIG. 70 is a flowchart of a procedure of a process for searching for a file, performed by the file management server 400 and the client terminal 500. It is assumed that either one of the place map screen or the place view screen is being displayed on the display unit 55 of the client terminal 500.

The search-criteria receiving unit 514 determines whether search criteria is specified by a user via the operating unit 54 (No at Step S231). It is assumed that the search criteria contain search methods, refinement criteria, and the like. The search method defines whether search is performed with respect to each place map, layer, place, file attribute, or character string contained in a document file. The refinement criteria refine a search target by specifying a file type or a range of dates when the file is created or registered. It is assumed that one or more search methods can be specified at one time.

There can be a configuration in which the search-criteria receiving unit 514 displays a support screen for specifying search criteria or entering a search key on the display unit 55 depending on a request from a user. It is applicable to perform search with respect to each place map when the search is requested by entering a keyword in the area A42 and pressing the button B41 from the place map screen as shown in FIG. 39. Furthermore, it is applicable to perform search with respect to each layer when a layer is specified. Moreover, it is applicable to perform search with respect to each place when the search is requested by entering a keyword in the area A85 and pressing the button B84 from the place view screen as shown in FIG. 49.

Upon determining that the search criteria is specified (Yes at Step S231), the search-criteria receiving unit 514 determines whether character string to be a keyword (search key) is entered, and waits for reception of the search key (No at Step S232). Upon determining that the search key is entered (Yes at Step S232), the search-criteria receiving unit 514 sends a search request containing the search criteria specified at Step S231, the search key entered at Step S232, and a user ID of a user who is operating the client terminal 500, to the file management server 400 (Step S233).

Meanwhile, in the file management server 400, upon receiving the search request from the client terminal 500, the searching unit 415 performs a search process based on information contained in the search request (Step S241). The search process performed at Step S241 is described below with reference to FIG. 71.

Figure 71:
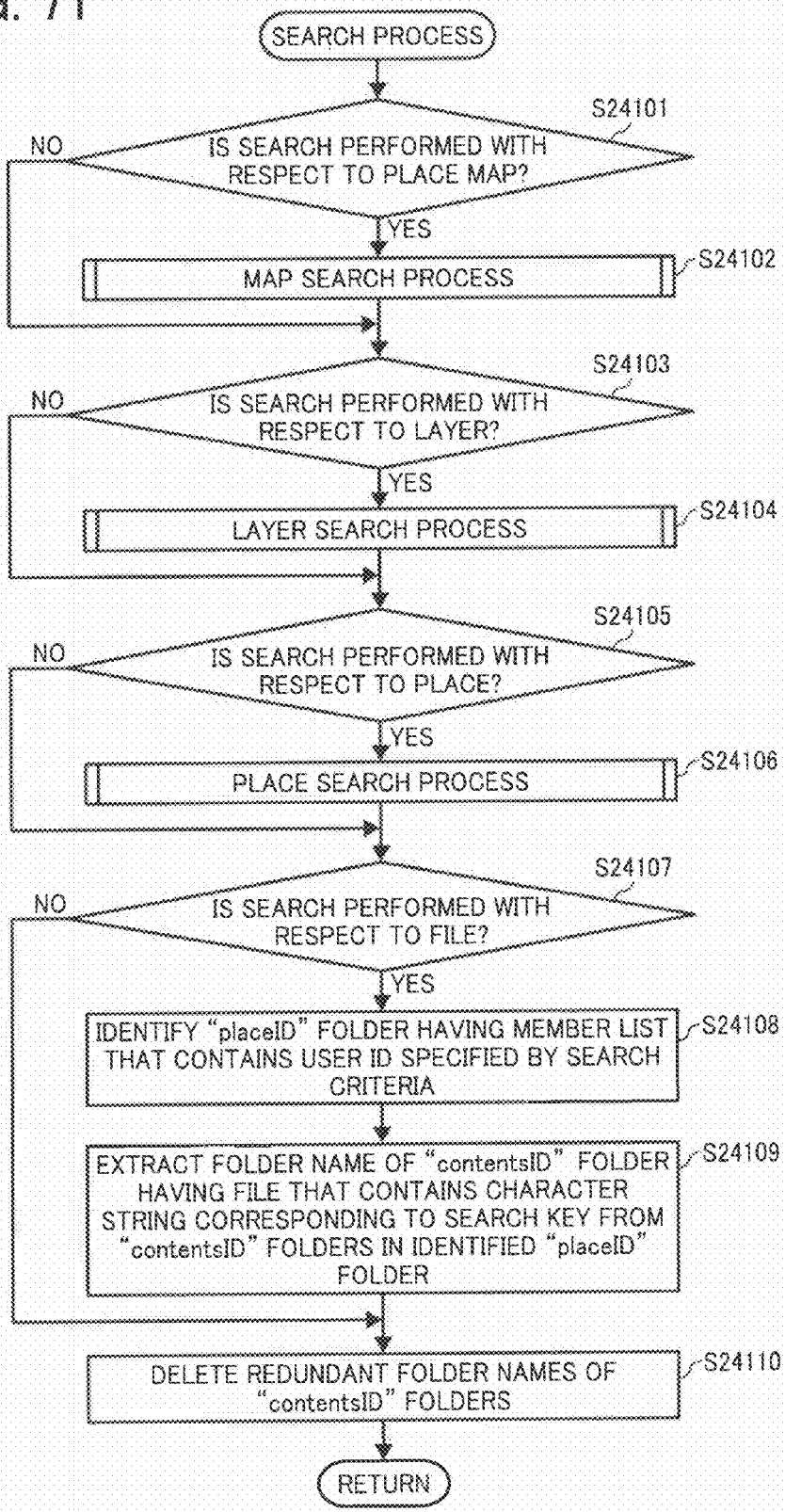
FIG. 71 is a flowchart of a procedure of a search process shown in FIG. 70.

FIG. 71 is a flowchart of a procedure of the search process performed at Step S241. The searching unit 415 determines whether a search method contained in the search criteria indicates that search is performed with respect to each place (Step S24101). When the searching unit 415 determines that the search is performed with respect to each place (No at Step S24101), process control proceeds to Step S24103.

On the other hand, upon determining that the search is performed with respect to each place (Yes at Step S24101), the searching unit 415 identifies place map information associated with a user ID contained in the search request, from the storage unit 46, and performs the map search process based on the identified place map information (Step S24102). Then, process control proceeds to Step S24103. The map search process performed at Step S24102 is the same as that performed at Steps S32 to S38 described in the first embodiment, and therefore, the same explanation is not repeated.

Then, the searching unit 415 determines whether the search method indicates that the search is performed with respect to each layer (Step S24103). When the searching unit 415 determines that the search is not performed with respect to each layer (No at Step S24103), process control proceeds to Step S24105.

On the other hand, upon determining that the search is performed with respect to each layer (Yes at Step S24103), the searching unit 415 identifies layer setting associated with a user ID contained in the search request and a search area (layer name), from the storage unit 46, and performs the layer search process based on the identified layer setting (Step S24104). Then, process control proceeds to Step S24105. The layer search process performed at Step S24104 is the same as that performed at Steps S53 to S59 described in the first embodiment, and therefore, the same explanation is not repeated.

Then, the searching unit 415 determines whether the search method indicates that the search is performed with respect to each place (Step S24105). When the searching unit 415 determines that the search is not performed with respect to each place (No at Step S24105), process control proceeds to Step S24107.

On the other hand, upon determining that the search is performed with respect to each place (Yes at Step S24105), the searching unit 415 identifies a "placeID" folder corresponding to a user ID contained in the search request and a search area (place name), from the storage unit 46, and performs the place search process based on setting information stored in the identified folder (Step S24106). Then, process control proceeds to Step S24107. The place search process performed at Step S24106 is the same as that performed at Steps S73 to S75 described in the first embodiment, and therefore, the same explanation is not repeated.

Then, the searching unit 415 determines whether the search method indicates that the search is performed with respect to each file (Step S24107). When the searching unit 415 determines that the search is not performed with respect to each file (No at Step S24107), process control proceeds to Step S24110.

On the other hand, upon determining that the search is performed with respect to each file (Yes at Step S24107), the searching unit 415 identifies a "placeID" folder corresponding to a user ID contained in the search request, that is, a "placeID" folder registered in place map information associated with the user ID and containing "member.xml" in which the user ID is registered, from the storage unit 46 (Step S24108). When a place name of a layer is specified as a search area, the searching unit 415 identifies a "placeID" folder corresponding to the search area from the storage unit 46.

Then, the searching unit 415 extracts a file name of a file containing character string identical to the search key (folder name of a "contentsID" folder) based on file information contained in "contentsID" folders in the "placeID" folder identified at Step S24108 (Step S24109), and process control proceeds to Step S24110. Specifically, the searching unit 415 determines whether there is character string identical to the search key by comparing a file attribute or summary of the file contained in the file information with the search key. Furthermore, the searching unit 415 determines whether there is character string identical to the search key in files stored in storage location contained in the file information. Then, the searching unit 415 extracts the file information or a folder name of a "contentsID" folder corresponding to the file in which the character string identical to the search key is contained.

The searching unit 415 deletes redundant "contentsID" folder names from among the folder names obtained at Steps S24102, S24104, S24106, and S24109 so that each of the folder names is unique (Step S24110), and process control proceeds to Step S242 of FIG. 70. Specifically, the searching unit 415 deletes redundant "contentsID" folder names from among the folder names of the "contentsID" folders stored in the "placeID" folder extracted at Steps S24102, S24104 and S24106, and the folder name of the "contentsID" folder extracted at Step S24109, so that each of the folder names is unique. When the search criteria contains the above-mentioned refinement criteria, the searching unit 415 extracts items corresponding to the refinement criteria from the folder names remained after redundant folder names are deleted, and process control proceeds to Step S242 of FIG. 70.

Returning to the explanation of FIG. 70, the searching unit 415 extracts the "contentsID" folders having the folder names obtained by the search process at Step S241, in a tree structure with a "DD" folder and a "YYYYMM" folder to which each of the "contentsID" folders belongs (Step S242). Then, the searching unit 415 restores the "contentsID" folders under the "DD" folders and the "YYYYMM" folders of the same date in one "DD" folder and one "YYYYMM" folder. Thus, the searching unit 415 creates a search result folder having a data structure same as that of the "placeID" folder in the place managing section 310 (Step S243). At this state, it is assumed that "place.xml", "member.xml", and "placeicon.jpg" are not contained.

Then, the searching unit 415 sends the search result folder created at Step S243 to the client terminal 500 that has sent the search request (Step S244), and process control ends.

Meanwhile, in the client terminal 500, upon receiving the search result folder from the file management server 400, the search-criteria receiving unit 514 stores the search result folder in the RAM 53 or the storage unit 56 (Step S234). Then, the display control unit 512 reads the search result folder stored at Step S234, and displays the search result folder in the same display mode as that of the place view screen on the display unit 55 (Step S235), and process control ends.

Figure 72:
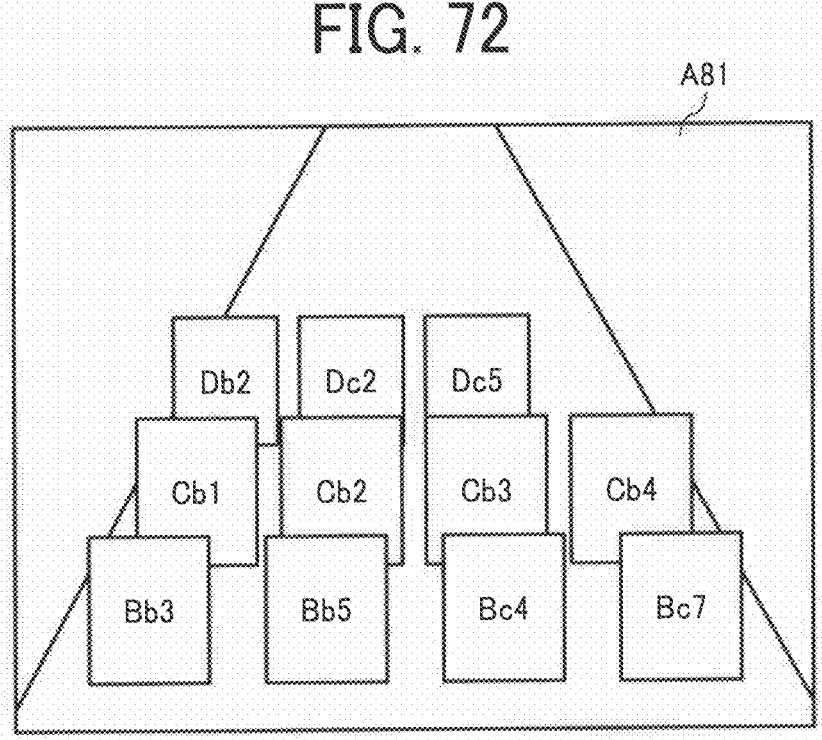
FIG. 72 is a schematic diagram of an example of a place view screen in a display mode for displaying a search result.

It is assumed that the place view screen displayed at Step S235 is in a display mode of one of the place view screens G21 to G23 shown in FIG. 7. If the display mode of the place view screen G21 is employed, the place view screen shown in FIG. 72 is displayed. FIG. 72 is a schematic diagram of the place view screen (the area A81) containing the search result folder, with the symbols similar to those shown in FIG. 51. Specifically, thumbnail images corresponding to the search criteria and the search key specified by the user are displayed in the area A81.

Upon receiving a request for displaying a thumbnail image specified from thumbnail images on the place view screen displayed at Step S235, the display control unit 512 performs the same process as that performed for displaying the file view screen in the process shown in FIG. 62. As a result, the display control unit 512 displays a file view screen with respect to a file corresponding to the specified thumbnail image on the display unit 55.

In this manner, by combining a plurality of search methods, it is possible to search for a file in a flexible manner. It is assumed that the search result folder obtained as a result of the search is deleted from the RAM 53 or the storage unit 56 after the search is finished.

According to the second embodiment, it is assumed that the setting information sent from the file management server 400 is stored in either one of the RAM 53 and the storage unit 56 of the client terminal 500. However, it is applicable to always store the setting information in the storage unit 56. With this configuration, even when the client terminal 500 is a stand alone type, status of files (thumbnail images) registered in each of places can be viewed. To synchronize the setting information stored in the storage unit 56 with the setting information stored in the file management server 400, it is preferable to acquire updated data (difference data) from the file management server 400 every time the client terminal 500 is connected to the file management server 400, and update the setting information stored in the storage unit 56 by using the acquired data.

Furthermore, it is assumed that the client terminal 500 is used as a front end of the file management server 400. However, there can be a configuration in which the client terminal 500 implements a part or all of the functions of the setting changing unit 413, the place-matrix reconfiguring unit 414, and the searching unit 415 included in the file management server 400. In this case, the setting information stored in each of the client terminal 500 and the file management server 400 can be synchronized with each other by sending updated setting information due to operation by a user who is operating the client terminal 500, such as operation with respect to a place map screen. Furthermore, it is applicable to primary search the setting information stored in the client terminal 500 and search the setting information stored in the file management server 400 only when information that cannot be provided by the client terminal 500 (e.g., information contained in an original file) is retrieved.

The present invention is not limited to the specific details described in the above embodiments. Accordingly, various modifications can be made without departing from the scope of the present invention. Furthermore, various inventions can be made by combining the constituent elements described in the above embodiments. Furthermore, part of the constituent elements can be removed from whole of the constituent elements or the constituent elements described in different embodiments can be integrated as appropriate.

The computer programs executed in various processes performed by the above-described apparatuses can be stored in computers connected to a network such as the Internet so that the computer programs can be downloaded via the network as appropriate.

Alternatively, the computer programs executed by the above-described apparatuses can be stored in a storage medium such as a ROM for distributing the computer programs.

It is assumed that the setting information for displaying a user interface is stored by using the structure shown in FIGS. 3 and 35. However, the setting information can be stored by using other structures. Furthermore, it is assumed that the setting information is stored in xml format in the above embodiments. However, the setting information can be stored in other formats.

Moreover, the management method implemented with respect to each user in the second embodiment can be applied to a stand-alone type apparatus as described in the first embodiment. In this case, the setting information stored in the storage unit 16 of the file management apparatus 100 can stored not only by using the folder structure shown in FIG. 35 but also by using other structures.

According to one aspect of the present invention, a relationship between units for managing files can be intuitively recognized. Therefore, files can be effectively managed.

Furthermore, according to another aspect of the present invention, a plurality of files can be easily managed systematically.

Moreover, according to still another aspect of the present invention, files can be managed effectively.

Furthermore, according to still another aspect of the present invention, an instruction for displaying files can be performed intuitively.

Moreover, according to still another aspect of the present invention, files can be managed by using a symbol image unique to a user. Therefore, the symbol image can be effectively used for exchanging files.

Furthermore, according to still another aspect of the present invention, usability for a user can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A file management apparatus, comprising:
a storage unit that stores therein a plurality of pieces of file management information, each piece of file management information being associated with at least one file and serving as a unit for managing the associated at least one file;
a first display control unit that displays, in a non-hierarchical, one level, two-dimensional matrix form including a plurality of places in two-dimensional form on a display, a plurality of symbol images including registered symbol images each of which corresponds to one piece of the file management information and an unregistered symbol image that is in an unregistered state and is not associated with the file management information, wherein the first display control unit displays all of the registered symbol images, corresponding to all of the file management information stored in the storage unit, at the one level in the non-hierarchical, two-dimensional matrix form, and the first display control unit displays the unregistered symbol image on one of edge places in the plurality of places in the two-dimensional matrix form;
a receiving unit that receives an instruction from a user;
a second display control unit that displays, when the receiving unit receives an instruction for selecting a first symbol image of the symbol images displayed on the display, a first thumbnail image of a file on the display, the first thumbnail image being stored in association with a first piece of the file management information corresponding to the first symbol image, and displays, when the receiving unit receives a shift instruction for shifting upward, downward, to the left, or to the right while the first thumbnail image is displayed on the display, a second thumbnail image of a file on the display instead of the first thumbnail image, the second thumbnail image being stored in association with a second piece of the file management information corresponding to a second symbol image placed in a direction indicated by the shift instruction from the first symbol image within the two-dimensional matrix, wherein the second display control unit displays thumbnail images on the display three-dimensionally;

a third display control unit configured to display thumbnail images on the display two-dimensionally, wherein the three-dimensionally displayed thumbnail images displayed by the second display control unit are switchable to the two-dimensionally displayed thumbnail images displayed by the third display control unit in response to a switch instruction received from the user; and a fourth display control unit that reads, when the receiving unit receives an instruction for selecting a thumbnail image displayed on the display, a file corresponding to the selected thumbnail image, and displays the read file on the display.

2. The file management apparatus according to claim 1, wherein
the storage unit stores therein date information indicating a date when a file is stored in association with a piece of the file management information, the date information being associated with the piece of the file management information associated with the file, and
the second display control unit displays thumbnail images of files associated with a piece of the file management information in order of date indicated by date information associated with the piece of the file management information associated with the files.

3. The file management apparatus according to claim 1, wherein
the storage unit stores therein related information associated with a file, the related information being associated with a piece of the file management information associated with the file, and
the second display control unit displays a thumbnail image of a file associated with a piece of the file management information and related information associated with the file.

4. The file management apparatus according to claim 1, further comprising:
a file registering unit that stores, in the storage unit, when the receiving unit receives an instruction for registering a file in a target symbol image among the symbol images displayed on the display, the file to be registered in association with a piece of the file management information corresponding to the target symbol image.

5. The file management apparatus according to claim 4, wherein the file registering unit stores related information associated with a file to be registered and a current date in the storage unit in association with the piece of the file management information corresponding to the target symbol image.

6. The file management apparatus according to claim 1, wherein
the storage unit stores therein arrangement information indicating a position where each of the symbol images is arranged, and
the first display control unit displays the symbol images on the display in the matrix form based on the arrangement information.

7. The file management apparatus according to claim 6, further comprising:
an authenticating unit that performs user authentication based on a piece of identification information for indentifying a user, wherein
the storage unit stores therein a piece of the arrangement information in association with a piece of the identification information, and a member list containing pieces of the identification information for an owner and a member of a symbol image in association with the symbol image; and the first display control unit displays a symbol image corresponding to a member list containing a piece of the identification information authenticated by the authenticating unit, based on a piece of the arrangement information stored in association with authenticated piece of the identification information on the display in the matrix form.

8. The file management apparatus according to claim 7, further comprising:
a member managing unit that registers, when the receiving unit receives an instruction for registering a piece of the identification information of a member for a target symbol image among the symbol images displayed on the display, the piece of the identification information in a member list stored in association with a piece of the file management information corresponding to the target symbol image.

9. The file management apparatus according to claim 8, wherein the member managing unit deletes, when the receiving unit receives an instruction for deleting a piece of the identification information for a target symbol image among the symbol images displayed on the display, the piece of the identification information from a member list stored in association with a piece of the file management information corresponding to the target symbol image.

10. The file management apparatus according to claim 7, wherein the first display control unit displays, when the number of symbol images indicated by a piece of the arrangement information that is associated with a piece of identification information authenticated by the authenticating unit is different from the number of symbol images associated with member lists containing authenticated piece of the identification information, a notification about a change of a setting of a user identified by the authenticated piece of the identification information on the display.

11. The file management apparatus according to claim 10, wherein the first display control unit displays, when the number of symbol images indicated by a piece of the arrangement information that is associated with a piece of identification information authenticated by the authenticating unit is smaller than the number of symbol images associated with member lists containing authenticated piece of the identification information, a notification about an addition of the identification information to the user on the display.

12. The file management apparatus according to claim 10, wherein the first display control unit displays, when the number of symbol images indicated by a piece of the arrangement information that is associated with a piece of identification information authenticated by the authenticating unit is larger than the number of symbol images associated with member lists containing authenticated piece of the identification information, a notification about a deletion of the identification information from the user on the display.

13. The file management apparatus according to claim 6, further comprising:
an arrangement position changing unit that changes, when the receiving unit receives an instruction for changing an arrangement position of a symbol image, a position of the symbol image to a position indicated by the arrangement information.

14. The file management apparatus according to claim 1, further comprising:
a searching unit that searches for, when the receiving unit receives an input of character string as a search key, a file containing character string identical to the search key from files associated with pieces of the file management information corresponding to the symbol images displayed on the display, wherein the second display control unit displays a thumbnail image of a file obtained by the searching unit through searching on the display.

15. The file management apparatus according to claim 14, wherein the storage unit stores therein first attribute information indicating a group of pieces of file management information corresponding to symbol images in each of rows and columns among pieces of file management information corresponding to the symbol images displayed on the display in the matrix form, in association with the group, and second attribute information indicating each piece of the file management information, in association with each piece of the file management information.

16. The file management apparatus of claim 1, wherein the second display control unit is configured to display the second thumbnail image in response to the shift instruction only.

17. A method of managing a file in a file management apparatus including a storage unit that stores therein a plurality of pieces of file management information, each piece of file management information being associated with at least one file and serving as a unit for managing the associated at least one file, the method comprising:

displaying in a non-hierarchical, one level, two-dimensional matrix form including a plurality of places in two-dimensional form on a display, a plurality of symbol images including registered symbol images each of which corresponds to one piece of the file management information and an unregistered symbol image that is in an unregistered state and is not associated with the file management information, wherein the displaying step includes displaying all of the registered symbol images, corresponding to all of the file management information stored in the storage unit, at the one level in the non-hierarchical, two-dimensional matrix form, and the displaying step includes displaying the unregistered symbol image on one of edge places in the plurality of places in the two-dimensional matrix form;

receiving an instruction from a user;

displaying, when an instruction for selecting a first symbol image of the symbol images displayed on the display is received in the receiving step, a first thumbnail image of a file on the display, the first thumbnail image being stored in association with a piece of the file management information corresponding to the first symbol image, and displaying, when a shift instruction for shifting upward, downward, to the left, or to the right is received in the receiving step while the first thumbnail image is displayed on the display, a second thumbnail image of a file on the display instead of the first thumbnail image, the second thumbnail image being stored in association with second a piece of the file management information corresponding to second a symbol image placed in a direction indicated by the shift instruction from the first symbol image within the two-dimensional matrix, wherein the displaying step includes displaying the first and second thumbnail images on the display three-dimensionally;

displaying, on the display in response to a switch instruction received from the user, the first and second thumbnail images two-dimensionally; and reading, when an instruction for selecting a thumbnail image displayed on the display is received, a file corresponding to the selected thumbnail image, and displaying the read file on the display.

18. A non-transitory computer-readable medium having computer-readable program codes embodied in the medium for managing a file in a file management apparatus including a storage unit that stores therein a plurality of pieces of file management information, each piece of file management information being associated with at least one file and serving as a unit for managing the associated at least one file, the program codes, when executed, cause a computer to execute the steps of:

displaying, in a non-hierarchical, one level, two-dimensional matrix form including a plurality of places in two-dimensional form on a display, a plurality of symbol images including registered symbol images each of which corresponds to one piece of the file management information and an unregistered symbol image that is in an unregistered state and is not associated with the file management information, wherein the displaying step includes displaying all of the registered symbol images, corresponding to all of the file management information stored in the storage unit, at the one level in the non-hierarchical two-dimensional matrix form, and the displaying step includes displaying the unregistered symbol image on one of edge places in the plurality of places in the two-dimensional matrix form;

receiving an instruction from a user;

displaying, when an instruction for selecting a first symbol image of the symbol images displayed on the display is received in the receiving step, a first thumbnail image of a file on the display, the first thumbnail image being stored in association with a piece of the file management information corresponding to the first symbol image, and displaying, when a shift instruction for shifting upward, downward, to the left, or to the right is received in the receiving step while the first thumbnail image is displayed on the display, a second thumbnail image of a file on the display instead of the first thumbnail image, the second thumbnail image being stored in association with a second piece of the file management information corresponding to a second symbol image placed in a direction indicated by the shift instruction from the first symbol image within the two-dimensional matrix, wherein the displaying step includes displaying the first and second thumbnail images on the display three-dimensionally;

displaying, on the display in response to a switch instruction received from the user, the first and second thumbnail images two-dimensionally; and reading, when an instruction for selecting a thumbnail image displayed on the display is received, a file corresponding to the selected thumbnail image, and displaying the read file on the display.

* * * * *